(12) United States Patent
Zhang

(10) Patent No.: US 7,503,647 B2
(45) Date of Patent: Mar. 17, 2009

(54) LIQUID SENSOR AND LIQUID CONTAINER INCLUDING THE SENSOR

(75) Inventor: Junhua Zhang, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 489 days.

(21) Appl. No.: 11/173,723

(22) Filed: Jul. 1, 2005

(65) Prior Publication Data

US 2006/0007259 A1 Jan. 12, 2006

(30) Foreign Application Priority Data

Jul. 1, 2004 (JP) ............................ P2004-195557
Jul. 14, 2004 (JP) ............................ P2004-207449

(51) Int. Cl.
*B41J 2/175* (2006.01)
*G01F 23/28* (2006.01)
(52) U.S. Cl. ............................. 347/86; 73/290 V; 347/7
(58) Field of Classification Search ............... 347/7, 347/86; 73/290 V
See application file for complete search history.

(56) References Cited

U.S. PATENT DOCUMENTS

| 4,787,407 | A | 11/1988 | Vogel |
| 6,536,861 | B1 | 3/2003 | Usui et al. |
| 2001/0052627 | A1* | 12/2001 | Takahashi et al. ............ 257/415 |
| 2002/0135623 | A1 | 9/2002 | Tsukada et al. |
| 2002/0170353 | A1 | 11/2002 | Usui et al. |
| 2003/0043216 | A1 | 3/2003 | Usui et al. |
| 2003/0103119 | A1 | 6/2003 | Sakai et al. |
| 2004/0056910 | A1 | 3/2004 | Usui et al. |

FOREIGN PATENT DOCUMENTS

| EP | 1 053 877 A1 | 11/2000 |
| EP | 1 176 403 A2 | 1/2002 |
| EP | 1 245 393 A1 | 10/2002 |

(Continued)

OTHER PUBLICATIONS

Combined Search and Examination Report dated Oct. 24, 2005, in UK patent appln. No. GB 0 513 573.6.

(Continued)

*Primary Examiner*—Julian D Huffman
(74) *Attorney, Agent, or Firm*—Stroock & Stroock & Lavan LLP

(57) ABSTRACT

The invention relates to a liquid sensor which can certainly judge the existence of liquid, and a liquid container including the sensor. The liquid sensor has: a vibration cavity forming base portion 40 having a first surface and a second surface opposite to each other, in which a cavity 43 for receiving liquid as a detection object is opened at a side of the first surface, and a bottom of the cavity 43 is capable of vibrating; and a piezoelectric element including a first electrode 46 formed at a side of the second surface of the vibration cavity forming base portion, a piezoelectric layer 47 laminated on the first electrode, and a second electrode 49 laminated on the piezoelectric layer. A shape of the cavity 43 in a plan view has a longitudinal dimension and a lateral dimension smaller than the longitudinal dimension.

13 Claims, 43 Drawing Sheets

FOREIGN PATENT DOCUMENTS

| | | |
|---|---|---|
| EP | 1 281 525 A2 | 2/2003 |
| EP | 1 285 764 A1 | 2/2003 |
| GB | 2 413 385 A | 10/2005 |
| JP | 2001-146019 | 5/2001 |
| JP | 2001-146024 A | 5/2001 |
| JP | 2001-146026 | 5/2001 |

OTHER PUBLICATIONS

Partial Search Report in International Patent Appln. No. PCT/JP2005/012633, dated Mar. 7, 2006.

International Search Report for appln. No. PCT/JP2005/012633 (Feb. 8, 2006).

* cited by examiner

→ TIME

→ TIME

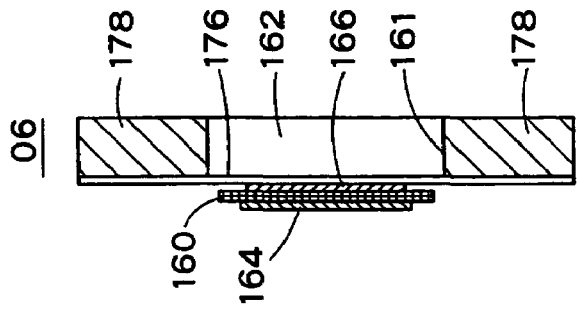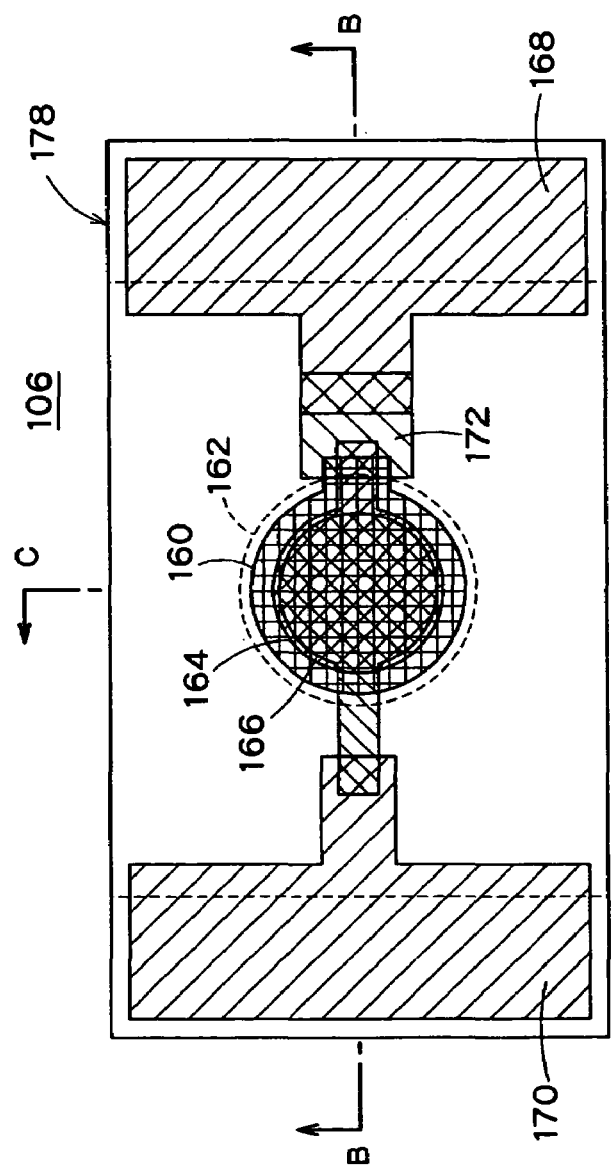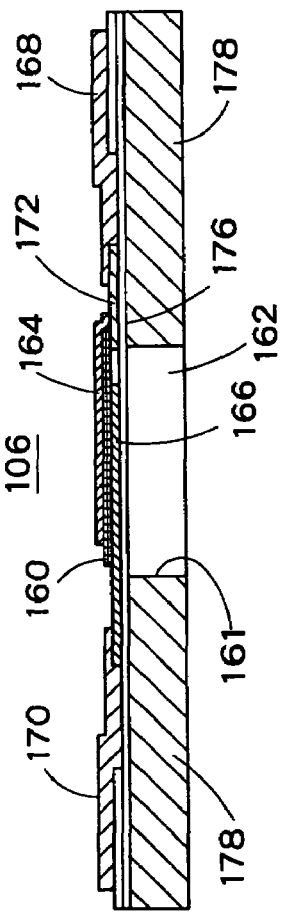

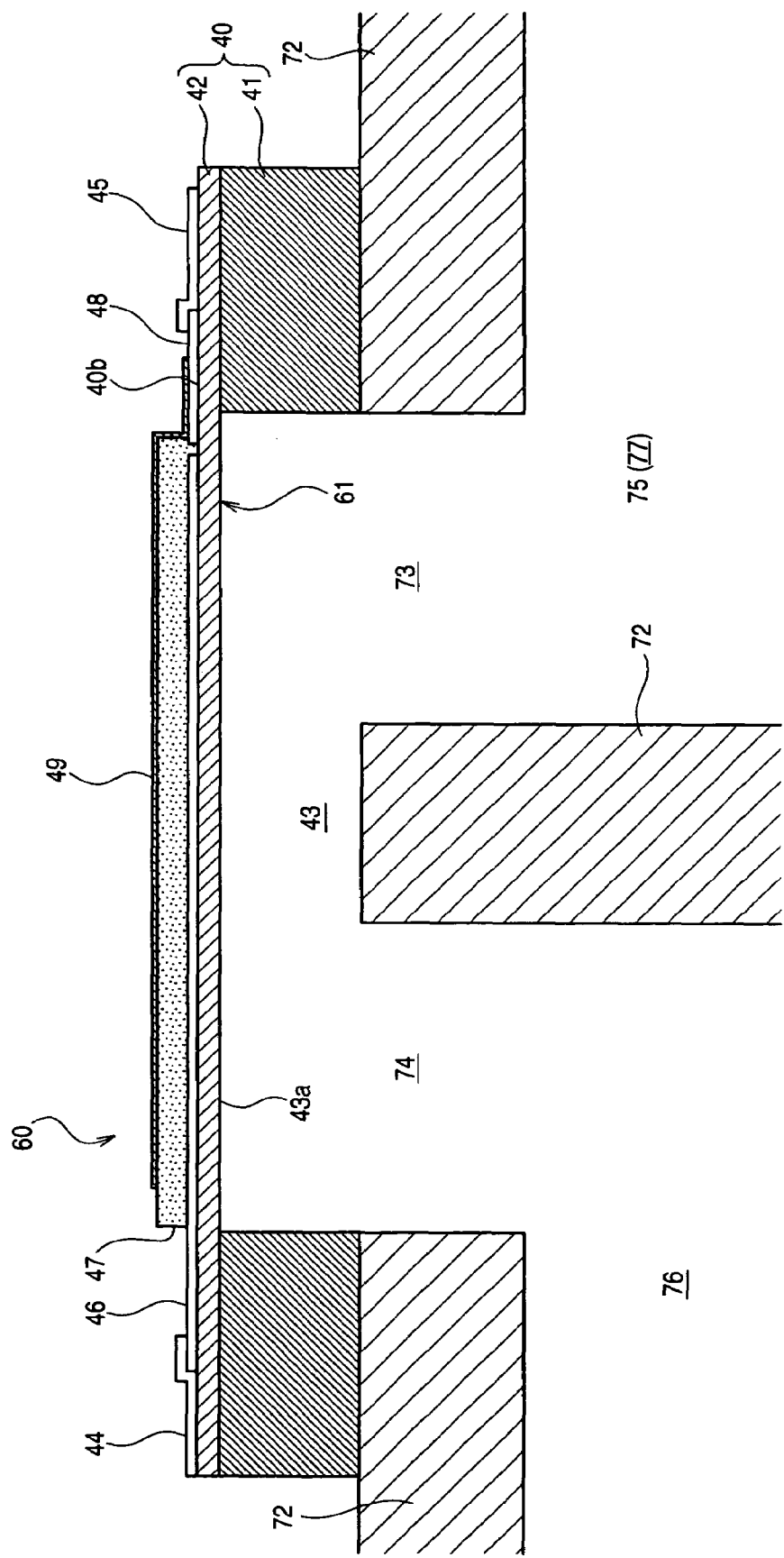

US 7,503,647 B2

LIQUID SENSOR AND LIQUID CONTAINER INCLUDING THE SENSOR

TECHNICAL FIELD

The present invention relates to a liquid sensor and a liquid container including the sensor, and particularly to a liquid sensor suitable for the detection of the residual amount of liquid in a liquid jetting apparatus and a liquid container including the sensor.

BACKGROUND ART

As a typical example of a conventional liquid jetting apparatus, there is an ink jet recording apparatus including an ink jet recording head for image recording. As other liquid jetting apparatuses, there are enumerated, for example, an apparatus including a color material jetting head used for color filter manufacture of a liquid crystal display or the like, an apparatus including an electrode material (conductive paste) jetting head used for electrode formation of an organic EL display, a surface emission display (FED) or the like, an apparatus including a living organic material jetting head used for biochip manufacture, an apparatus including a sample jetting head as a precision pipette, and the like.

In the ink jet recording apparatus as the typical example of the liquid jetting apparatus, an ink jet recording head including a pressure generation unit to pressurize a pressure generation chamber and a nozzle opening to jet pressurized ink as an ink droplet is mounted to a carriage.

In the ink jet recording apparatus, ink in an ink container continues to be supplied to the recording head through a flow path, so that printing can be continued. The ink container is constructed as, for example, a detachable cartridge which a user can easily exchange at a time point when the ink is used up.

Conventionally, as a management method of ink consumption of an ink cartridge, there is a method in which the number of jets of ink droplets in the recording head and the amount of ink sucked during the maintenance are accumulated by software, and the ink consumption is managed by calculation, or a method in which an electrode for detecting a liquid surface is attached to an ink cartridge, and a time point when a predetermined amount of ink is actually consumed is managed.

However, in the method in which the number of discharges of ink droplets and the amount of ink are accumulated by the software and the ink consumption is managed by calculation, there is a problem as described below. Variations in the weight of discharge ink droplets exist between heads. Although the variations in the weight of ink droplets do not have an influence on the picture quality, in view of a case where an error in the amount of ink consumption due to the variations is accumulated, ink whose amount includes a margin is filled in the ink cartridge.

Accordingly, there arises a problem that the ink corresponding to the margin remains according to an individual. On the other hand, in the method in which the time point when the ink is used up is managed by the electrode, since the actual amount of ink can be detected, the residual amount of ink can be managed at high reliability. However, since the detection of the liquid surface of ink depends on the conductivity of the ink, there are defects that the kind of detectable ink is limited, and the seal structure of the electrode becomes complicated. Besides, since a noble metal having superior conductivity and high corrosion resistance is generally used as a material of the electrode, the manufacturing cost of the ink cartridge runs up. Further, since two electrodes are required to be mounted, the manufacturing steps are increased, and as a result, the manufacturing cost runs up.

A device developed to solve the above problems is disclosed as a piezoelectric device in JP-A-2001-146024. This piezoelectric device can accurately detect the residual amount of liquid, eliminates the need for a complicated seal structure, and can be used while being mounted to a liquid container.

That is, according to the piezoelectric device disclosed in JP-A-2001-146024, by using that the resonant frequency of a residual vibration signal generated by the residual vibration (free vibration) of a vibration portion of the piezoelectric device after it is forcibly vibrated by a drive pulse is changed between a case where ink exists in a space opposite to the vibration portion of the piezoelectric device and a case where the ink does not exist, the residual amount of ink in the ink cartridge can be monitored.

FIG. 9 shows an actuator constituting the foregoing conventional piezoelectric device. This actuator 106 includes a substrate 178 having a circular opening 161 almost at the center, a vibration plate 176 disposed on one surface (hereinafter referred to as a "front surface") of a substrate 178 so as to cover the opening 161, a piezoelectric layer 160 disposed at the side of the front surface of the vibration plate 176, an upper electrode 164 and a lower electrode 166 between which the piezoelectric layer 160 is sandwiched from both sides, an upper electrode terminal 168 electrically connected to the upper electrode 164, a lower electrode terminal 170 electrically connected to the lower electrode 166, and an auxiliary electrode 172 disposed between the upper electrode 164 and the upper electrode terminal 168 and electrically connecting both.

Each of the piezoelectric layer 160, the upper electrode 164, and the lower electrode 166 has a circular portion as a body portion. The respective circular portions of the piezoelectric layer 160, the upper electrode 164 and the lower electrode 166 form a piezoelectric element.

The vibration plate 176 is formed on the front surface of the substrate 178 so as to cover the opening 161. An actually vibrating vibration region in the vibration plate 176 is determined by the opening 161. A cavity 162 is formed of a portion of the vibration plate 176 facing the opening 161 and the opening 161 of the substrate (cavity formation member) 178. A surface (hereinafter referred to as a "back surface") of the substrate 178 at the opposite side to the piezoelectric element faces the inside of an ink container. By this, the cavity 162 is constructed to come in contact with liquid (ink). Incidentally, the vibration plate 176 is liquid-tightly attached to the substrate 178, so that even if the liquid enters the cavity 162, the liquid does not leak to the front surface side of the substrate 178.

In the foregoing actuator 106 of the related art, residual vibration (free vibration) of the vibration portion generated after the vibration portion is forcibly vibrated by applying a drive pulse to the piezoelectric element is detected as counter electromotive force by the same piezoelectric element. Then, by using that the residual vibration state of the vibration part is changed in the vicinity of the time when the liquid surface in the ink container passes the setting position of the actuator 106 (strictly, the position of the cavity 162), the residual amount of ink in the ink container can be detected.

The foregoing conventional actuator (piezoelectric device) 106 is mounted to a container wall of a container body 181 of an ink cartridge 180 as shown in FIG. 10, and the cavity 162 to receive ink as a detection object is exposed in the ink reservoir space of the inside of the ink container 180.

However, as stated above, since the foregoing conventional actuator (piezoelectric device) 106 is constructed so that the cavity 162 is exposed in the ink reservoir space of the inside of the ink cartridge 180, when the ink in the inside of the ink cartridge 180 foams by the vibration or the like, an air bubble easily enters the cavity 162 of the actuator 106. When the air bubble enters the cavity 162 as stated above and stays there, the resonant frequency of the residual vibration detected by the actuator 106 becomes high although the residual amount of ink in the ink cartridge 180 is sufficient, and there is a problem that an erroneous judgment is made such that the liquid surface passes the position of the actuator 106 and the residual amount of ink has become small.

Besides, when the size of the cavity 162 of the actuator 106 is made small in order to detect the passing timing of the liquid surface with high accuracy, the meniscus of ink is apt to be formed in the cavity 162. Thus, even if the liquid surface passes the position of the cavity 162 by the consumption of ink, since ink remains in the inside of the cavity 162, there is a problem that an erroneous judgment is made such that the liquid surface does not pass the position of the actuator 106, and the residual amount of ink is sufficient.

As shown in FIGS. 6 to 8 in JP-A-2001-146024, this publication discloses that the length of the cavity in an electrode drawing-out direction in which the upper and lower electrodes are drawn out is larger than the length of the cavity in a direction perpendicular to the electrode drawing-out direction. In the case in which the planar shape of a cavity is long in one direction, an unnecessary vibration which is different from a residual vibration to be detected is included in the residual vibration (free vibration) generated in a vibration portion after a driving pulse is applied to a piezoelectric unit. As a result, there is a problem in that it is hard to reliably decide the presence of an ink.

It can be supposed that such an unnecessary vibration is generated because a difference in a vibration mode is great between a forcible vibration generated in the vibration portion when the driving pulse is applied to the piezoelectric unit and the residual vibration (free vibration) generated in the vibration portion after the forcible vibration.

DISCLOSURE OF THE INVENTION

An object of the present invention is to provide a liquid sensor which can certainly judge the existence of liquid and a liquid container including the sensor.

Another object of the present invention is to provide a liquid sensor which prevents air bubbles from staying in a cavity, and can certainly judge the existence of liquid, and a liquid container including the sensor.

Another object of the present invention is to provide a liquid sensor which prevents ink from remaining in a cavity, and can certainly judge the existence of liquid, and a liquid container including the sensor.

It is a further object of the invention to provide a liquid sensor employing a suitable cavity shape for preventing air bubbles from staying and ink from remaining in a cavity and capable of preventing the generation of an unnecessary vibration in the residual vibration of a vibration portion to reliably decide the presence of a liquid, and a liquid container comprising the sensor.

It is a further object of the invention to provide a liquid sensor employing a suitable cavity shape capable of preventing air bubbles from staying and ink from remaining in the cavity to reliably decide the presence of a liquid by providing a liquid supply port and a liquid discharge port in corresponding positions to both ends in the longitudinal direction of the cavity.

It is a further object of the invention to provide a liquid sensor which can be manufactured and handled easily, and which can prevent the occurrence of a crack.

It is a further object of the invention to provide a method and a system which can certainly judge the existence of liquid The present invention can provide, as illustrative, non-limiting embodiments, the following arrangements:

(1) A liquid sensor comprising:

a vibration cavity forming base portion having a first surface and a second surface opposite to each other, in which a cavity for receiving liquid as a detection object is opened at a side of the first surface, and a bottom of the cavity is capable of vibrating; and a piezoelectric element including a first electrode formed at a side of the second surface of the vibration cavity forming base portion, a piezoelectric layer laminated on the first electrode, and a second electrode laminated on the piezoelectric layer, wherein a shape of the cavity in a plan view has a longitudinal dimension and a lateral dimension smaller than the longitudinal dimension.

(2) The liquid sensor according to (1), wherein:

the first electrode covers a substantially whole of a region corresponding to the cavity, and the second electrode is notched at portions corresponding to four corners of the cavity to present a substantially cross shape.

(3) The liquid sensor according to (1) or (2), wherein the cavity has a first symmetrical axis and a second symmetrical axis perpendicularly intersecting each other, the lateral dimension is a dimension along the first symmetrical axis, and the longitudinal dimension is a dimension along the second symmetrical axis.

(4) The liquid sensor according to (3), wherein the shape of the cavity in the plane view is elliptical.

(5) The liquid sensor according to any one of (1) to (4), further comprising:

an exit/entrance plate laminated at the side of the first surface of the vibration cavity forming base portion, the exit/entrance plate having a liquid supply port for supplying the liquid as the detection object to the cavity, and a liquid discharge port for discharging the liquid as the detection object from the cavity.

(6) The liquid sensor according to (5), wherein the liquid supply port and the liquid discharge port are respectively disposed at longitudinal end portions of the cavity.

(7) The liquid sensor according to (5) or (6), wherein the liquid supply port and the liquid discharge port are located in an inside of a region corresponding to the cavity.

(8) The liquid sensor according to any one of (5) to (7), wherein the vibration cavity forming base portion and the exit/entrance plate are formed of the same material and sintered integrally.

(9) The liquid sensor according to (8), wherein the vibration cavity forming base portion and the exit/entrance plate are formed of zirconia or alumina.

(10) The liquid sensor according to any one of (1) to (9), wherein the vibration cavity forming base portion includes a cavity plate in which a through hole forming the cavity is formed, and a vibration plate laminated on the cavity plate.

(11) The liquid sensor according to any one of (1) to (10), wherein the whole of the piezoelectric layer is located in an inside of a region corresponding to the cavity.

(12) The liquid sensor according to any one of (1) to (10), wherein a dimension of the piezoelectric layer in the longitudinal direction of the cavity is larger than the longitudinal dimension of the cavity, and the piezoelectric layer covers the cavity over the entire length in the longitudinal direction of the cavity.

The present invention can further provide, as illustrative, non-limiting embodiments, the following arrangements:

(13) A liquid sensor comprising:

a cavity plate having a first surface and a second surface opposite to each other, the cavity plate having a through hole passing therethrough;

a vibration plate laminated on the second surface of the cavity plate so that one end of the through hole of the cavity plate is closed and that a part of the vibration plate and the through hole of the cavity plate define a cavity opened at a side of the first surface of the cavity plate;

a piezoelectric element including a first electrode formed on the vibration plate and located opposite from the cavity plate, a piezoelectric layer laminated on the first electrode, and a second electrode laminated on the piezoelectric layer; and an exit/entrance plate laminated on the first surface of the cavity plate, the exit/entrance plate having a first through hole passing therethrough, and a second through hole passing therethrough and separated from the first through hole, wherein:

the first and second through holes of the exit/entrance plate are located in an inside of a region corresponding to the part of the vibration plate in a plane view; and the cavity plate, the vibration plate and the exit/entrance plate are formed of the same material and sintered integrally.

(14) The liquid sensor according to (13), wherein the cavity plate, the vibration plate and the exit/entrance plate are formed of zirconia or alumina.

(15) The liquid sensor according to (13) or (14), wherein the part of the vibration plate has a longitudinal dimension and a lateral dimension smaller than the longitudinal dimension in the plane view.

(16) The liquid sensor according to (15), wherein the part of the vibration plate has a first symmetrical axis and a second symmetrical axis perpendicularly intersecting each other, the lateral dimension is a dimension along the first symmetrical axis, and the longitudinal dimension is a dimension along the second symmetrical axis.

(17) The liquid sensor according to (16), wherein the shape of the part of the vibration plate in the plane view is elliptical.

(18) The liquid sensor according to any one of (15) to (17), wherein the first through hole and second through hole of the exist/entrance plate are respectively disposed at longitudinal end portions of the cavity.

(19) The liquid sensor according to any one of (15) to (18), wherein:

the first electrode covers a substantially whole of a region corresponding to the cavity, and the second electrode has a substantially cross shape.

(20) The liquid sensor according to any one of (15) to (19), wherein the whole of the piezoelectric layer is located in an inside of a region corresponding to the cavity.

(21) The liquid sensor according to any one of (15) to (19), wherein a dimension of the piezoelectric layer in the longitudinal direction of the cavity is larger than the longitudinal dimension of the cavity, and the piezoelectric layer covers the cavity over the entire length in the longitudinal direction of the cavity.

The present invention can provide, as an illustrative, non-limiting embodiment, the following arrangement:

(22) A liquid container comprising:

a container body including a liquid outlet port for sending liquid stored in its inside to an outside; and a liquid sensor mounted to the container body, wherein the liquid sensor comprises:

a vibration cavity forming base portion having a first surface and a second surface opposite to each other, in which a cavity for receiving the liquid as a detection object is opened at a side of the first surface, and a bottom of the cavity is capable of vibrating; and a piezoelectric element including a first electrode formed at a side of the second surface of the vibration cavity forming base portion, a piezoelectric layer laminated on the first electrode, and a second electrode laminated on the piezoelectric layer, wherein a shape of the cavity in a plan view has a longitudinal dimension and a lateral dimension smaller than the longitudinal dimension.

The present invention can provide, as an illustrative, non-limiting embodiment, the following arrangement:

(23) A liquid container comprising:

a container body including a liquid outlet port for sending liquid stored in its inside to an outside; and a liquid sensor mounted to the container body, wherein the liquid sensor comprises:

a cavity plate having a first surface and a second surface opposite to each other, the cavity plate having a through hole passing therethrough;

a vibration plate laminated on the second surface of the cavity plate so that one end of the through hole of the cavity plate is closed and that a part of the vibration plate and the through hole of the cavity plate define a cavity opened at a side of the first surface of the cavity plate;

a piezoelectric element including a first electrode formed on the vibration plate and located opposite from the cavity plate, a piezoelectric layer laminated on the first electrode, and a second electrode laminated on the piezoelectric layer; and an exit/entrance plate laminated on the first surface of the cavity plate, the exit/entrance plate having a first through hole passing therethrough, and a second through hole passing therethrough and separated from the first through hole, wherein:

the first and second through holes of the exit/entrance plate are located in an inside of a region corresponding to the part of the vibration plate in a plane view; and the cavity plate, the vibration plate and the exit/entrance plate are formed of the same material and sintered integrally.

The present disclosure relates to the subject matter contained in Japanese patent application Nos. 2004-195557 (filed on Jul. 1, 2004) and 2004-207449 (filed on Jul. 14, 2004), each of which is expressly incorporated herein by reference in its entirety.

BRIEF DESCRIPTION OF THE DRAWINGS

FIGS. 3A and 3B are sectional views of the liquid sensor shown in FIGS. 2A and 2B, in which FIG. 3A is a sectional view taken along line A-A of FIG. 2A, and FIG. 3B is a sectional view taken along line B-B of FIG. 2A.

FIGS. 5A and 5B are views showing a drive pulse waveform and a counter electromotive force waveform in the liquid sensor according to the embodiment of the invention, in which FIG. 5A is a waveform view of a case where ink exists in a cavity, and FIG. 5B is a waveform view of a case where ink does not exist in the cavity.

FIGS. 7A and 7B are sectional views of the liquid sensor shown in FIGS. 6A and 6B, in which FIG. 7A is a sectional view taken along line A-A of FIG. 6A, and FIG. 7B is a sectional view taken along line B-B of Fig. A.

FIGS. 9A, 9B and 9C are views showing a liquid sensor disclosed in JP-A-2001-146024, in which FIG. 9A is a plan view, FIG. 9B is a sectional view taken along line B-B of FIG. 9A, and FIG. 9C is a sectional view taken along line C-C of FIG. 9A.

FIG. 38 is a sectional view showing a liquid container including a liquid sensor according to a further embodiment of the present invention, taken along a line corresponding to the B-B line of FIG. 18.

BEST MODE FOR CARRYING OUT THE INVENTION

Hereinafter, a liquid sensor according to an embodiment of the invention and an ink cartridge (liquid container) including the liquid sensor will be described with reference to the drawings.

Figure 1:
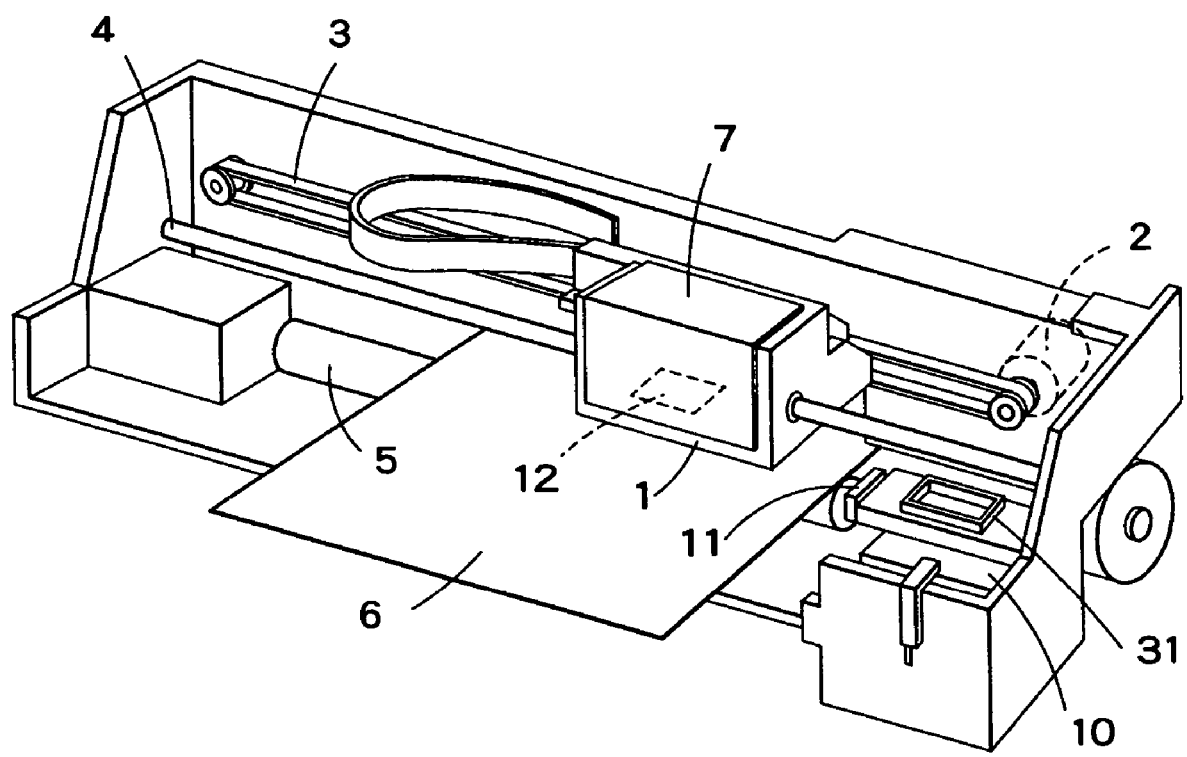
FIG. 1 is a perspective view showing an example of an ink jet recording apparatus in which an ink cartridge including a liquid sensor according to the invention is used.

FIG. 1 shows a schematic structure showing an example of an ink jet recording apparatus (liquid jetting apparatus) in which an ink cartridge according to the present invention can be used. In FIG. 1, reference numeral 1 denotes a carriage, and the carriage 1 is constructed to be guided by a guide member 4 and to be reciprocated in an axial direction of a platen 5 through a timing belt 3 driven by a carriage motor 2.

An ink jet recording head 12 is mounted to a side of the carriage 1 opposite to a recording sheet 6, and an ink cartridge 7 for supplying ink to the recording head 12 is detachably mounted on an upper part thereof.

A cap member 31 is disposed at a home position (in the drawing, right side) as a non-printing region of the recording apparatus, and the cap member 31 is constructed such that when the recording head mounted on the carriage 1 is moved to the home position, the cap member is pressed to a nozzle formation surface of the recording head to form a sealed space between the cap member and the nozzle formation surface. A pump unit 10 to apply negative pressure to the sealed space formed by the cap member 31 and to perform cleaning or the like is disposed below the cap member 31.

In the vicinity of a printing region side of the cap member 31, a wiping unit 11 including an elastic plate of rubber or the like is disposed to be capable of advancing/retreating in, for example, a horizontal direction with respect to a movement locus of the recording head, and when the carriage 1 is reciprocally moved to the side of the cap member 31, the nozzle formation surface of the recording head can be wiped as the need arises.

Figure 2A:
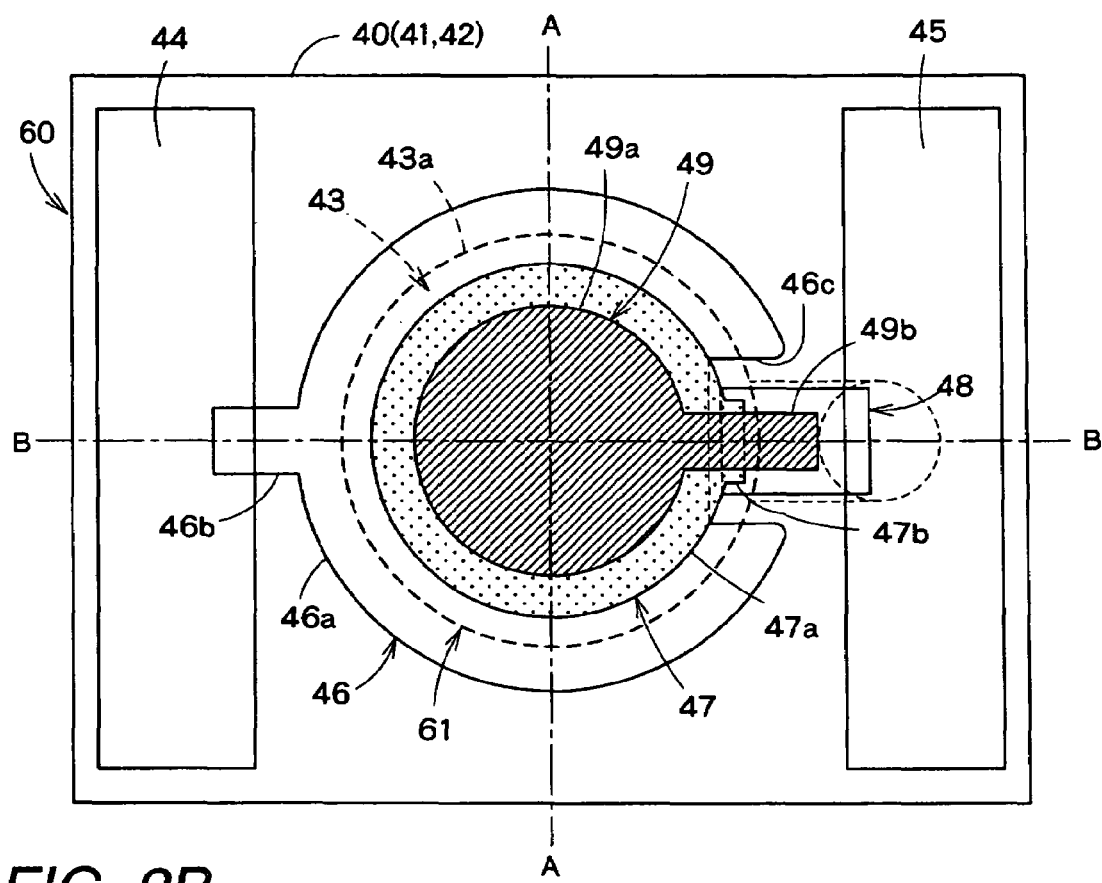
FIG. 2A is a plan view showing a liquid sensor according to an embodiment of the invention.
Figure 2B:
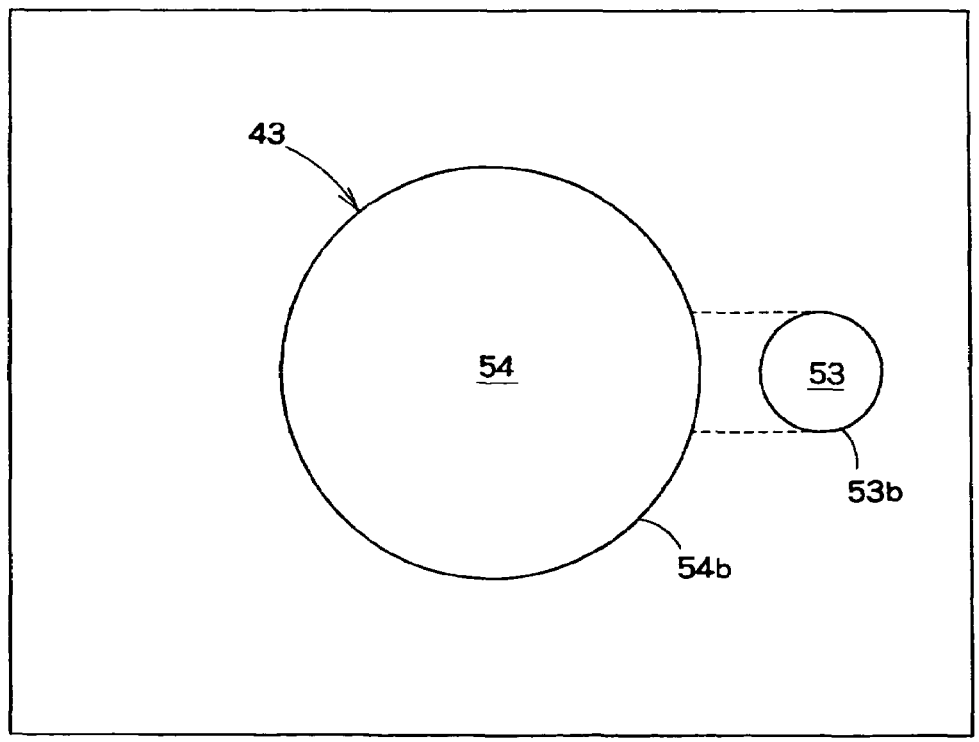
FIG. 2B is a bottom view thereof.
Figure 3A:
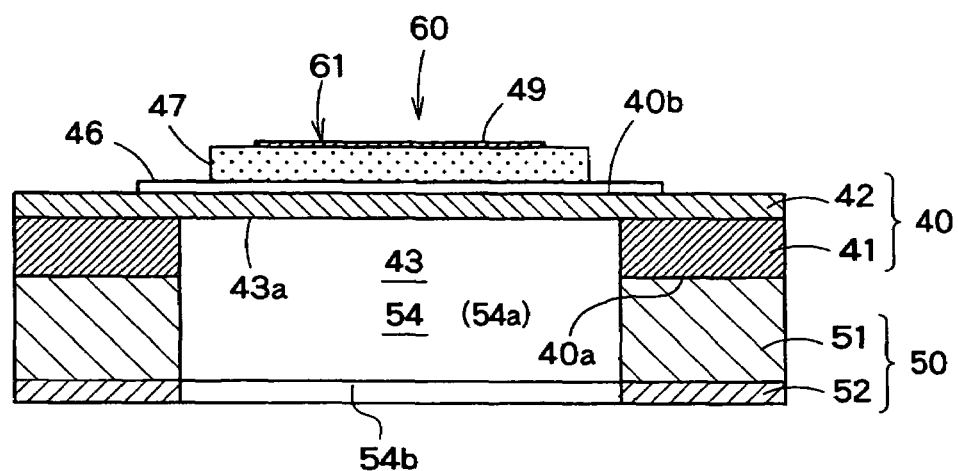
Figure 3B:
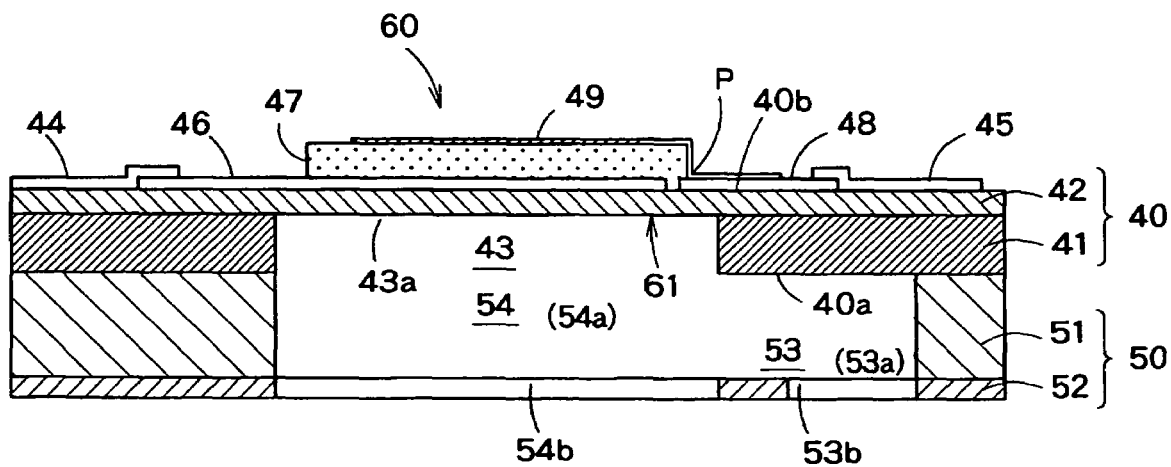
Figure 4A:
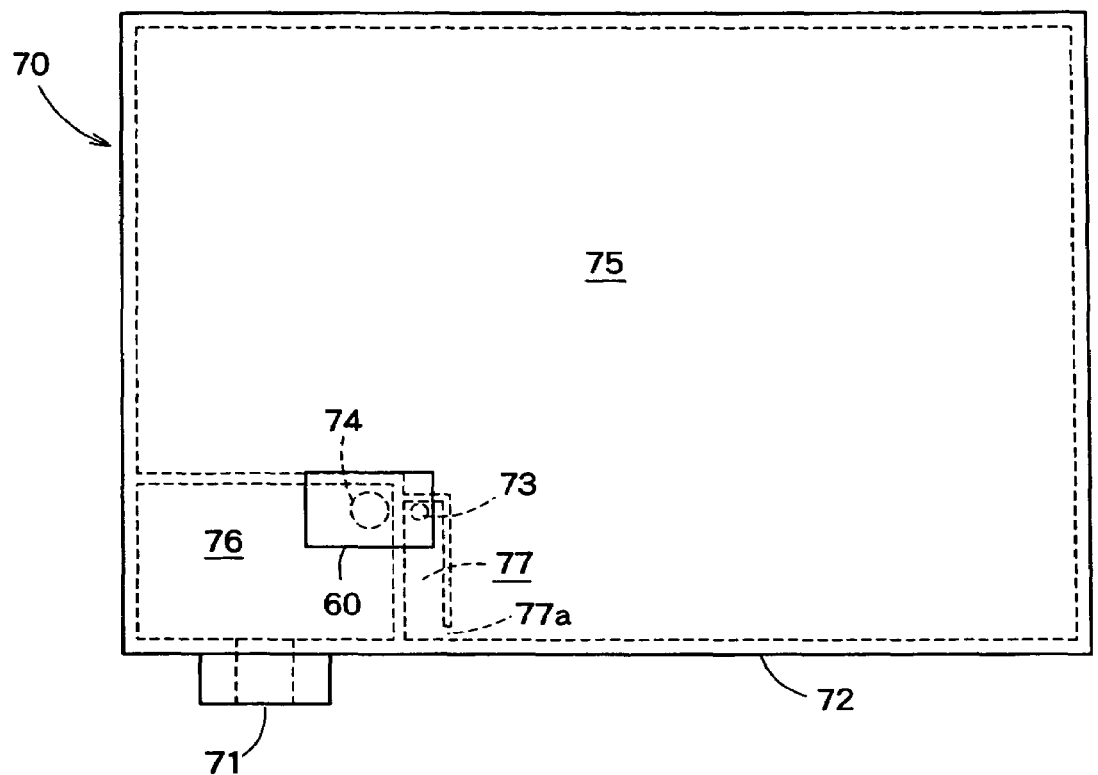
FIG. 4A is a side view of an ink cartridge including the liquid sensor shown in FIGS. 2A and 2B.
Figure 4B:
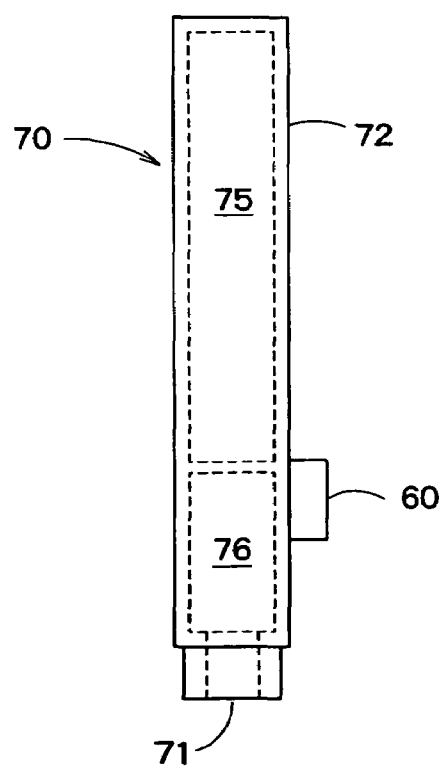
FIG. 4B is a front view thereof.

FIGS. 2 to 4 are views showing a liquid sensor 60 according to this embodiment, and the liquid sensor 60 includes a vibration cavity forming base portion 40 constructed by laminating a vibration plate 42 on a cavity plate 41. This vibration cavity forming base portion 40 includes a first surface 40a and a second surface 40b opposite to each other.

A circular cavity 43 for receiving a medium (ink) as a detection object is formed to opened to the side of the first surface 40a in the vibration cavity forming base portion 40, and a bottom portion 43a of the cavity 43 is formed to be capable of vibrating by the vibration plate 42. In other words, the contour of an actually vibrating portion in the whole of the vibration plate 42 is regulated by the cavity 43. A lower electrode terminal 44 and an upper electrode terminal 45 are formed at both ends of the vibration cavity forming base portion 40 on the side of the second surface 40b.

The lower electrode (first electrode) 46 is formed on the second surface 40b of the vibration cavity forming base portion 40, and the lower electrode 46 includes a substantially circular body portion 46a, and an extension portion 46b extending from the body portion 46a in the direction of the lower electrode terminal 44 and connected to the lower electrode terminal 44. The center of the substantially circular body portion 46a of the lower electrode 46 is coincident with the center of the cavity 43.

The substantially circular body portion 46a of the lower electrode 46 is formed to be larger than the circular cavity 43, and covers substantially the whole of a region corresponding to the cavity 43. Besides, the substantially circular body portion 46a of the lower electrode 46 includes a cut portion 46c formed so as to enter the inside of a periphery 43a of the cavity 43.

A piezoelectric layer 47 is laminated on the lower electrode 46, and this piezoelectric layer 47 includes a circular body portion 47a formed to be smaller than the cavity 43 and a projecting portion 47b projecting from the body portion 47a within the range of the region corresponding to the cavity 43. As is understood from FIG. 2, the whole of the piezoelectric layer 47 is contained within the range of the region corresponding to the cavity 43. In other words, the piezoelectric layer 47 does not include any portion extending across the position corresponding to the periphery 43a of the cavity 43.

The center of the body portion 47a of the piezoelectric layer 47 is coincident with the center of the cavity 43, and substantially the whole of the body portion 47a of the piezoelectric layer 47 is laminated on the lower electrode 46 except a portion corresponding to the cut portion 46c of the lower electrode 46.

An auxiliary electrode 48 is formed on the side of the second surface 40b of the vibration cavity forming base portion 40. The auxiliary electrode 48 extends across the position corresponding to the periphery 43a of the cavity 43 from the outside of the region corresponding to the cavity 43 to the inside of the region corresponding to the cavity 43. A part of the auxiliary electrode 48 is positioned at the inside of the cut portion 46c of the first electrode 46, and supports the projecting portion 47b of the piezoelectric layer 47 and its vicinity from the side of the second surface 40b of the substrate 40. The auxiliary electrode 48 preferably has the same material and the same thickness as the lower electrode 46. As stated above, the auxiliary electrode 48 supports the projecting portion 47b of the piezoelectric layer 47 and its vicinity from the side of the second surface 40b of the substrate 40, so that a stepped portion is not formed in the piezoelectric layer 47, and reduction in mechanical strength can be prevented.

A body portion 49a of an upper electrode (second electrode) 49 is laminated on the piezoelectric layer 47, and the upper electrode 49 is formed to be smaller than the body portion 47a of the piezoelectric layer 47. Besides, the upper electrode 49 includes an extension portion 49b extending from the body portion 49a and connected to the auxiliary electrode 48. As is understood from FIG. 3B, a position P where connection between the extension portion 49b of the upper electrode 49 and the auxiliary electrode 48 starts is positioned within the range of the region corresponding to the cavity 43.

A piezoelectric element is formed of the body portions of the lower electrode 46, the piezoelectric layer 47 and the upper electrode 49.

As is understood from FIG. 2, the upper electrode 49 is electrically connected to the upper electrode terminal 45 through the auxiliary electrode 48. As stated above, the upper electrode 49 is connected to the upper electrode terminal 45 through the auxiliary electrode 48, so that a stepped portion formed from the total thickness of the piezoelectric layer 47 and the lower electrode 46 can be absorbed by both the upper electrode 49 and the auxiliary electrode 48. Thus, it is possible to prevent that a large stepped portion is formed on the upper electrode 49 and the mechanical strength is lowered.

The body portion 49a of the upper electrode 49 is circular, and its center is coincident with the center of the cavity 43. The body portion 49a of the upper electrode 49 is formed to be smaller than both the body portion 47a of the piezoelectric layer 47 and the cavity 43.

As stated above, the body portion 47a of the piezoelectric layer 47 is sandwiched between the body portion 49a of the upper electrode 49 and the body portion 46a of the lower electrode 46. By this, the piezoelectric layer 47 can be effectively deformation driven.

Incidentally, with respect to the body portion 46a of the lower electrode 46 and the body portion 49a of the upper electrode 49 electrically connected to the piezoelectric layer 47, the body portion 49a of the upper electrode 49 is formed to be smaller. Accordingly, the body portion 49a of the upper electrode 49 determines the range of the portion where the piezoelectric effect is generated in the piezoelectric layer 47.

The centers of the body portion 47a of the piezoelectric layer 47, the body portion 49a of the upper electrode 49, and the body portion 46a of the lower electrode 46 are coincident with the center of the cavity 43. Besides, the center of the circular cavity 43 to determine the portion of the vibration plate 42 which can vibrate is positioned at the center of the whole of the liquid sensor 60.

The vibratable portion of the vibration plate regulated by the cavity 43, a portion of the body portion 46a of the lower electrode 46 corresponding to the cavity 43, the body portion 47a and the projecting portion 47b of the piezoelectric layer 47, the body portion 49a of the upper electrode 49, and a portion of the extension portion 49b corresponding to the cavity 43 constitute a vibration portion 61 of the liquid sensor 60. The center of the vibration portion 61 of the liquid sensor 60 is coincident with the center of the liquid sensor 60.

Further, the body portion 47a of the piezoelectric layer 47, the body portion 49a of the upper electrode 49, the body portion 46a of the lower electrode 46, and the vibratable portion of the vibration plate 42 (that is, the portion corresponding to the bottom portion 43a of the cavity 43) have circular shapes, and the whole of the piezoelectric layer 47, that is, the body portion 47a and the extension portion 47b of the piezoelectric layer 47 are disposed inside the region corresponding to the cavity 43. Thus, the vibration portion 61 of the liquid sensor 60 has substantially the symmetrical shape with respect to the center of the liquid sensor 60.

Further, the liquid sensor 60 according to this embodiment includes a flow path forming base portion 50 laminated on and connected to the first surface 40a of the vibration cavity forming base portion 40. The flow path forming base portion 50 is formed by laminating and connecting a flow path plate 51 and an exit/entrance plate 52.

An ink supply path (liquid supply path) 53 for supplying ink as a detection object to the cavity 43, and an ink discharge path (liquid discharge path) 54 for discharging the ink as the detection object from the cavity 43 are formed in the flow path forming base portion 50.

More specifically, a main portion 53a of the ink supply path 53 and a main portion 54a of the ink discharge path 54 are formed in the flow path plate 51, and an entrance 53b of the ink supply path 53 and an exit 54b of the ink discharge path 54 are formed in the exit/entrance plate 52.

Besides, the entrance 53b of the ink supply path 53 is disposed outside the region corresponding to the cavity 43. On the other hand, the exit 54b of the ink discharge path 54 is formed to be aligned with the region corresponding to the cavity 43 and to match the outer peripheral shape of the cavity 43.

Members included in the liquid sensor 60, especially the cavity plate 41, the vibration plate 42, the flow path plate 51, and the exit/entrance plate 52 are formed of the same material and are mutually sintered, so that they are integrally formed. As stated above, the plural substrates are sintered and integrated, so that the handling of the liquid sensor 60 becomes easy. Besides, the respective members are formed of the same material, so that the occurrence of a crack due to a difference in linear expansion coefficient can be prevented.

As the material of the piezoelectric layer 47, it is preferable to use lead zirconate titanate (PZT), lead lanthanum zirconate titanate (PLZT), or lead-less piezoelectric film not using lead. As the material of the cavity plate 41, it is preferable to use zirconia or alumina. Besides, as the vibration plate 42, it is preferable to use the same material as the cavity plate 41. As the upper electrode 49, the lower electrode 46, the upper electrode terminal 45, and the lower electrode terminal 44, it is possible to use a material having conductivity, for example, a metal such as gold, silver, copper, platinum, aluminum, or nickel.

FIG. 4 shows an ink cartridge (liquid container) 70 to which the liquid sensor 60 is mounted, and the ink cartridge 70 includes a container body 72 having an ink outlet port (liquid outlet port) 71 for sending ink stored in the inside to the outside.

The whole of the liquid sensor 60 is mounted to the outside of the container body 72, and an entrance side opening 73 communicating with the entrance 53b of the ink supply path 53 of the liquid sensor 60 and an exit side opening 74 communicating with the exit 54b of the ink discharge path 54 are formed to pass through a container wall of the container body 72.

The inside of the container body 72 is divided into a main reservoir chamber (first chamber) 75 constituting a main portion of the whole inner space of the container body 72 and a sub reservoir chamber (second chamber) having a volume smaller than the main reservoir chamber 75, and the main reservoir chamber 75 and the sub reservoir chamber 76 are separated from each other. The sub reservoir chamber 76 is positioned at a side closer to the ink outlet port 71 than the main reservoir chamber 75 in the direction of flow of the ink at the time of ink consumption, and communicates with the ink outlet port 71.

The exit side opening 74 formed in the container wall of the container body 72 communicates with the upper end portion of the sub reservoir chamber 76. As stated above, the exit 54b of the ink discharge path 54 of the liquid sensor 60 is connected to the exit side opening 74.

A sealed auxiliary flow path 77 is formed in the inside of the main reservoir chamber 75, and an auxiliary flow path entrance 77a is formed at the lower end side of the auxiliary flow path 77. The auxiliary flow path entrance 77a is positioned at the lower end of the inside of the main reservoir chamber 75. Besides, the entrance side opening 73 formed in the container wall of the container body 72 communicates with the upper end portion of the auxiliary flow path 77, and the entrance side opening 73 constitutes the exit of the auxiliary flow path 77.

As described above, the entrance 53b of the ink supply path 53 of the liquid sensor 60 communicates with the entrance side opening 73, and the exit 54b of the ink discharge path 54 communicates with the exit side opening 74. By this, the ink supply path 53 and the ink discharge path 54 of the liquid sensor 60 form a connecting flow path to connect the main reservoir chamber 75 and the sub reservoir chamber 76.

When the ink in the ink cartridge 70 is consumed, the ink in the main reservoir chamber 75 flows from the auxiliary flow path entrance 77a into the auxiliary flow path 77, and flows to the entrance side opening 73 through the auxiliary flow path 77. The ink flowing out from the entrance side opening 73 flows into the ink supply path 53 from the entrance 53b of the ink supply path 53 of the liquid sensor 60, and flows out from the exit 54b of the ink discharge path 54 through the cavity 43 and the ink discharge path 54. The ink flowing out from the exit 54b of the ink discharge path 54 flows into the sub reservoir chamber 76 through the exit side opening 74. The ink flowing into the sub reservoir chamber 76 is supplied to the recording head 12 of the ink jet recording apparatus through the ink outlet port 71.

As stated above, in this embodiment, the whole amount of ink sent to the ink outlet port 71 through the sub reservoir chamber 76 previously passes through the ink supply path 53 and the ink discharge path 54 of the liquid sensor 60.

In the ink cartridge 70 including the foregoing liquid sensor 60, in the case where the ink sufficiently remains in the container body 72, and the inside of the sub reservoir chamber 76 is filled with the ink, the inside of the cavity 43 is filled with the ink. On the other hand, when the liquid in the container body 72 of the ink cartridge 7 is consumed, and the ink in the main reservoir chamber 75 disappears, the liquid surface in the sub reservoir chamber 76 is lowered, and when the liquid surface becomes lower than the position of the cavity 43 of the liquid sensor 60, there occurs a state where the ink does not exist in the cavity 43.

Then, the liquid sensor 60 detects a difference of acoustic impedance due to the change of this state. By this, the liquid sensor 60 can detect a state where the ink sufficiently remains in the container body 72, or a state where a certain amount of ink or more has been consumed.

More specifically, in the liquid sensor 60, a voltage is applied between the upper electrode 49 and the lower electrode 46 through the upper electrode terminal 45 and the lower electrode terminal 44. Then, an electric field is generated in a portion of the piezoelectric layer 47 sandwiched between the upper electrode 49 and the lower electrode 46. The piezoelectric layer 47 is deformed by this electric field. The piezoelectric layer 47 is deformed, so that flexural vibration occurs in the vibration region (region corresponding to the bottom portion 43a of the cavity 43) of the vibration plate 42. After the piezoelectric layer 47 is forcibly deformed in this way, when the application of the voltage is released, the flexural vibration remains in the vibration portion 61 of the liquid sensor 60 for a while.

The residual vibration is the free vibration of the vibration portion 61 of the liquid sensor 60 and the medium in the cavity 43. Accordingly, when the voltage applied to the piezoelectric layer 47 is made to have a pulse waveform or a rectangular wave, a resonant state between the vibration portion 61 and the medium after the voltage is applied can be easily obtained. This residual vibration is the vibration of the vibration portion 61 of the liquid sensor 60, and is accompanied with deformation of the piezoelectric layer 47. Thus, the piezoelectric layer 47 generates counter electromotive force by the residual vibration. This counter electromotive force is detected through the upper electrode 49, the lower electrode 46, the upper electrode terminal 45 and the lower electrode terminal 44. Since the resonant frequency is specified by the counter electromotive force detected in this way, the existence of the ink in the container body 72 of the ink cartridge 7 can be detected on the basis of the resonant frequency.

Figure 5A:
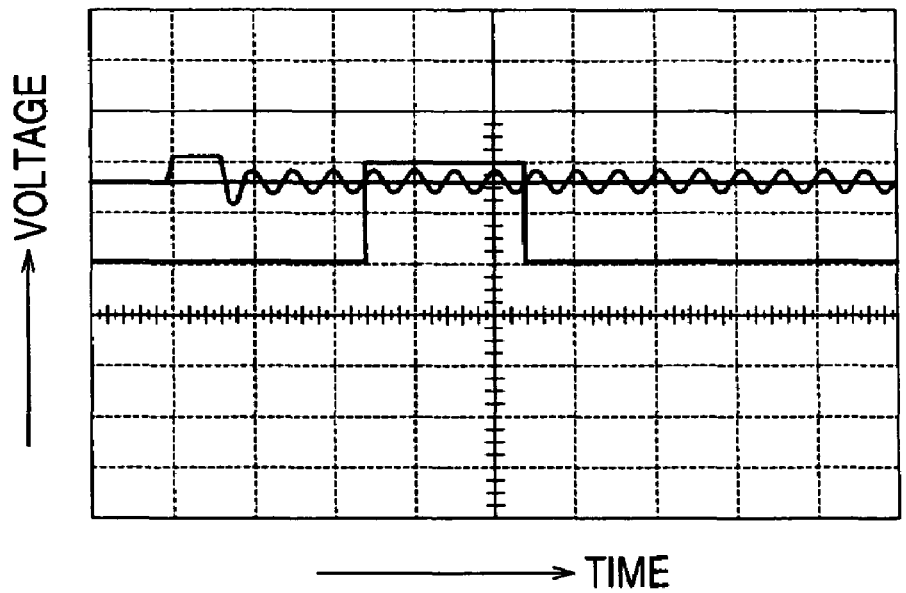
Figure 5B:
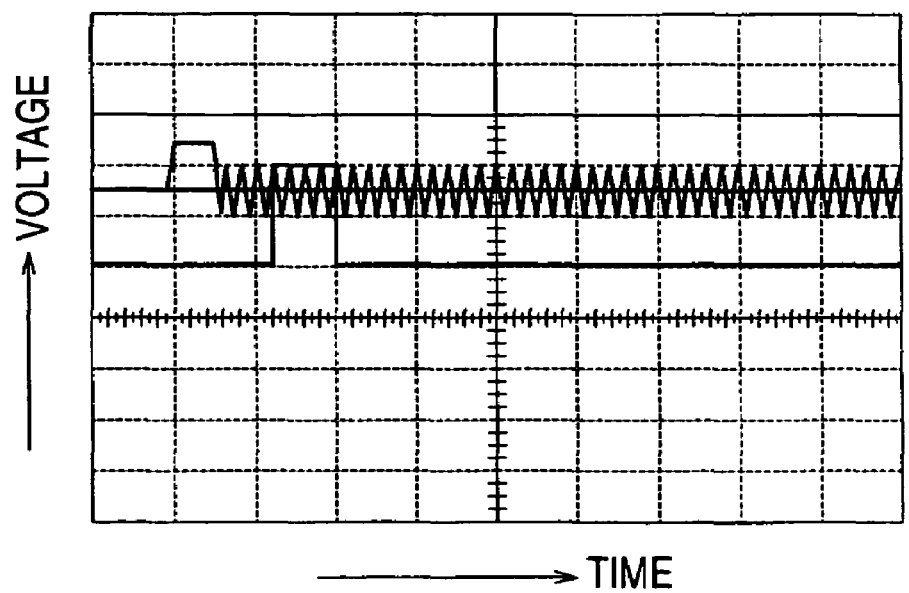

FIGS. 5A and 5B show waveforms of residual vibration (free vibration) of the vibration portion 61 of the liquid sensor 60 and a measurement method of the residual vibration in the case where a drive signal is supplied to the liquid sensor 60 to forcibly vibrate the vibration portion 61. FIG. 5A shows the waveform at the time when ink exists in the cavity 43 of the liquid sensor 60, whereas FIG. 5B shows the waveform when ink does not exist in the cavity 43 of the liquid sensor 60.

In FIGS. 5A and 5B, the vertical axis indicates the voltage of the drive pulse applied to the liquid sensor 60 and the counter electromotive force generated by the residual vibration of the vibration portion 61 of the liquid sensor 60, and the horizontal axis indicates the elapsed time. The waveform of an analog signal of voltage is generated by the residual vibration of the vibration portion 61 of the liquid sensor 60. Next, the analog signal is converted (binarization) into digital numerical values corresponding to the frequency of the signal. In the example shown in FIGS. 5A and 5B, a time when four pulses of from the fourth pulse to eighth pulse of the analog signal are generated is measured.

In more detail, after the drive pulse is applied to the liquid sensor 60 to forcibly vibrate the vibration portion 61, the number of times the voltage waveform by the residual vibration crosses a previously set reference voltage from a low voltage side to a high voltage side is counted. Then, a digital signal in which a portion between the fourth count and the eighth count is made High is generated, and the time from the fourth count to the eighth count is measured with a predetermined clock pulse.

When FIG. 5A and FIG. 5B are compared with each other, it is understood that the time from the fourth count to the eight count in FIG. 5A is longer than that in FIG. 5B. In other words, a required time from the fourth count to the eighth count varies according to the existence of ink in the cavity 43 of the liquid sensor 60. By using the difference of the required time, the consumed state of ink can be detected.

The counting is started from the fourth count of the analog waveform in order to start the measurement after the residual vibration (free vibration) of the liquid sensor 60 becomes stable. The fourth count is merely one example, and the counting may be started from an arbitrary count. Here, the signals from the fourth count to the eighth count are detected, and the time from the fourth count to the eighth count is detected with the predetermined clock pulse. The resonant frequency can be obtained on the basis of this time. With respect to the clock pulse, it is not necessary to measure the time up to the eighth count, and the counting may be made up to an arbitrary count.

In FIG. 5, although the time from the fourth count to the eighth count is measured, a time in a different count interval may be detected in accordance with a circuit structure to detect the frequency. For example, in the case where the quality of ink is stable, and the change in peak amplitude is small, in order to raise the speed of detection, the resonant frequency may be obtained by detecting a time from the fourth count to the sixth count. Besides, in the case where the quality of ink is unstable, and the change in pulse amplitude is large, in order to accurately detect the residual vibration, a time from the fourth count to the twelfth count may be detected.

As stated above, in the liquid sensor 60 according to this embodiment, with respect to whether the liquid surface passes the mount position level (strictly, the position of the cavity 43) of the liquid sensor 60, it can be detected by the change of the frequency or the change of the amplitude of the residual vibration after the vibration portion 61 of the liquid sensor 60 is forcibly vibrated.

As described above, in the liquid sensor 60 according to this embodiment, the supply of ink to the cavity 43 is performed through the ink supply path 53, and the discharge of ink from the cavity 43 is performed through the ink discharge path 54. Then, when the liquid sensor 60 is mounted to the ink cartridge 70, the cavity 43 of the liquid sensor 60 is not exposed in the ink containing space in the container body 72 of the ink cartridge 70, and ink in the container body 72 can be supplied to the cavity 43 through the ink supply path 53.

Thus, at the time of consumption of ink in the ink cartridge 70, the ink is made to flow through the inside of the ink supply path 53 and the ink discharge path 54 of the liquid sensor 60, so that even if an air bubble enters the inside of the cavity 43, the air bubble is pushed out from the inside of the cavity 43 by the flow of the ink. By this, it is possible to prevent the erroneous detection of the liquid sensor 60 due to the staying of the air bubble in the cavity 43.

Besides, in the liquid sensor 60 according to this embodiment, since it is unnecessary that the cavity 43 is exposed in the ink containing space in the container body 72, it is possible to prevent a meniscus from being formed in the cavity 43 at the time of passing of the liquid surface. By this, it is possible to prevent the erroneous detection of the liquid sensor 60 due to remainder of ink in the cavity 43.

Besides, in the liquid sensor 60 according to this embodiment, since the entrance 53b of the ink supply path 53 is disposed outside the region corresponding to the cavity 43, a work operation at the time when the liquid sensor 60 is mounted to the predetermined position of the container body 72 becomes easy.

Besides, in the liquid sensor 60 according to this embodiment, since the exit 54b of the ink discharge path 54 is formed to be aligned with the region corresponding to the cavity 43, the air bubble entering the cavity 43 can be certainly discharged.

Besides, in the ink cartridge 70 according to this embodiment, the inside of the container body 72 is divided into the main reservoir chamber 75 and the sub reservoir chamber 76 separated from each other, the main reservoir chamber 75 and the sub reservoir chamber 76 are connected to each other through the ink supply path 53 and the ink discharge path 54 of the liquid sensor 60, and the cavity 43 of the liquid sensor 60 is disposed at the upper end portion of the sub reservoir chamber 76.

Thus, since the time point when the ink in the main reservoir chamber 75 disappears can be certainly detected by the liquid sensor 60, it is possible to notify the user that the ink end is approaching. Further, on the basis of the previously known amount of ink in the sub reservoir chamber 76, it is possible to notify the user of the number of sheets which can be printed with the remaining ink, and it is possible to prevent that the ink disappears at a midpoint of one page and the print sheet is wasted.

Besides, in the ink cartridge 70 according to this embodiment, the sealed auxiliary flow path 77 is formed in the inside of the main reservoir chamber 75, the auxiliary flow path entrance 77a of the auxiliary flow path 77 is positioned at the lower end of the main reservoir chamber 75, and the entrance 53b of the ink supply path 53 of the liquid sensor 60 is made to communicate with the upper end portion of the auxiliary flow path 77. Thus, an air bubble generated in the main reservoir chamber 75 is not easily enter the inside of the auxiliary flow path 77, and it is possible to prevent the air bubble from entering the cavity 43 of the liquid sensor 60.

Further, in the ink cartridge 70 according to this embodiment, since the inside of the sub reservoir chamber 76 is in the state where it is filled with ink until all the ink in the main reservoir chamber 75 is used up, even in the case where vibration is applied to the ink cartridge 70, as long as the ink remains in the main reservoir chamber 75, the liquid surface is not swayed in the sub reservoir chamber 76. Accordingly, it is possible to prevent that the liquid sensor 60 makes an erroneous detection due to the sway of the liquid surface.

Besides, in the liquid sensor 60 according to the embodiment, since the range where the vibration portion 61 comes in contact with the liquid is limited to the range where the cavity 43 exists, it is possible to perform the detection of liquid with pinpoint accuracy, and by this, the ink level can be detected with high accuracy.

Besides, since substantially the whole of the region corresponding to the cavity 43 is covered with the main portion 46a of the lower electrode 46, the difference between the deformation mode at the time of forcible vibration and the deformation mode at the time of free vibration becomes small. Besides, since the vibration portion 61 of the liquid sensor 60 has the symmetrical shape with respect to the center of the liquid sensor 60, the rigidity of this vibration portion 61 becomes substantially isometric when viewed from the center.

Thus, the occurrence of unnecessary vibration which can be generated by the asymmetry of the structure is suppressed, and the output reduction of counter electromotive force due to the difference of deformation mode between the forcible vibration time and the free vibration time is prevented. By this, the detection accuracy of the resonant frequency of the residual vibration in the vibration portion 61 of the liquid sensor 60 is improved, and the detection of the residual vibration of the vibration portion 61 becomes easy.

Besides, since substantially the whole of the region corresponding to the cavity 43 is covered with the body portion 46a of the lower electrode 46 larger than the cavity 43, the occurrence of unnecessary vibration due to the position shift of the lower electrode 46 at the time of manufacture is prevented, and the lowering of detection accuracy can be prevented.

Besides, the whole of the hard and brittle piezoelectric layer 47 is disposed inside the region corresponding to the cavity 43, and the piezoelectric layer 47 does not exist at the position corresponding to the periphery 43a of the cavity 43. Thus, there is no problem of crack of the piezoelectric film at the position corresponding to the periphery of the cavity.

Next, a liquid sensor according to another embodiment of the invention and an ink cartridge including the sensor will be described with reference to FIGS. 6 to 8.

In a liquid sensor 60A according to this embodiment, an exit 54b of an ink discharge path 54 is disposed at the outside position of a region corresponding to a cavity 43 and is disposed at the position opposite to an entrance 53b of an ink supply path 53 across the cavity 43.

Figure 8A:
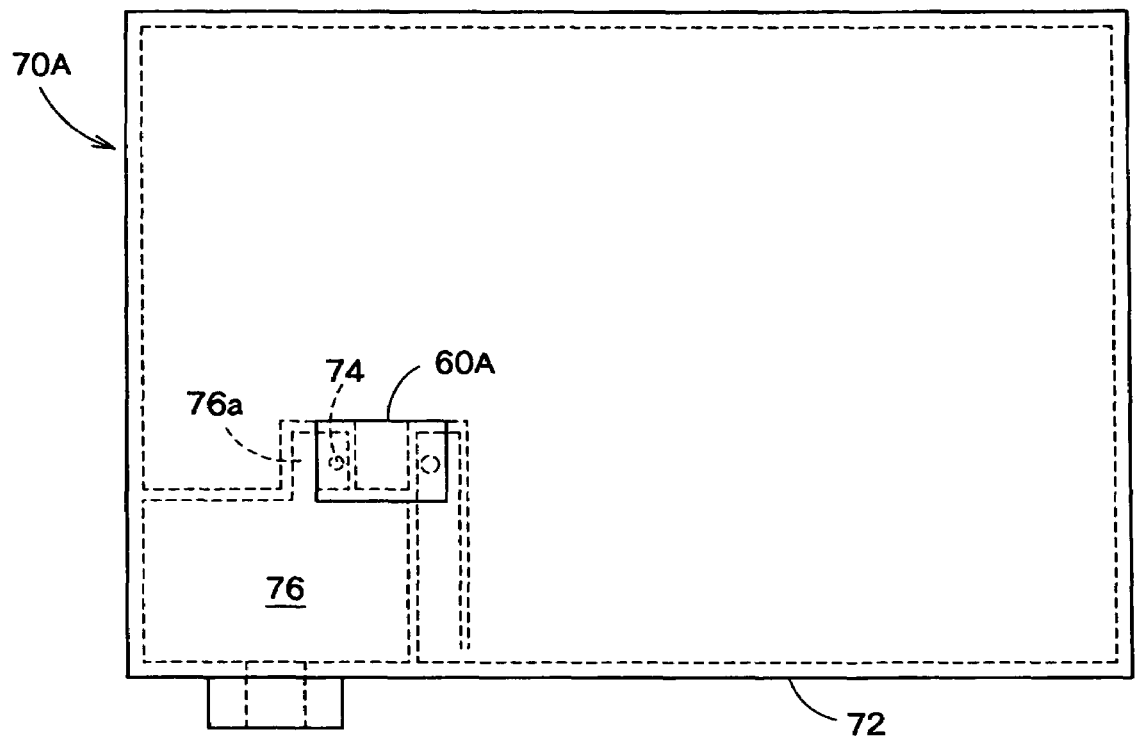
FIG. 8A is a side view of an ink cartridge including the liquid sensor shown in FIGS. 6A and 6B.

Further, as shown in FIG. 8A, in an ink cartridge 70A of this embodiment, a projecting portion 76a projecting upward is formed at an upper portion of a sub reservoir chamber 76 formed in the inside of a container body 72. An exit side opening 74 formed in a container wall of the container body 72 is formed at a position corresponding to the projecting portion 76a. That is, the exit 54b of the ink discharge path 54 of the liquid sensor 60A communicates with the projecting portion 76a of the sub reservoir chamber 76 through the exit side opening 74.

According to the embodiment having the above structure, almost the same effects as the foregoing embodiment can be obtained, and in the liquid sensor 60A, since the exit 54b of the ink discharge path 54 is disposed at the position opposite to the entrance 53b of the ink supply path 53 across the cavity 43, the interval between the entrance 53b and the exit 54b can be made large. Thus, a work operation at the time when the liquid sensor 60 is mounted at a predetermined position of the container body 72 of the ink cartridge 70 becomes further easy.

Figure 7A:
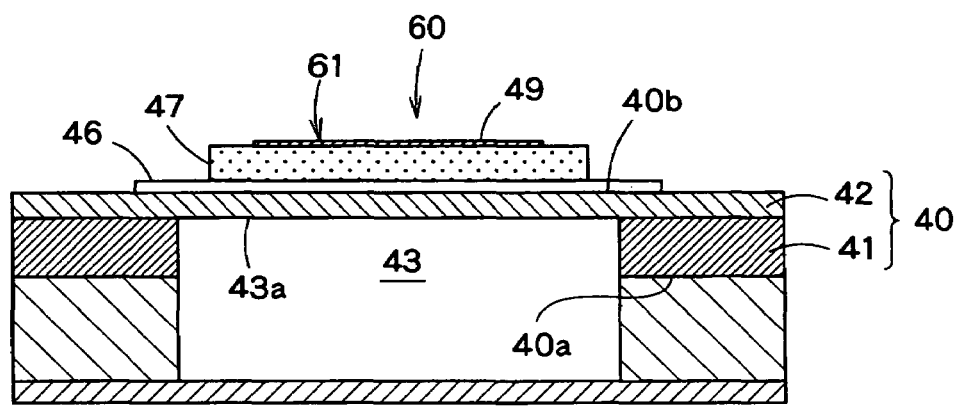
Figure 7B:
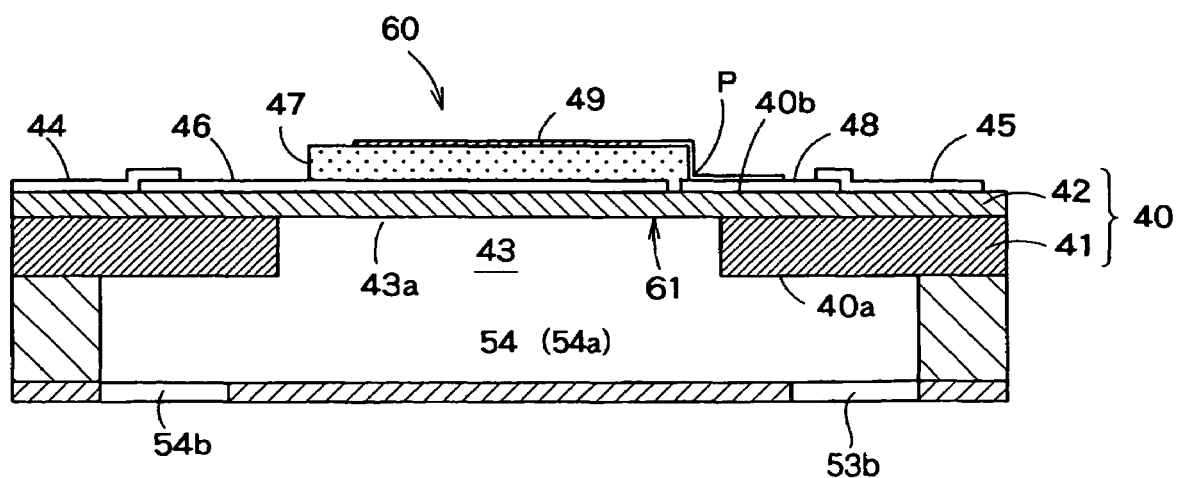
Figure 8B:
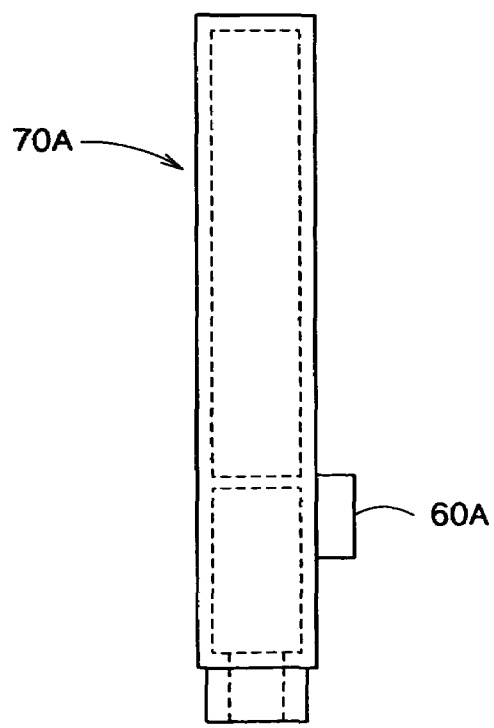
FIG. 8B is a front view thereof.
Figure 10:
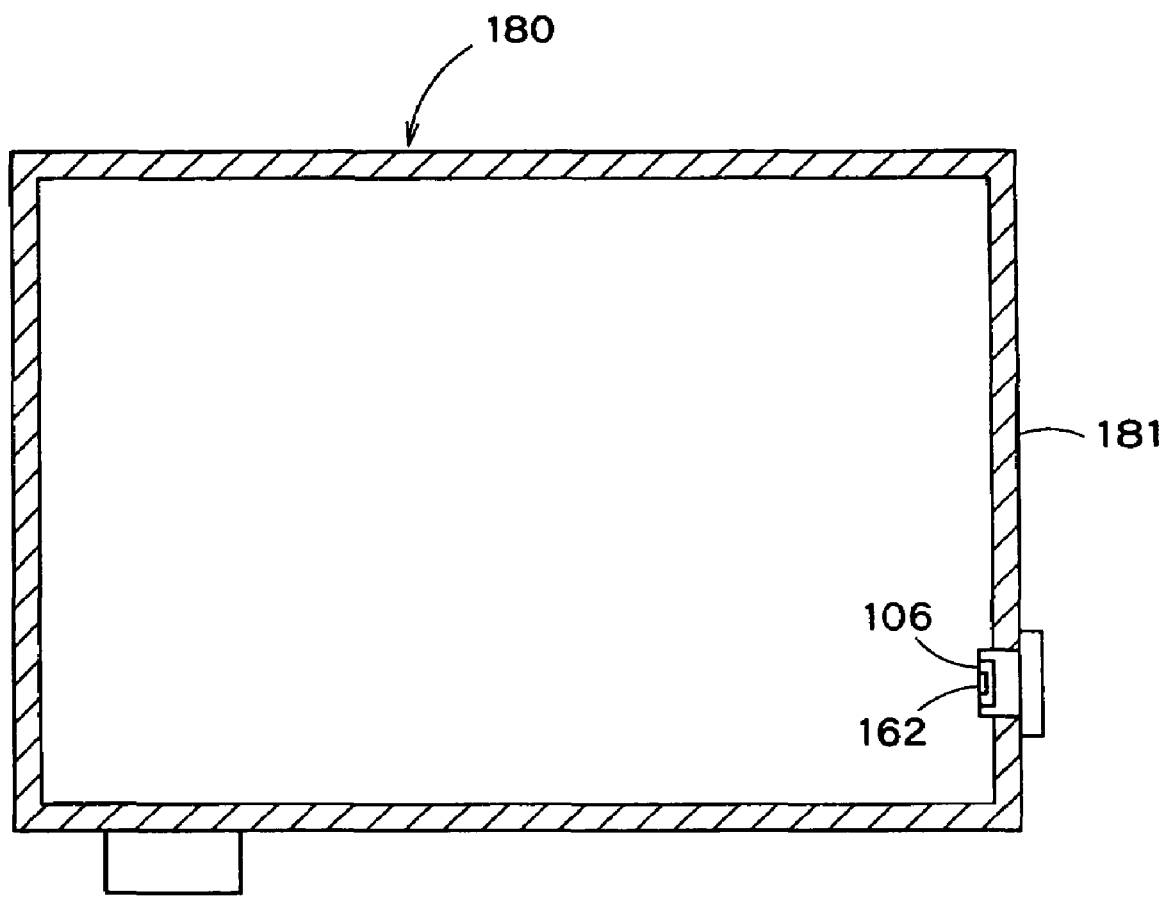
FIG. 10 is a sectional view of an ink cartridge including the liquid sensor disclosed in JP-A-2001-146024.
Figure 11:
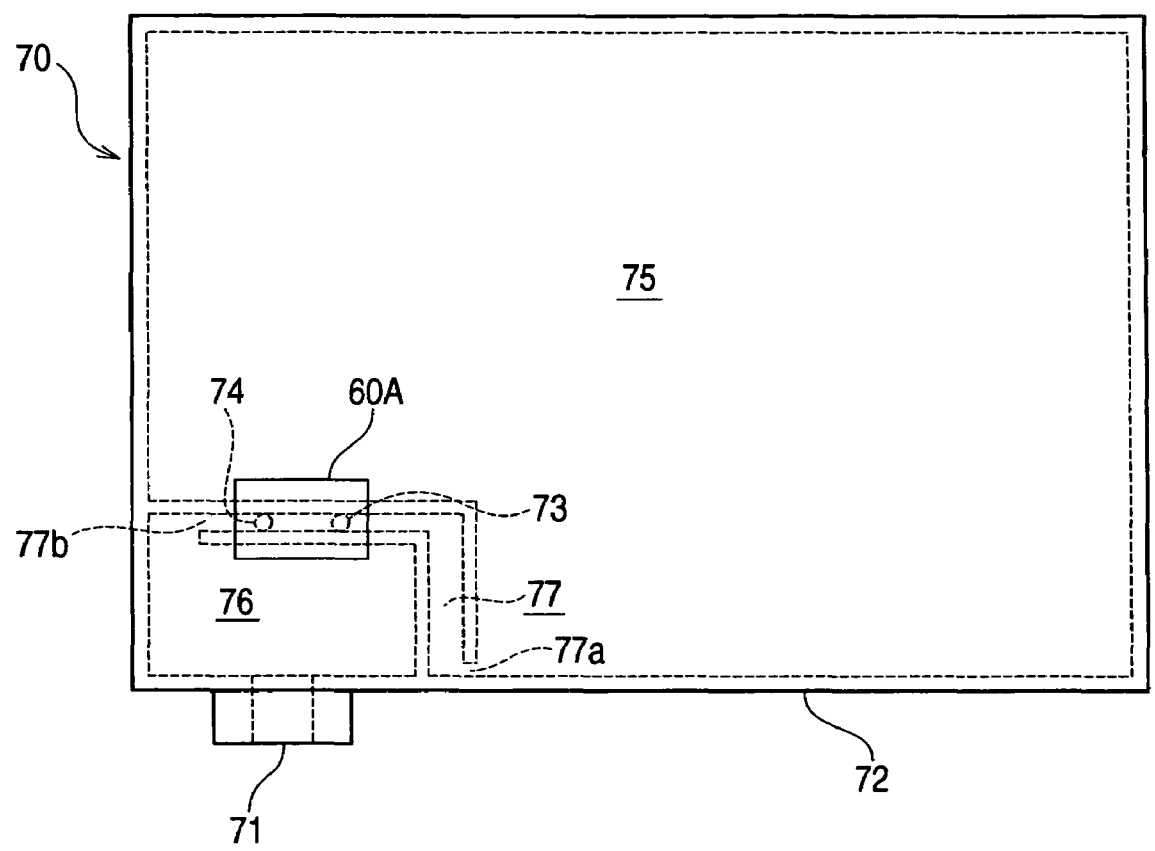
FIG. 11 is a side view showing an ink cartridge comprising a liquid sensor according to another embodiment of the invention.

While the first chamber 75 and the second chamber 76 which are separated from each other are constituted to communicate through the entrance side opening 73, the liquid sensor 60 and the exit side opening 74 in the examples shown in FIGS. 4 and 8, the invention is not restricted to this structure. For example, the liquid sensor according to the invention may be attached to a container body formed in such a manner that the first chamber 75 and the second chamber 76 communicate with each other through an ink flow path. FIG. 11 shows an example in which the liquid sensor 60 described with reference to FIGS. 6 and 7 is thus attached to the container body, for instance.

In the example of FIG. 11, the container body 72 has the first chamber 75, the second chamber 76, and an auxiliary flow path 77 for causing the first chamber 75 to communicate with the second chamber 76. The auxiliary flow path 77 has an auxiliary flow path entrance 77a for opening to the first chamber 75 and an auxiliary flow path exit 77b for opening to the second chamber 76. Each of the entrance side opening 73 and the exit side opening 74 is provided to communicate with the auxiliary flow path 77 in a position between the auxiliary flow path entrance 77a and the auxiliary flow path exit 77b. While each of the entrance side opening 73 and the exit side opening 74 is provided in the horizontal portion of the auxiliary flow path 77 in this example, it may be provided in the vertical portion of the auxiliary flow path 77.

A liquid sensor 60A is attached to the container body 72 in such a manner that the entrance 53b and the exit 54b in the liquid sensor 60 are connected to the entrance side opening 73 and the exit side opening 74, respectively.

When an ink in the ink cartridge 70 is consumed, an ink in the first chamber 75 flows into the second chamber 76 through the auxiliary flow path 77. With the ink flow generated in the auxiliary flow path 77, an ink flow is generated also in the liquid sensor 60 provided in parallel with the auxiliary flow path 77. More specifically, a part of the ink flowing in the auxiliary flow path 77 flows into the cavity 43 through the opening 73 and the entrance 53b, and furthermore, the ink in the cavity 43 flows to the auxiliary flow path 77 through the exit 54b and the opening 74. When the ink in the first chamber 75 is gone so that a liquid level in the second chamber 76 is reduced, moreover, the ink in the auxiliary flow path 77 is also gone. Also in the example, therefore, it is possible to detect a state in which the ink is consumed in a certain amount or more.

Figure 12:
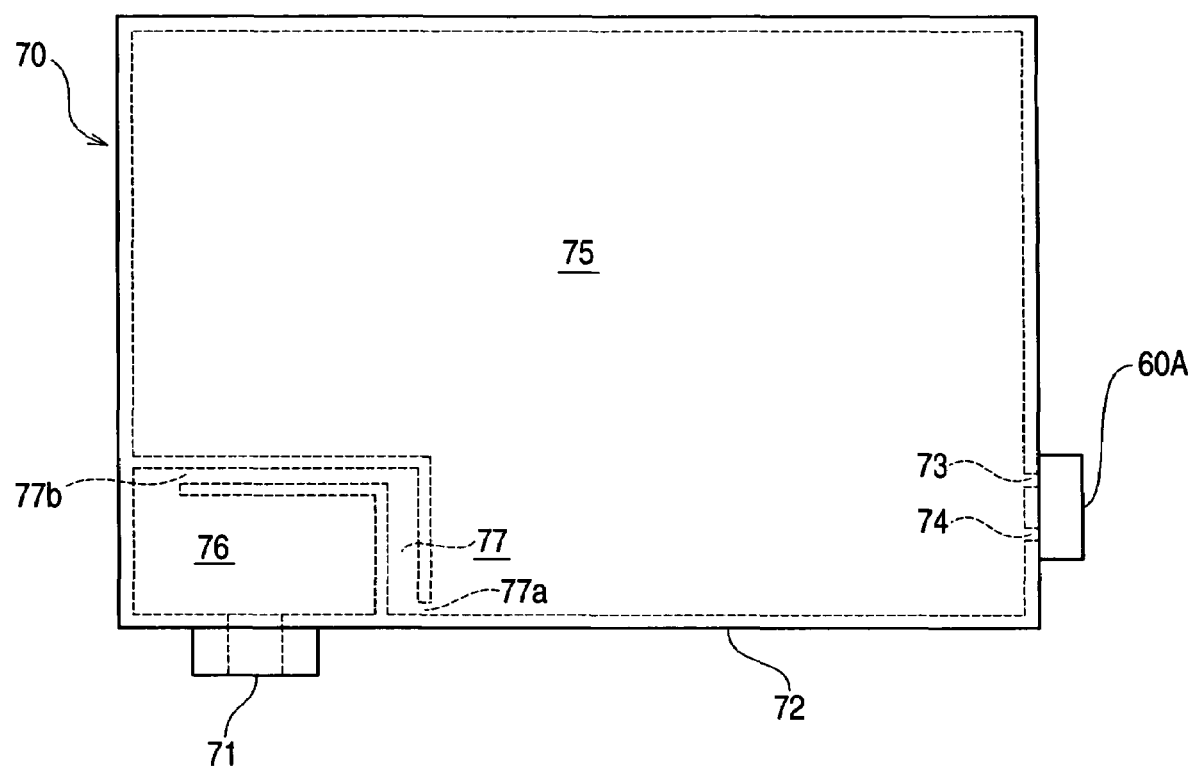
FIG. 12 is a side view showing an ink cartridge comprising a liquid sensor according to a further embodiment of the invention.
Figure 13:
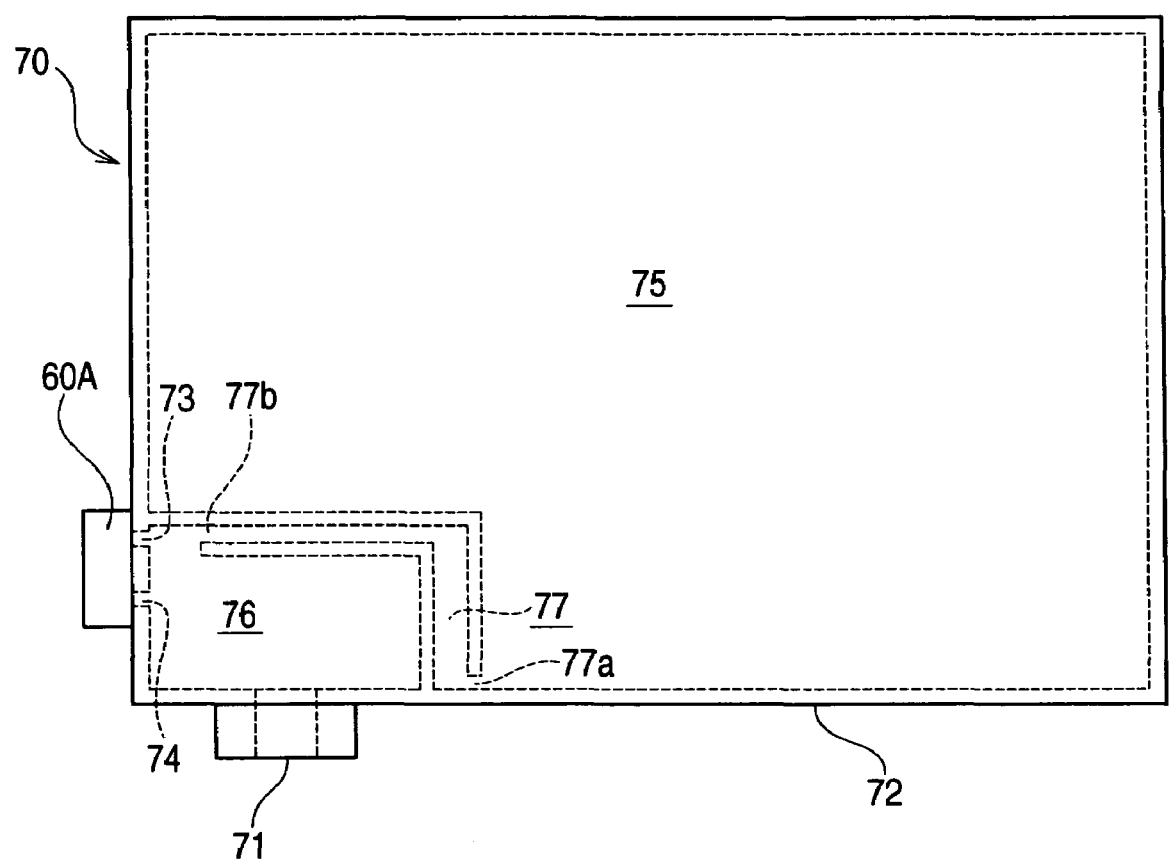
FIG. 13 is a side view showing an ink cartridge comprising a liquid sensor according to a further embodiment of the invention.

While the liquid sensor 60 is provided across the first chamber 75 and the second chamber 76 in the examples shown in FIGS. 4 and 8, the invention is not restricted thereto. For example, the liquid sensor according to the invention may be provided to face only the first chamber 75, and furthermore, may be provided to face only the second chamber 76. FIG. 12 shows an example in which the liquid sensor 60 described with reference to FIGS. 6 and 7 is attached to the liquid container so as to face the first chamber 75. Moreover, FIG. 13 shows an example in which the liquid sensor 60 described with reference to FIGS. 6 and 7 is attached to the liquid container so as to face the second chamber 76. In the examples of FIGS. 12 and 13, the opening 74 (and the exit 54b) is(are) disposed under the opening 73 (and the entrance 53b) in the direction of a gravity. Therefore, these examples also have an advantage that the discharging property of an ink from the cavity 43 is excellent. The internal space of the container body 72 does not need to be divided into two chambers, that is, the first chamber 75 and the second chamber 76 or may be divided into three chambers or more, which is not shown.

Next, a liquid sensor according to another embodiment of the invention and an ink cartridge comprising the sensor will be described with reference to FIGS. 14 to 17.

While the flow path forming base portion 50 is constituted by the flow path plate 51 and the exit/entrance plate 52 in the embodiments as shown typically in FIGS. 3 and 7, the exit/entrance plate 52 is not used but the flow path plate 51 itself is utilized for the flow path forming base portion 50 according to the embodiment.

Figure 14A:
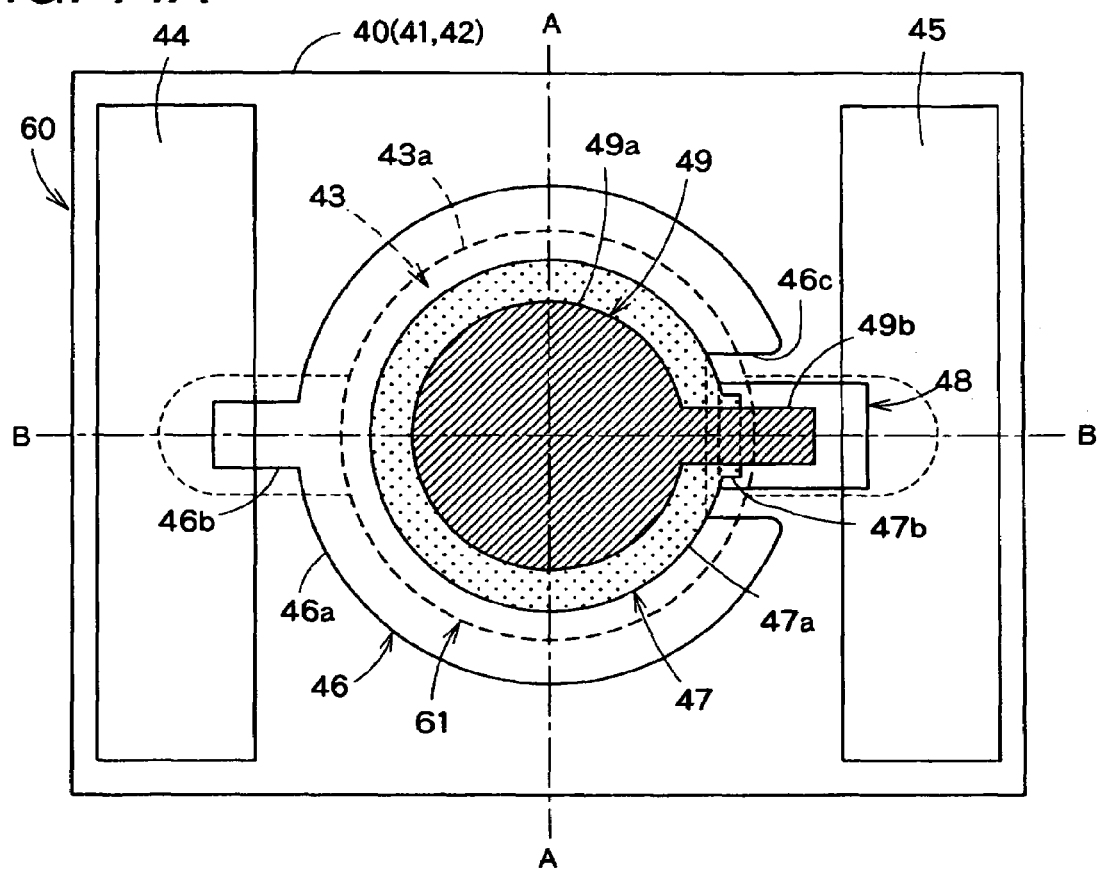
FIG. 14A is a plan view showing a liquid sensor according to a further embodiment of the invention.
Figure 14B:
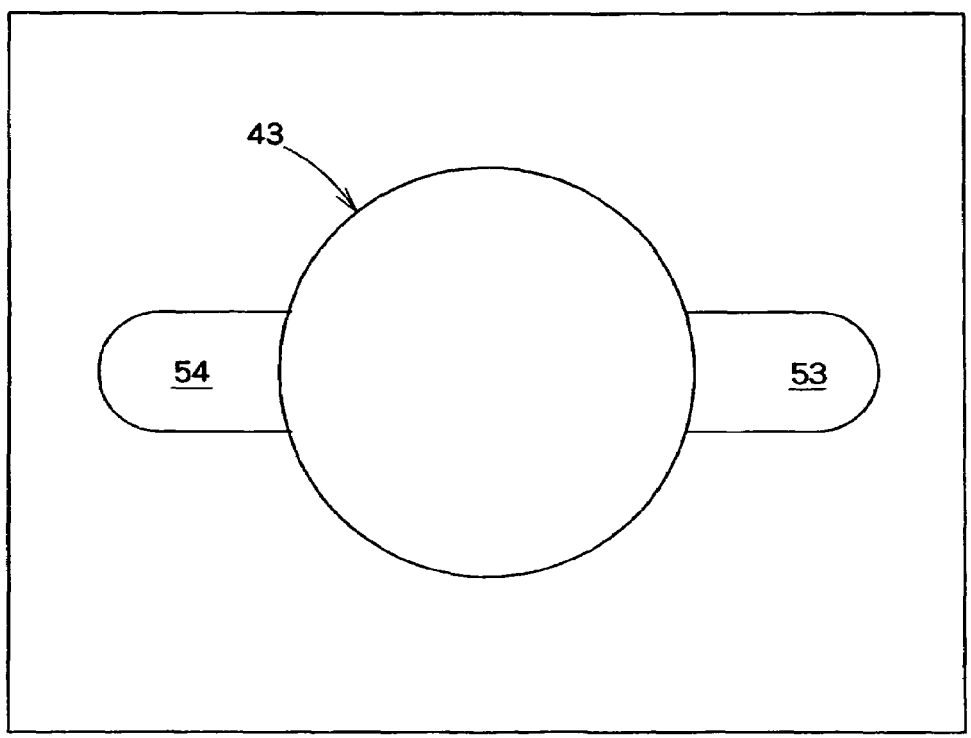
FIG. 14B is a bottom view showing the same.
Figure 15A:
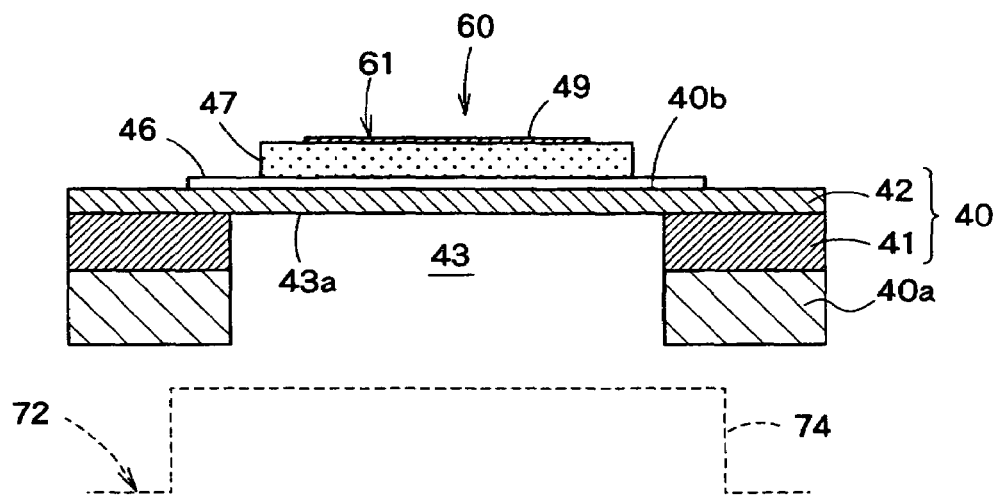
FIGS. 15A and 15B are sectional views showing the liquid sensor illustrated in FIGS. 14A and 14B, FIG. 15A being a sectional view taken along an A-A line in FIG. 14A and FIG. 15B being a sectional view taken along a B-B line in FIG. 14A.
Figure 15B:
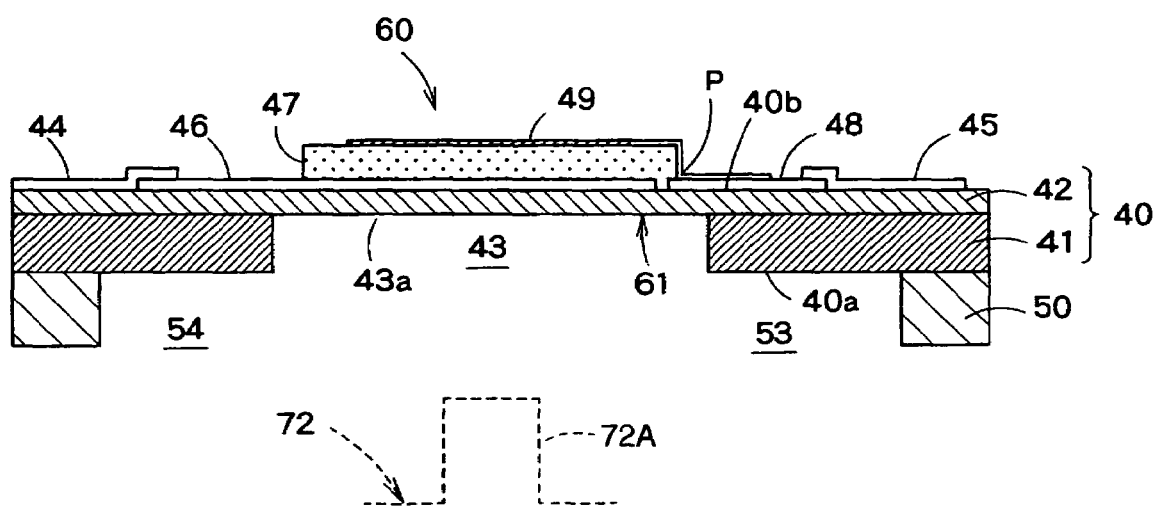

More specifically, the flow path forming base portion 50 laminated on and bonded to a first surface 40a of a vibration cavity forming base portion 40 is provided with an ink supply groove (a liquid supply groove) 53 for supplying an ink to be a detecting object to a cavity 43 and an ink discharge groove (a liquid discharge groove) 54 for discharging the ink to be the detecting object from the cavity 43 as shown in FIGS. 14 and 15. The ink supply groove 53 and the ink discharge groove 54 are provided excluding a region corresponding to the cavity 43 in a position in which they are opposed to each other with the cavity 43 interposed therebetween.

Figure 16A:
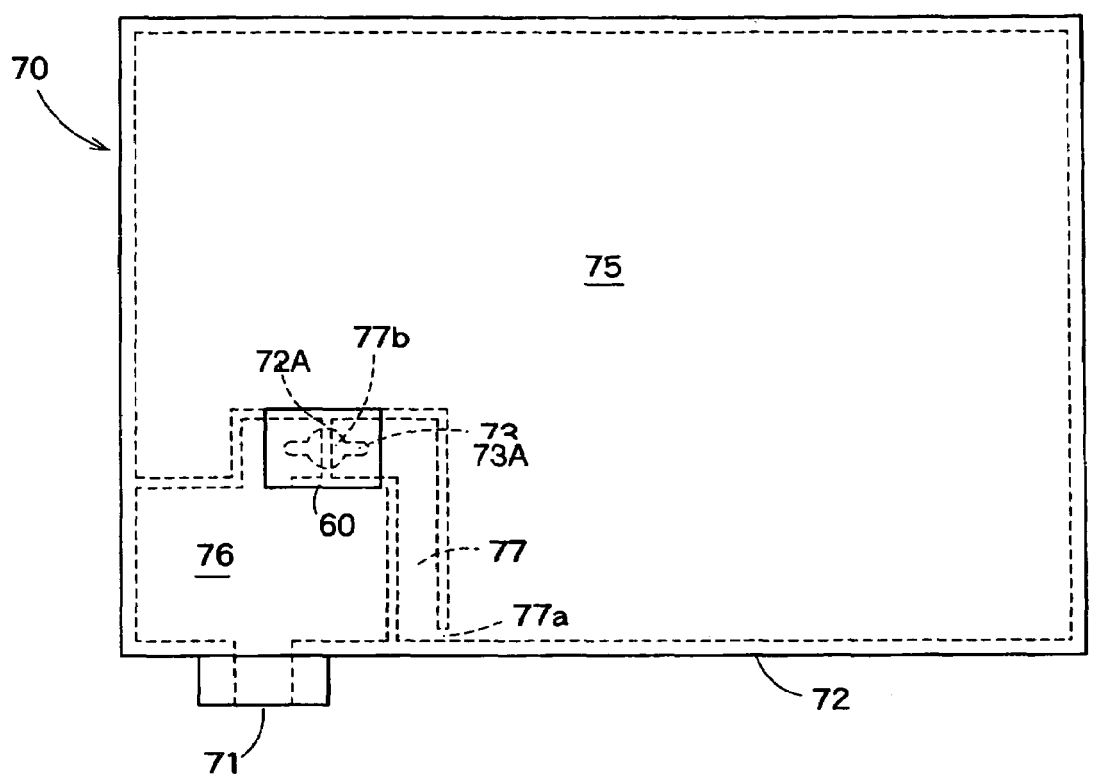
FIG. 16A is a side view showing an ink cartridge comprising the liquid sensor illustrated in FIGS. 14A and 14B.
Figure 16B:
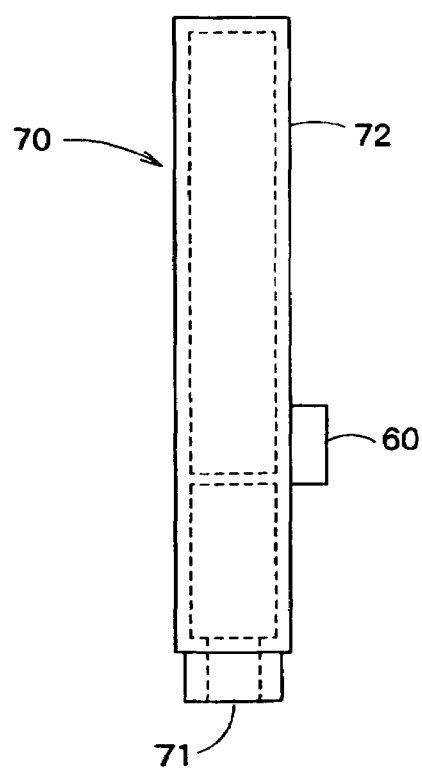
FIG. 16B is a front view showing the same.

FIG. 16 shows an ink cartridge (a liquid container) 70 to which the liquid sensor 60 is attached.

The whole liquid sensor 60 is attached to the outside of a container body 72, and an ink communication opening (a liquid communication opening) 73A for communicating with the ink supply groove 53, the cavity 43 and the ink discharge groove 54 in the liquid sensor 60 is formed to penetrate through the container wall of the container body 72. More specifically, while the entrance side opening 73 and the exit side opening 74 are formed on the container wall of the container body 72 in the embodiments, the single ink communication opening 73A is formed on the container wall of the container body 72 in the embodiment.

Figure 17:
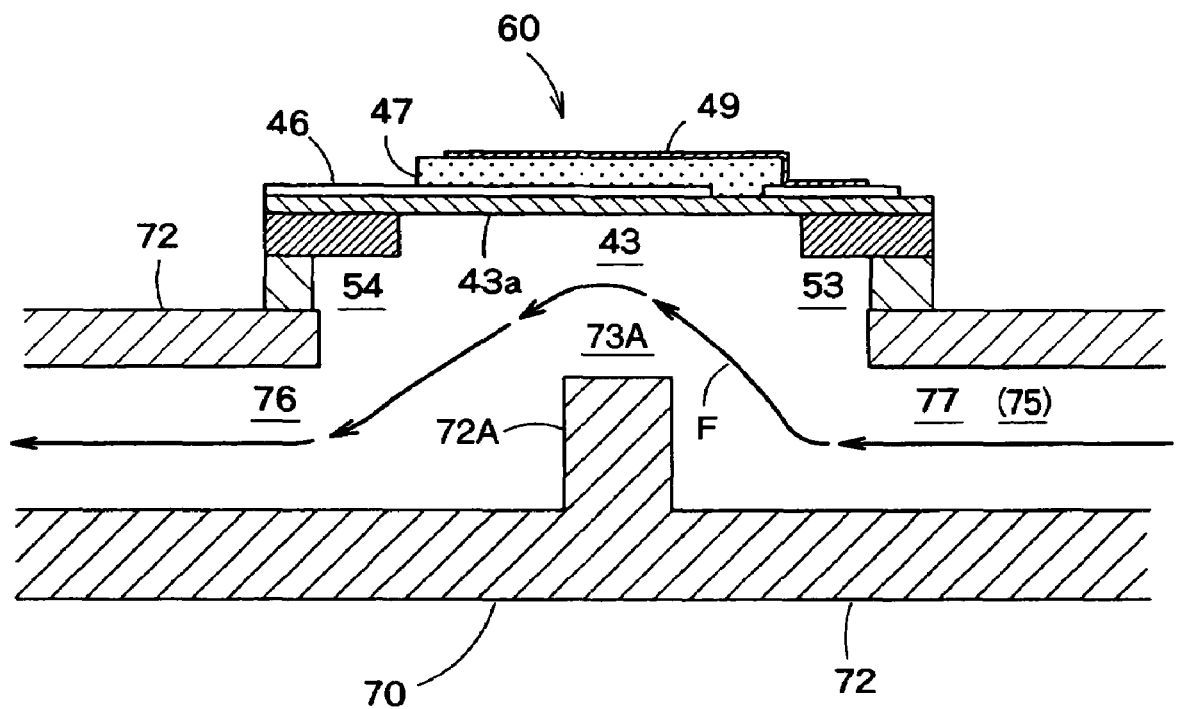
FIG. 17 is a sectional view showing the enlarged main part of the ink cartridge illustrated in FIGS. 16A and 16B.

On the other hand, in an ink cartridge 70 according to the embodiment shown in FIG. 17, a liquid flow restricting portion 72A is provided on the internal wall surface of the container body 72 so as to protrude toward the cavity 43. As shown in a broken line in FIG. 15A, the liquid flow restricting portion 72A has a length in a longitudinal direction which is greater than the diameter of the cavity 43.

The liquid flow restricting portion 72A restricts the flow of an ink in the container body 72 when the ink is consumed, and generates an ink flow F turned toward the cavity 43. More specifically, in the embodiment, the liquid flow restricting portion 72A is provided so that the ink communication opening 73A can be caused to function as the entrance side opening (ink supply port) 73 for supplying the ink to be the detecting object to the cavity 43 and the exit side opening (ink discharge port) 74 for discharging the ink to be the detecting object from the cavity 43.

As is apparent from FIG. 16, a part of the ink communication opening 73A communicates with the upper end of an auxiliary flow path 77 to form an auxiliary flow path exit 77b of the auxiliary flow path 77. The liquid flow restricting portion 72A is provided in the vicinity of the auxiliary flow path exit 77b of the auxiliary flow path 77. Moreover, the liquid flow restricting portion 72A is provided on a boundary between a main reservoir chamber 75 and a sub reservoir chamber 76 at the upper end side of the sub reservoir chamber 76.

As is apparent from FIG. 17, the ink communication opening 73A provided on the container wall of the container body 72, the ink supply groove 53, the ink discharge groove 54 and the cavity 43 constitutes a connecting flow path for a connection between the auxiliary flow path 77 forming a part of the main reservoir chamber 75 and the sub reservoir chamber 76.

When the ink in the ink cartridge 70 according to the embodiment is to be consumed, the ink in the main reservoir chamber 75 flows from an auxiliary flow path entrance 77a into the auxiliary flow path 77, and flows toward the liquid flow restricting portion 72A through the auxiliary flow path 77. The flow of the ink is restricted by the liquid flow restricting portion 72A so that the flow of the ink is generated toward the direction of the cavity 43. The ink avoiding and getting over the liquid flow restricting portion 72A toward the cavity 43 side and flowing into the sub reservoir chamber 76 is supplied to a recording head 12 in an ink jet type recording apparatus through an ink outlet port 71.

In the liquid sensor 60 according to the embodiment, when the ink in the ink cartridge 70 is to be consumed, the flow of the ink toward the cavity 43 is generated by the flow path restricting portion 72A. Even if a bubble enters the cavity 43, therefore, it is pushed out of the cavity 43 by the flow of the ink. Consequently, it is possible to prevent the erroneous detection of the liquid sensor 60 from being caused by the bubble staying in the cavity 43.

Moreover, the generation of the flow of the ink toward the cavity 43 can prevent a meniscus from being formed in the cavity 43 during a passage through a liquid level. Consequently, it is possible to prevent the erroneous detection of the liquid sensor 60 from being caused by the ink remaining in the cavity 43.

In the ink cartridge 70 according to the embodiment, moreover, the inner part of the container body 72 is divided into the main reservoir chamber 75 and the sub reservoir chamber 76 which are separated from each other, and furthermore, the main reservoir chamber 75 and the sub reservoir chamber 76 are connected to each other by means of the ink communication opening 73A provided on the container wall of the container body 72, the ink supply groove 53, the ink discharge groove 54 and the cavity 43.

Therefore, a point of time that the ink in the main reservoir chamber 75 is gone can be detected reliably by means of the liquid sensor 60 and a user can be informed of a coming ink end. Furthermore, it is possible to inform the user of the number of sheets which can be printed with a residual ink based on the amount of the ink in the sub reservoir chamber 76 which is previously known. Thus, it is possible to prevent a printing paper from being wasted due to the complete consumption of the ink in the middle of a page.

In the ink cartridge 70 according to the embodiment, moreover, the closed auxiliary flow path 77 is formed in the main reservoir chamber 75 and the auxiliary flow path entrance 77a of the auxiliary flow path 77 is positioned on the lower end of the main reservoir chamber 75, and furthermore, the cavity 43 of the liquid sensor 60 is caused to communicate with the upper end of the auxiliary flow path 77. Therefore, the bubble generated in the main reservoir chamber 75 enters the auxiliary flow path 77 with difficulty and can be prevented from entering the cavity 43 of the liquid sensor 60.

In the ink cartridge 70 according to the embodiment, furthermore, the inner part of the sub reservoir chamber 76 is filled with an ink until the ink in the main reservoir chamber 75 is completely consumed. Also in the case in which a vibration is applied to the ink cartridge 70, therefore, a liquid level does not swing in the sub reservoir chamber 76 as long as the ink remains in the main reservoir chamber 75. Accordingly, it is possible to prevent the liquid sensor 60 from causing an erroneous detection due to the swing of the liquid level.

In the ink cartridge 70 according to the embodiment, moreover, the ink supply groove 53 and the ink discharge groove 54 are disposed opposite to each other on the outside of the region corresponding to the cavity 43. Consequently, it is possible to easily carry out an attaching work including an alignment in the attachment of the liquid sensor 60 to the container body 72.

According to the liquid sensor 60 in accordance with the embodiment, moreover, a range in which a vibration portion 61 comes in contact with a liquid is limited to a range in which the cavity 43 is present. Therefore, the detection of the liquid can be performed on a pinpoint. Consequently, it is possible to detect an ink level with high precision.

Moreover, almost the whole region corresponding to the cavity 43 is covered with a body portion 46a of a lower electrode 46. Therefore, a difference between a deformation mode in a forcible vibration and that in a free vibration is reduced. In addition, the vibration portion 61 of the liquid sensor 60 takes a symmetrical shape with respect to the center of the liquid sensor 60. Therefore, the rigidity of the vibration portion 61 is almost isotropic as seen from the center.

For this reason, it is possible to suppress the generation of an unnecessary vibration which might be caused by the asymmetry of a structure, and furthermore, to prevent a reduction in the output of a back electromotive force due to the difference between the deformation modes in the forcible vibration and the free vibration. Consequently, it is possible to enhance the precision in the detection of the resonant frequency of a residual vibration in the vibration portion 61 of the liquid sensor 60, and furthermore, to easily detect the residual vibration of the vibration portion 61.

Moreover, almost the whole region corresponding to the cavity 43 is covered with the body portion 46a of the lower electrode 46 having a larger diameter than the cavity 43. Therefore, it is possible to prevent an unnecessary vibration from being caused by the positional shift of the lower electrode 46 in a manufacture, thereby suppressing a reduction in the precision in the detection.

Furthermore, a whole hard and fragile piezoelectric layer 47 is provided in the region corresponding to the cavity 43 and the piezoelectric layer 47 is not present in a position corresponding to a peripheral edge 43a of the cavity 43. Therefore, a crack can be prevented from being generated on a piezoelectric film in the position corresponding to the peripheral edge of the cavity.

Figure 6A:
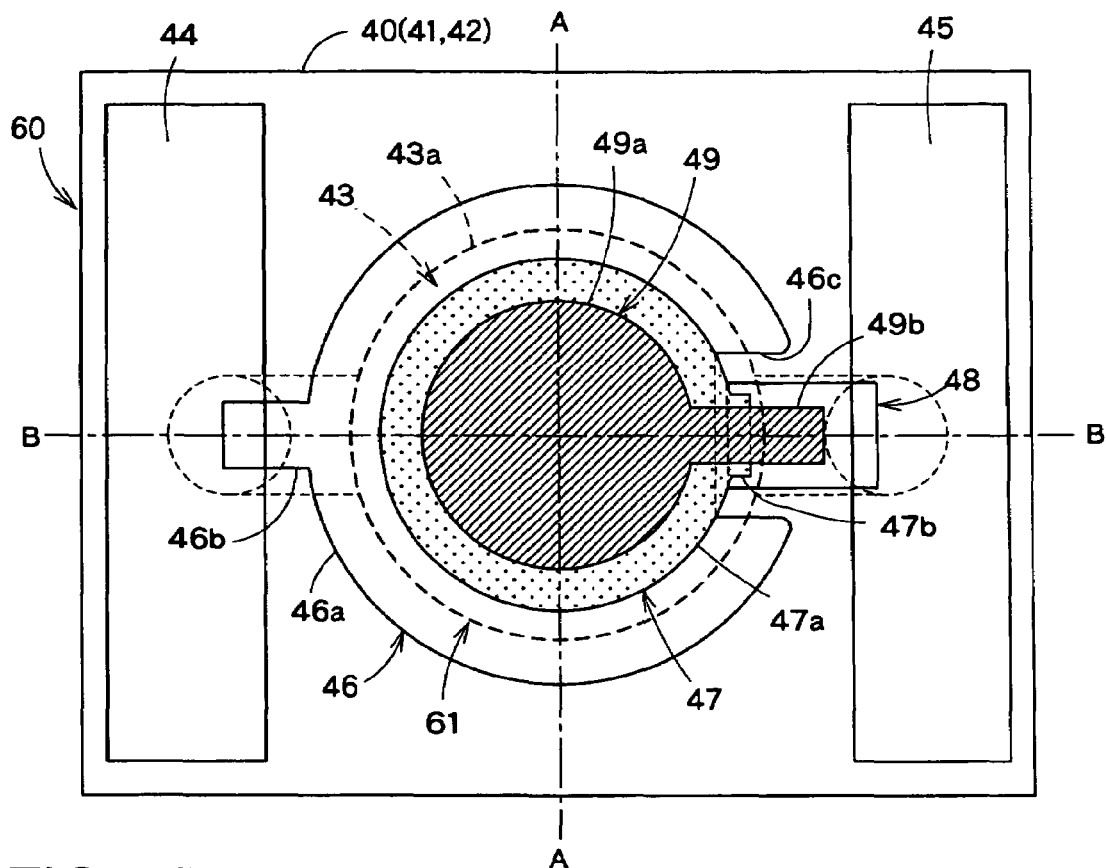
FIG. 6A is a plan view showing a liquid sensor according to another embodiment of the invention.
Figure 6B:
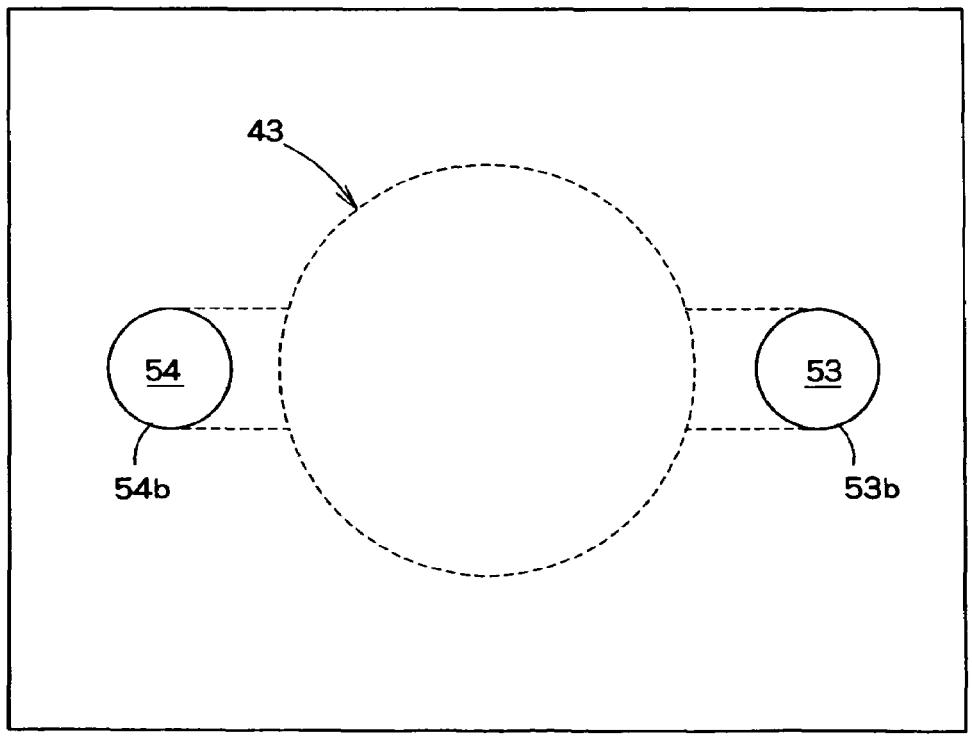
FIG. 6B is a bottom view thereof.

While the liquid sensor 60 according to the embodiment has such a structure that the exit/entrance plate 52 in the liquid sensor 60 shown in FIGS. 6 and 7 is omitted, the liquid sensor 60 in the above and following embodiments, for example, shown in FIGS. 2 and 3 may be modified similarly.

Next, a liquid sensor and an ink cartridge comprising the sensor according to a further embodiment of the invention will be described with reference to FIGS. 18 to 24.

While the flow path forming base portion 50 is constituted by the flow path plate 51 and the exit/entrance plate 52 in the embodiments shown typically in FIGS. 3 and 7, the flow path plate 51 is not used but the exit/entrance plate 52 itself is utilized for the flow path forming base portion 50 according to the embodiment. Moreover, shapes of the cavity 43, the lower electrode 46, the piezoelectric layer 47 and the upper electrode 49 are also modified. Furthermore, a modification is also applied to the arrangement of the liquid sensor with respect to the container body 72. These and other modifications will be described below in detail.

Figure 18:
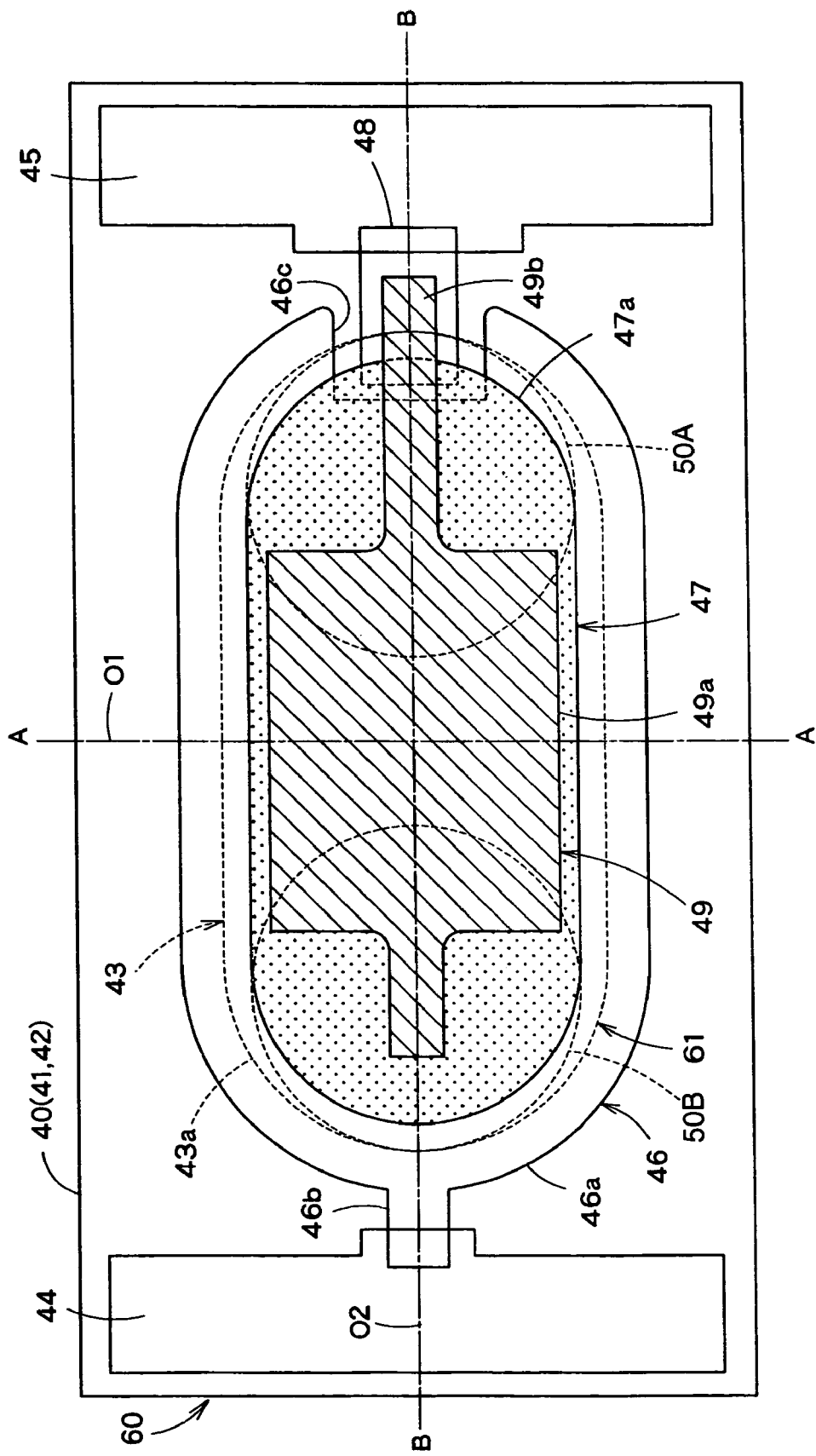
FIG. 18 is a plan view showing a liquid sensor according to a further embodiment of the invention.

As shown in FIG. 18, the planar shape of the cavity 43 has a first symmetry axis O1 and a second symmetry axis O2 which are orthogonal to each other, and furthermore, a dimension in a longitudinal direction along the second symmetry axis O2 is set to be greater than a dimension in a transverse direction along the first symmetry axis O1.

While an elliptical shape (for example, an oblong shape) formed by two semicircle portions and a rectangle positioned between the two semicircle portions is employed as the planar shape of the cavity 43 in the example shown in the drawing, the invention is not restricted thereto. For example, the cavity 43 may take the planar shape of an ellipse (such as an oval) having no straight portion.

Furthermore, the lower electrode (first electrode) 46 is formed on a second surface 40b of a vibration cavity forming base portion 40, and the lower electrode 46 has a body portion 46a formed in almost the same shape as the cavity 43 and a larger dimension than the cavity 43, and an extended portion 46b extended from the body portion 46a in the direction of a lower electrode terminal 44 and connected to the lower electrode terminal 44. The body portion 46a of the lower electrode 46 covers almost the whole of a region corresponding to the cavity 43.

The body portion 46a of the lower electrode 46 includes a notch portion 46c formed to intrude into an inside from a position corresponding to a peripheral edge 43a of the cavity 43.

A piezoelectric layer 47 is provided on the lower electrode 46. The piezoelectric layer 47 is formed in almost the same shape as the cavity 43 and a smaller dimension than the cavity 43. As is apparent from FIG. 18, the whole piezoelectric layer 47 is included within the range of the region corresponding to the cavity 43. In other words, the piezoelectric layer 47 has no portion extended across a position corresponding to the peripheral edge 43a of the cavity 43 at all.

The piezoelectric layer 47 has the first symmetry axis O1 and the second symmetry axis O2 which are common to the cavity 43, and almost the whole portion is provided on the lower electrode 46 excluding a portion corresponding to the notch portion 46c of the lower electrode 46.

Moreover, an auxiliary electrode 48 is formed on the second surface 40b side of the vibration cavity forming base portion 40. The auxiliary electrode 48 is extended into the inside of the region corresponding to the cavity 43 beyond the position corresponding to the peripheral edge 43a of the cavity 43 from the outside of the region corresponding to the cavity 43. A part of the auxiliary electrode 48 is positioned in the notch portion 46c of the first electrode 46 to support a part of the piezoelectric layer 47 from the second surface 40b side of the substrate 40. It is preferable that the auxiliary electrode 48 should be formed by the same material in the same thickness as the lower electrode 46. By supporting a part of the piezoelectric layer 47 from the second surface 40b side of the substrate 40 through the auxiliary electrode 48, thus, it is possible to prevent a reduction in a mechanical strength without generating a step in the piezoelectric layer 47.

A body portion 49a of the upper electrode (second electrode) 49 is provided on the piezoelectric layer 47, and the upper electrode 49 is formed in a smaller dimension than the piezoelectric layer 47 as a whole. Moreover, the upper electrode 49 has an extended portion 49b which is extended from the body portion 49a and is connected to the auxiliary electrode 48.

Figure 22A:
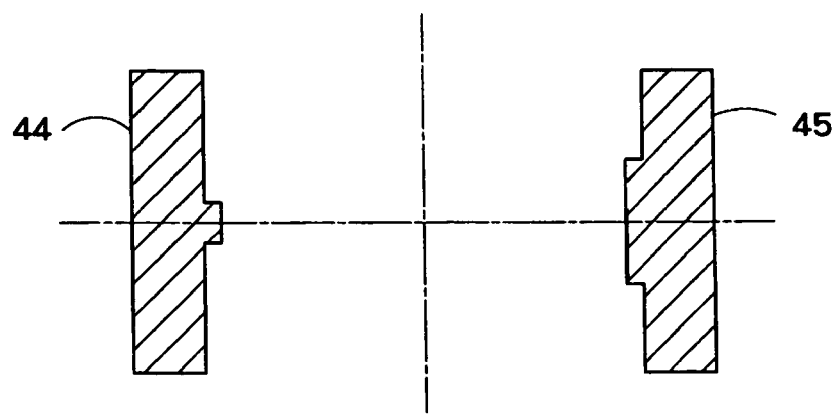
FIGS. 22A to 22D are exploded views showing electrode and piezoelectric layer portions in the liquid sensor illustrated in FIG. 18, FIG. 22A showing the pattern of an electrode terminal, FIG. 22B showing the pattern of an upper electrode, FIG. 22C showing the pattern of a piezoelectric layer, and FIG. 22D showing the patterns of a lower electrode and an auxiliary electrode.
Figure 22B:
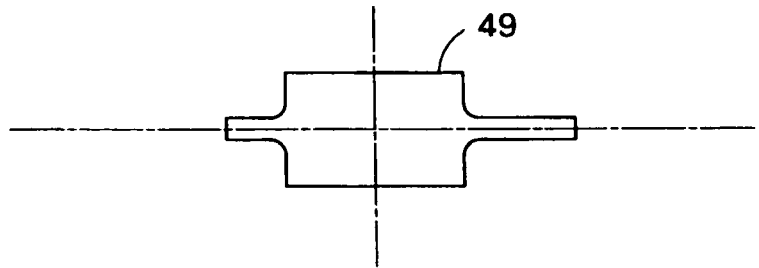
Figure 22C:
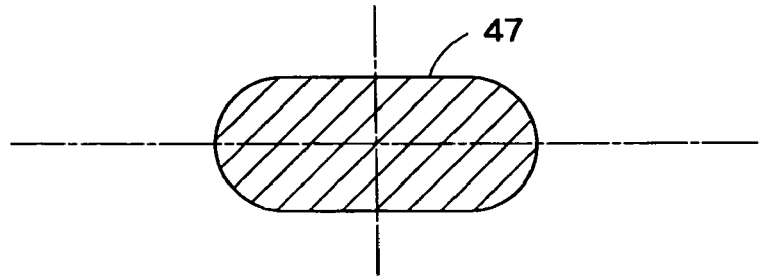
Figure 22D:
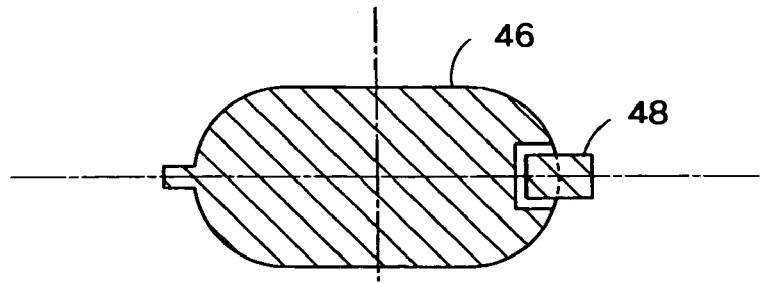
Figure 23A:
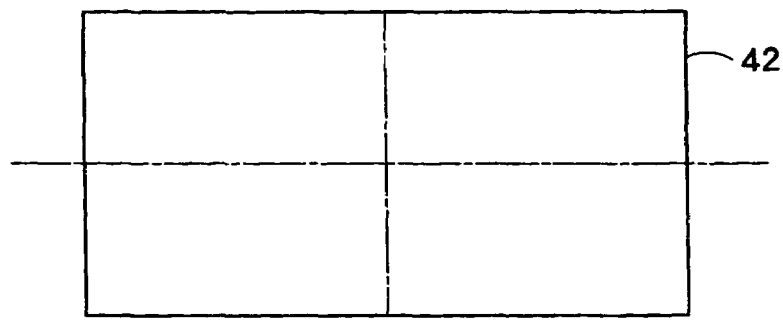
FIGS. 23A to 23C are exploded views showing a substrate portion in the liquid sensor illustrated in FIG. 18, FIG. 23A showing a vibration plate, FIG. 23B showing a cavity plate, and FIG. 23C showing an exit/entrance forming plate.
Figure 23B:
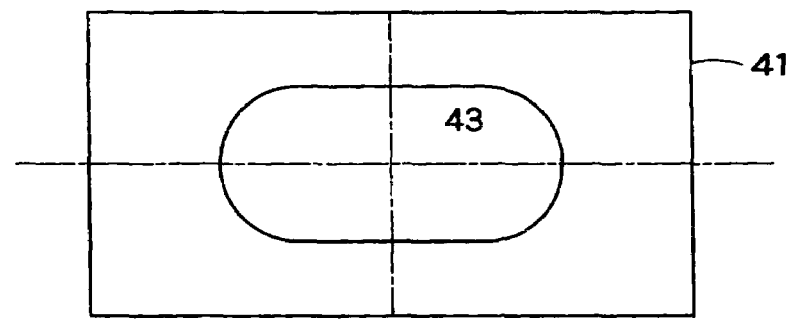
Figure 23C:
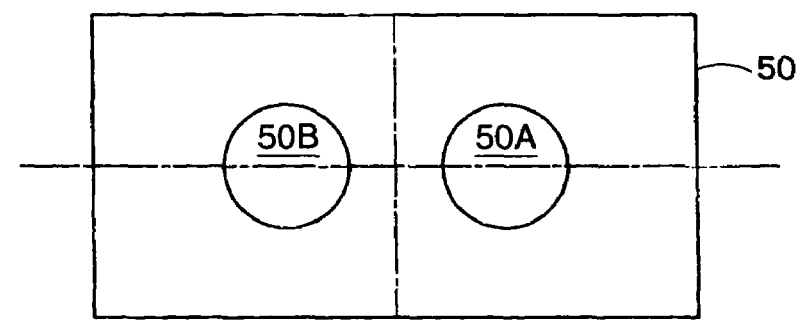

In the embodiment, as shown in FIGS. 18 and 22B, the upper electrode 49 is almost cross-shaped to take away portions corresponding to four corner portions of the cavity 43 and has the first symmetry axis O1 and the second symmetry axis O2 which are common to the cavity 43.

A piezoelectric unit is formed by the lower electrode 46, the piezoelectric layer 47 and the upper electrode 49. As described above, the piezoelectric layer 47 has such a structure as to be interposed between the upper electrode 49 and the lower electrode 46. Consequently, the piezoelectric layer 47 is deformed and driven effectively.

Referring to the body portion 46a of the lower electrode 46 and the body portion 49a of the upper electrode 49 which are electrically connected to the piezoelectric layer 47, the body portion 49a of the upper electrode 49 is formed in a smaller dimension. Accordingly, the body portion 49a of the upper electrode 49 determines the range of a portion generating a piezoelectric effect in the piezoelectric layer 47.

The centers of the piezoelectric layer 47, the body portion 49a of the upper electrode 49 and the body portion 46a of the lower electrode 46 are coincident with the center of the cavity 43. Moreover, the center of the cavity 43 for determining a portion of a vibration plate 42 which can be vibrated is positioned on the center of the whole liquid sensor 60.

The portion of the vibration plate 42 which can be vibrated and is defined by the cavity 43, a portion of the body portion 46a of the lower electrode 46 which corresponds to the cavity 43, and a portion of the whole piezoelectric layer 47 and upper electrode 49 which corresponds to the cavity 43 constitute a vibration portion 61 of the liquid sensor 60. The center of the vibration portion 61 of the liquid sensor 60 is coincident with that of the liquid sensor 60.

Figure 20:
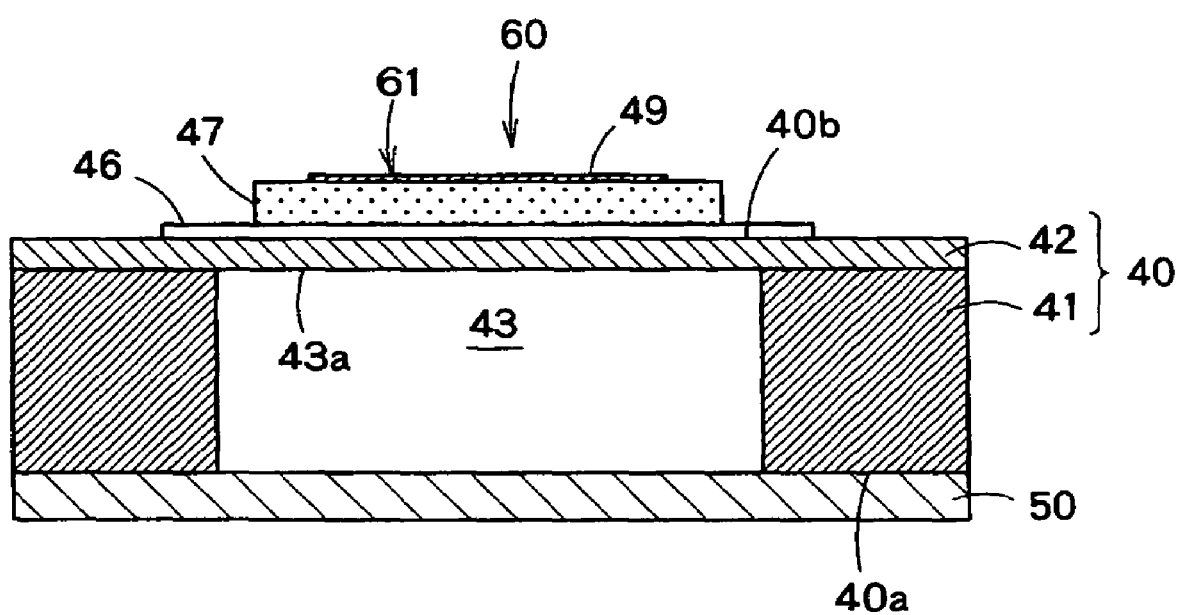
FIG. 20 is a sectional view taken along an A-A line in the liquid sensor illustrated in FIG. 18.
Figure 21:
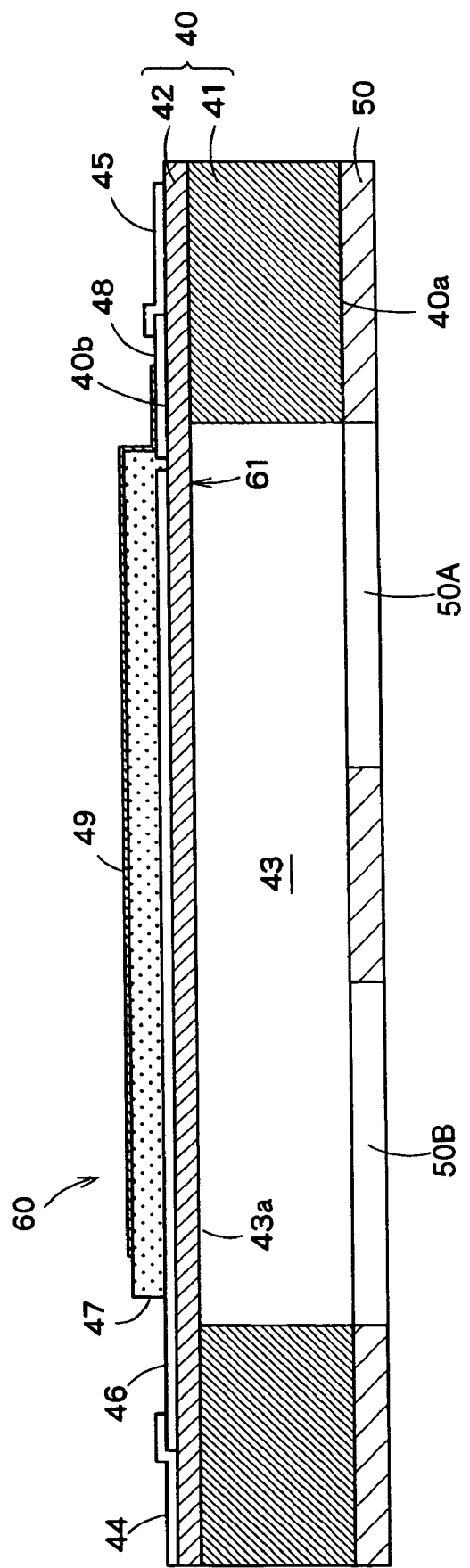
FIG. 21 is a sectional view taken along a B-B line in the liquid sensor illustrated in FIG. 18.

As shown in FIGS. 21 and 20, furthermore, the liquid sensor 60 according to the embodiment comprises the exit/entrance forming plate (flow path forming base portion) 50 laminated on and bonded to a first surface 40a of the vibration cavity forming base portion 40. The exit/entrance forming plate 50 is provided with an ink supply port (a liquid supply port) 50A for supplying an ink to be a detecting object to the cavity 43 and an ink discharge port (a liquid discharge port) 50B for discharging the ink to be the detecting object from the cavity 43.

The ink supply port 50A and the ink discharge port 50B are disposed in positions corresponding to both ends in the longitudinal direction of the cavity 43 on the inside of the region corresponding to the cavity 43. Moreover, each of the edge portions of the ink supply port 50A and the ink discharge port 50B is matched with an edge portion in the longitudinal direction of the cavity 43. Both the ink supply port 50A and the ink discharge port 50B are formed in the same shapes and sizes.

The ink supply port 50A and the ink discharge port 50B are provided in the positions corresponding to both ends in the longitudinal direction of the cavity 43 as described above so that a distance between the ink supply port 50A and the ink discharge port 50B is increased and the liquid sensor 60 can easily be attached to the container body. By providing the ink supply port 50A and the ink discharge port 50B on the inside of the region corresponding to the cavity 43, moreover, it is possible to reduce the size of the liquid sensor 60.

Figure 24:
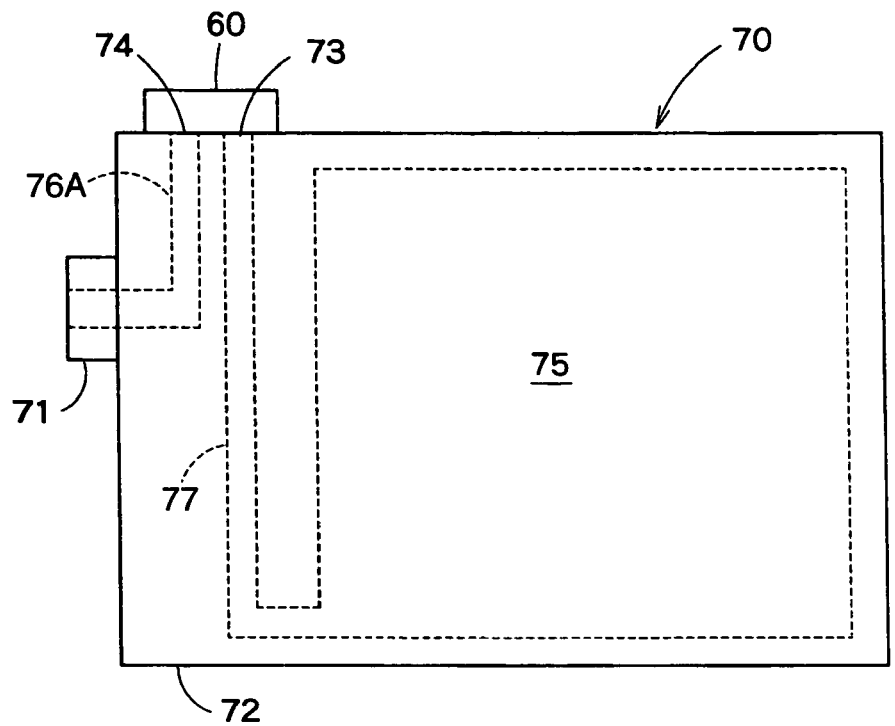
FIG. 24 is a side view showing an example of an ink cartridge comprising the liquid sensor illustrated in FIG. 18.

FIG. 24 shows an ink cartridge (a liquid container) 70 to which the liquid sensor 60 is attached. The ink cartridge 70 comprises a container body 72 having, on a front surface, an ink outlet port (a liquid outlet port) 71 for feeding an ink stored therein to an outside.

The liquid sensor 60 is wholly provided on the outside of the container body 72, and furthermore, is attached onto the upper surface of the container body 72. A first opening 73 communicating with the ink supply port 50A and a second opening 74 communicating with the ink discharge port 50B in the liquid sensor 60 are formed to penetrate through a container wall constituting the upper surface of the container body 72.

An ink reservoir chamber 75 is formed in the container body 72, and the ink reservoir chamber 75 and the first opening 73 are connected to each other through a first connecting flow path 77 and the second opening 74 and the ink outlet port 71 are connected to each other through a second connecting flow path 76A.

In the embodiment, the liquid sensor 60 is attached to the container body 72 in such a manner that the cavity 43 is positioned below the piezoelectric unit in a vertical direction. The ink flowing out of the first opening 73 formed on the container body 72 flows into the cavity 43 through the ink supply port 50A of the liquid sensor 60, and the ink flows back into the container body 72 from the cavity 43 through the ink discharge port 50B of the liquid sensor 60 and the second opening 74 of the container body 72.

The ink cartridge 70 according to the embodiment has such a structure that the total amount of the ink fed to the ink outlet port 71 passes through the inside of the liquid sensor 60.

In the ink cartridge 70 comprising the liquid sensor 60, in the case in which the ink remains in the container body 72, the inner part of the cavity 43 is filled with the ink. On the other hand, when the liquid in the container body 72 of the ink cartridge 70 is consumed and the ink in the ink reservoir chamber 75 and the first connecting flow path 77 is completely consumed, the ink is not present in the cavity 43 of the liquid sensor 60.

In the embodiment, the upper electrode 49 is almost cross-shaped to take away the portions corresponding to the four corner portions of the cavity 43 as described above. Also in the case in which a driving pulse is applied to the piezoelectric unit to be forcibly deformed, therefore, the amount of the deformation of the portions corresponding to the four corner portions of the cavity 43 is small. Consequently, a vibration mode in a forcible vibration is close to that in a residual vibration (a free vibration) after the forcible vibration.

As described above, in the embodiment, the liquid sensor 60 is attached to the container body 72 in such a manner that the cavity 43 is positioned below the piezoelectric unit in a vertical direction. In the case in which the ink in the container body 72 is consumed and is not supplied into the cavity 43, therefore, the ink in the cavity 43 flows down by a gravity. Consequently, the ink can be prevented from remaining in the cavity 43. For this reason, it is possible to reliably decide the presence of the ink by the liquid sensor 60.

In the liquid sensor 60 according to the embodiment, moreover, the upper electrode 49 is almost cross-shaped, thereby causing the vibration mode in the forcible vibration to be close to that in the residual vibration after the forcible vibration.

Irrespective of the slender shape of the cavity 43 described above, therefore, an unnecessary vibration component in a detection signal is reduced. Consequently, it is possible to reliably decide the presence of the ink. In the embodiment, moreover, the ink is supplied to the cavity 43 through the ink supply port (entrance) 50A and is discharged from the cavity 43 through the ink discharge port (exit) 50B. When the liquid sensor 60 is to be attached to the ink cartridge 70, therefore, it is possible to supply the ink in the container body 72 to the cavity 43 through the ink supply port 50A without exposing the cavity 43 of the liquid sensor 60 to an ink housing space in the container body 72 of the ink cartridge 70.

With the structure in which the flow of the ink is generated in the cavity 43 through the ink supply port 50A and the ink discharge port 50B in the liquid sensor 60 in the consumption of the ink in the ink cartridge 70, therefore, a bubble is pushed out of the inside of the cavity 43 by the flow of the ink even if it enters the inner part of the cavity 43. Consequently, it is possible to prevent the erroneous detection of the liquid sensor 60 from being caused by the bubble staying in the cavity 43.

According to the embodiment, furthermore, the cavity 43 does not take the shape of a circle or a square but a slender shape. By providing the ink supply port 50A and the ink discharge port 50B on both ends in the longitudinal direction of the cavity 43, therefore, the ink or the bubble stays in the cavity 43 with difficulty. Consequently, it is possible to sufficiently maintain the discharging property of the ink or the bubble and to surely decide the presence of the ink.

In the liquid sensor 60 according to the embodiment, moreover, it is not necessary to expose the cavity 43 to the ink housing space in the container body 72. Therefore, it is possible to prevent a meniscus from being formed in the cavity 43 in a passage through a liquid level. Consequently, it is possible to prevent the erroneous detection of the liquid sensor 60 from being caused by the ink remaining in the cavity 43.

Figure 25:
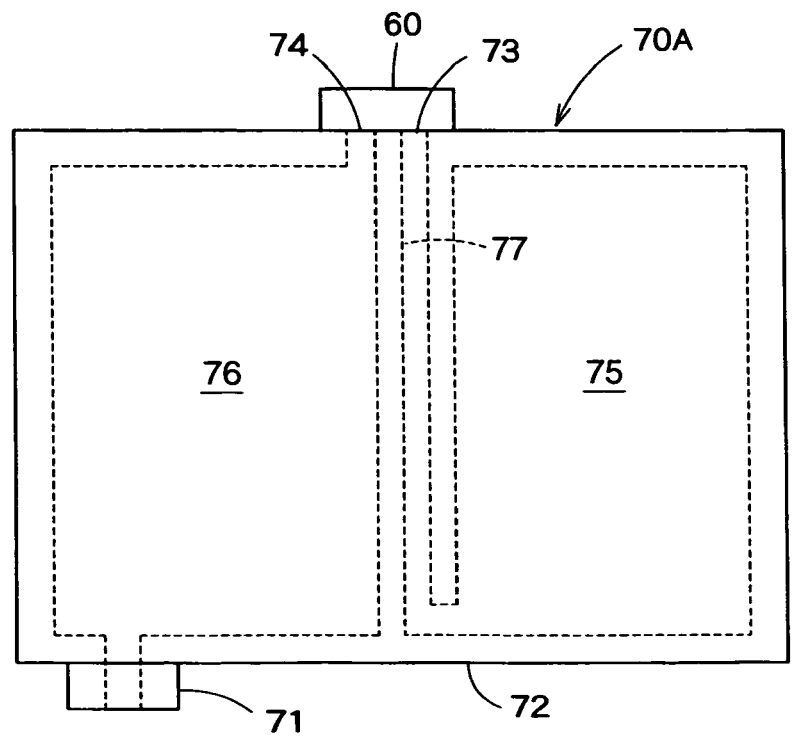
FIG. 25 is a side view showing another example of the ink cartridge comprising the liquid sensor illustrated in FIG. 18.

FIG. 25 shows an ink cartridge 70 according to a further embodiment of the invention. In the ink cartridge 70, the inner part of a container body 72 is divided into a first reservoir chamber 75 and a second reservoir chamber 76, and the first reservoir chamber 75 and the second reservoir chamber 76 are separated from each other. In the embodiment, the first reservoir chamber 75 and the second reservoir chamber 76 have almost equal volumes to each other. The second reservoir portion 76 is positioned on a closer side to an ink outlet port 71 than the first reservoir portion 75 in the direction of the flow of an ink in the consumption of the ink, and furthermore, communicates with the ink outlet port 71.

Also in the embodiment, a liquid sensor 60 is attached onto the upper surface of the container body 72. A first opening 73 for communicating with an ink supply port 50A and a second opening 74 for communicating with an ink discharge port 50B in the liquid sensor 60 are formed to penetrate through a container wall constituting the upper surface of the container body 72. The first reservoir chamber 75 and the first opening 73 are connected to each other through a connecting flow path 77, and the second opening 74 communicates with the second reservoir chamber 76. The ink outlet port 71 is provided on the bottom face of the container body 72.

In the embodiment, thus, the first reservoir chamber 75 communicates with the second reservoir chamber 76 through the liquid sensor 60, and the total amount of an ink to be fed from the first reservoir chamber 75 to the second reservoir chamber 76 passes through the liquid sensor 60.

In the ink cartridge 70 according to the embodiment, a point of time that the ink in the first reservoir chamber 75 is gone can be detected reliably by means of the liquid sensor 60. Therefore, it is possible to acquire accurate information about the state of the consumption of the ink. Based on the accurate information about the state of the consumption of the ink which is obtained by the liquid sensor 60, it is possible to correct the information about the state of the consumption of the ink which is obtained by a soft count.

In the embodiment, moreover, the first reservoir chamber 75 and the second reservoir chamber 76 have almost equal volumes to each other. By setting the volume of the second reservoir chamber 76 to be smaller than that of the first reservoir chamber 75 as in the example shown in FIG. 4, for instance, it is possible to acquire accurate information about an ink near end by the liquid sensor 60. Consequently, it is possible to inform a user of the number of sheets which can be printed with a residual ink based on the amount of the ink in the second reservoir chamber 76 which is previously known. Thus, it is possible to prevent a printing paper from being wasted due to the complete consumption of the ink in the middle of a page.

According to the liquid sensor 60 in accordance with the embodiment, moreover, a range in which a vibration portion 61 comes in contact with a liquid is limited to a range in which a cavity 43 is present. Therefore, it is possible to detect the liquid on a pinpoint. Consequently, it is possible to detect an ink level with high precision.

Moreover, almost the whole of a region corresponding to the cavity 43 is covered with a body portion 46a of a lower electrode 46. Therefore, a difference between a deformation mode in a forcible vibration and that in a free vibration is reduced. Since the vibration portion 61 of the liquid sensor 60 takes a symmetrical shape with respect to the center of the liquid sensor 60, moreover, the rigidity of the vibration portion 61 is almost isotropic as seen from the center.

For this reason, it is possible to suppress the generation of an unnecessary vibration which might be caused by the asymmetry of a structure, and furthermore, to prevent a reduction in the output of a back electromotive force due to the difference between the deformation modes in the forcible vibration and the free vibration. Consequently, it is possible to enhance the precision in the detection of the resonant frequency of a residual vibration in the vibration portion 61 of the liquid sensor 60, and furthermore, to easily detect the residual vibration of the vibration portion 61.

Moreover, almost the whole region corresponding to the cavity 43 is covered with the body portion 46a of the lower electrode 46 having a larger dimension than the cavity 43. Therefore, it is possible to prevent an unnecessary vibration from being caused by the positional shift of the lower electrode 46 in a manufacture, thereby suppressing a reduction in the precision in the detection.

Furthermore, a whole hard and fragile piezoelectric layer 47 is provided in the region corresponding to the cavity 43 and the piezoelectric layer 47 is not present in a position corresponding to a peripheral edge 43a of the cavity 43. Therefore, a crack can be prevented from being generated on the piezoelectric layer in the position corresponding to the peripheral edge of the cavity.

Next, another example of the liquid sensor will be described with reference to FIGS. 26 and 27. The description of common portions to the liquid sensor 60 will be omitted.

Figure 26:
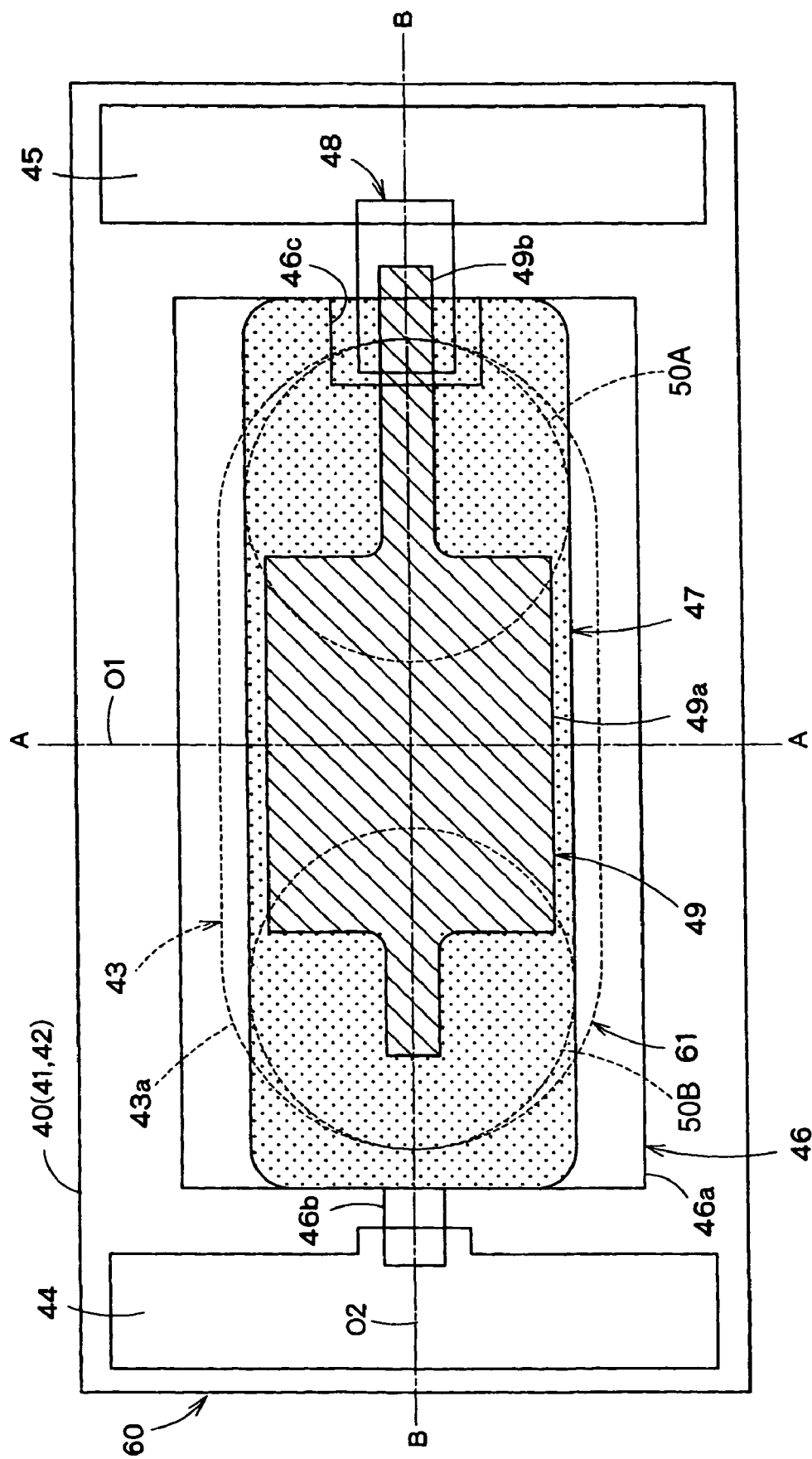
FIG. 26 is a plan view showing a liquid sensor according to a further embodiment of the invention.
Figure 27A:
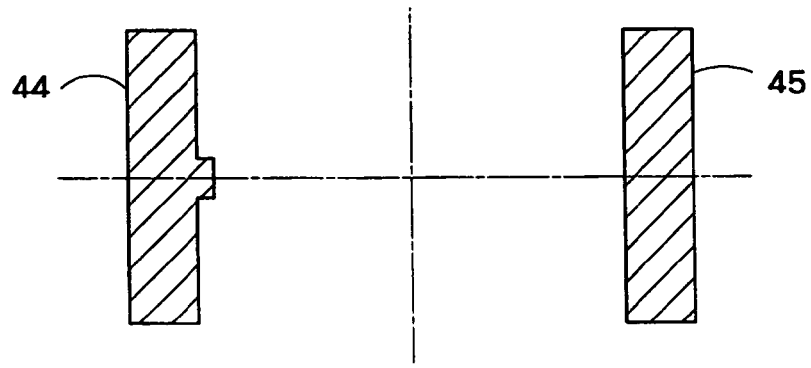
FIGS. 27A to 27D are exploded views showing electrode and piezoelectric layer portions in the liquid sensor illustrated in FIG. 26, FIG. 27A showing the pattern of an electrode terminal, FIG. 27B showing the pattern of an upper electrode, FIG. 27C showing the pattern of a piezoelectric layer, and FIG. 27D showing the patterns of a lower electrode and an auxiliary electrode.
Figure 27B:
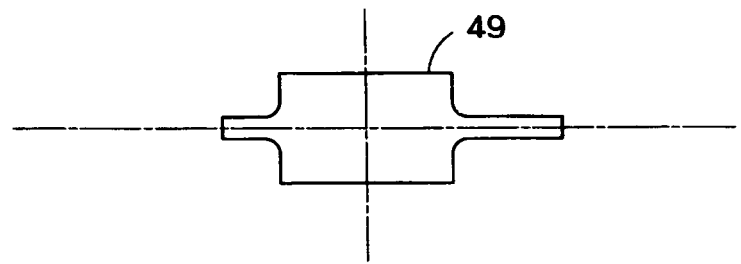
Figure 27C:
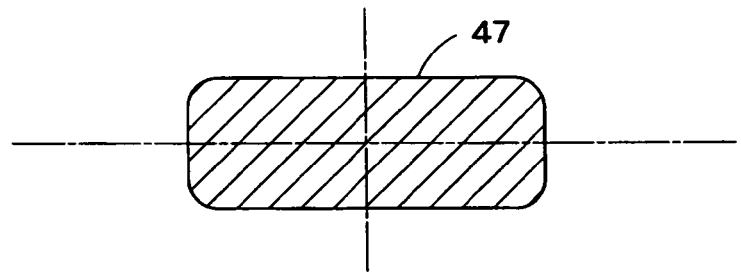
Figure 27D:
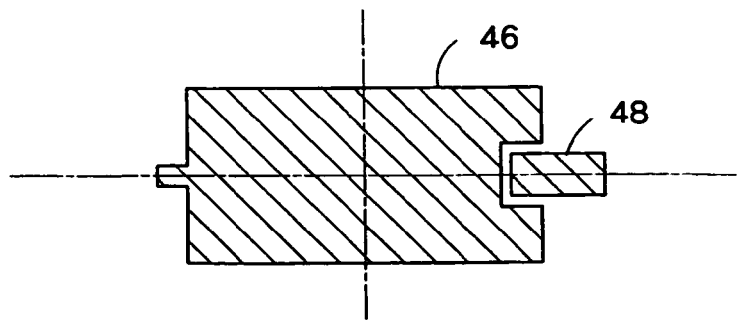

In the liquid sensor 60 according to the example as shown in FIG. 26, the dimension of a piezoelectric layer 47 in the longitudinal direction of a cavity 43 (the direction of the extension of a second symmetry axis O2) is set to be greater than a length in the longitudinal direction of the cavity 43. The piezoelectric layer 47 is formed to cover the cavity 43 over a full length thereof in the longitudinal direction of the cavity 43. In the transverse direction of the cavity 43 (the direction of the extension of a first symmetry axis O1), the piezoelectric layer 47 is formed on the inside of the cavity 43 in a smaller dimension than the cavity 43.

In the liquid sensor 60 according to the example, furthermore, a lower electrode 46 is formed to be almost rectangular, and the lower electrode 46 has a larger size than the piezoelectric layer 47 in the transverse direction of the cavity 43 (the direction of the extension of the first symmetry axis O1) and the lower electrode 46 and the piezoelectric layer 47 have a common dimension in the longitudinal direction of the cavity 43 (the direction of the extension of the second symmetry axis O2).

Also in the liquid sensor 60 according to the example, in the same manner as in the embodiments, the generation of an unnecessary vibration can be prevented, and furthermore, a bubble or an ink can be prevented from staying.

According to the liquid sensor 60 in accordance with the example, furthermore, the dimension in the longitudinal direction of the piezoelectric layer 47 is set to be greater than the dimension in the longitudinal direction of the cavity 43. Also in the case in which a position in which the piezoelectric layer 47 is formed is shifted in the longitudinal direction of the cavity 43, therefore, the size of a portion to contribute to a vibration in the whole piezoelectric layer 47 is not changed. Therefore, it is possible to prevent an unnecessary vibration from being generated by the shift of the position in which the piezoelectric layer 47 is formed.

As a variant of the embodiments, moreover, it is also possible to employ a structure in which the exit/entrance forming plate 50 is omitted from the liquid sensor 60 and the first opening 73 and the second opening 74 which are formed on the container body 72 of the ink cartridge 70 are utilized as an ink supply port and an ink discharge port to/from the cavity 43 in the liquid sensor 60.

Figure 28A:
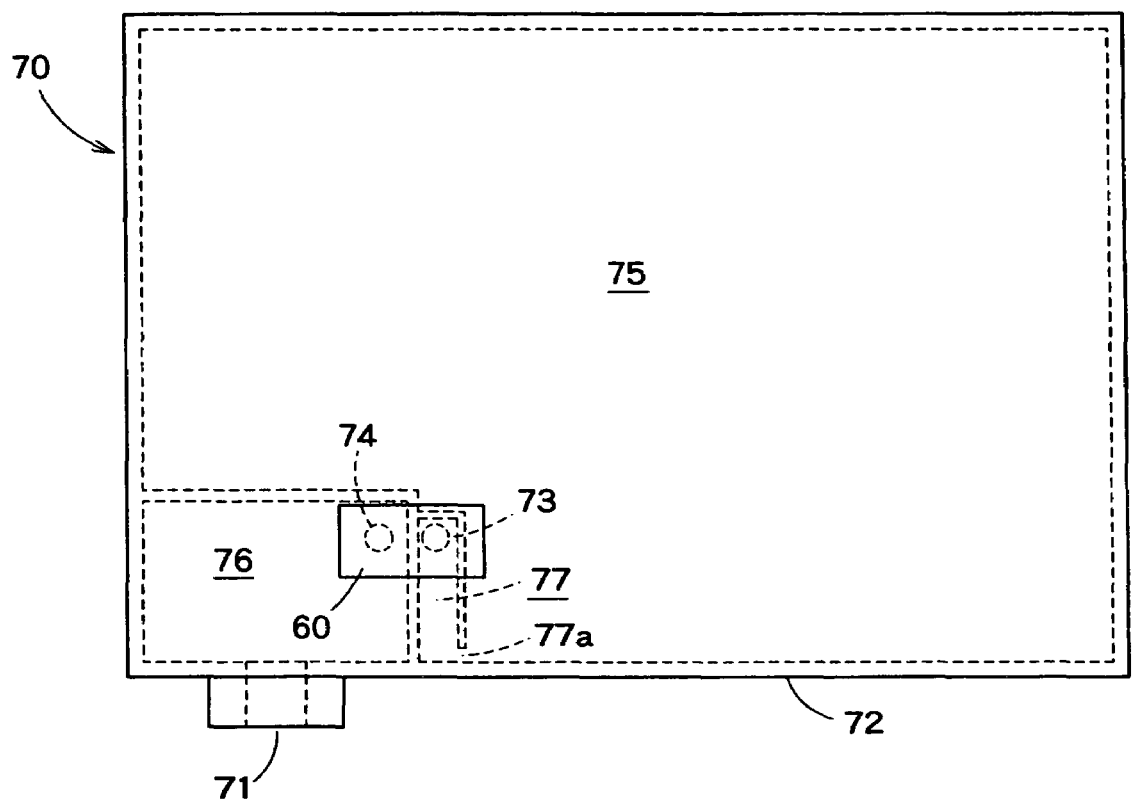
FIGS. 28A and 28B are views showing an ink cartridge comprising the liquid sensor illustrated in FIG. 18, FIG. 28A being a side view and FIG. 28B being a front view.
Figure 28B:
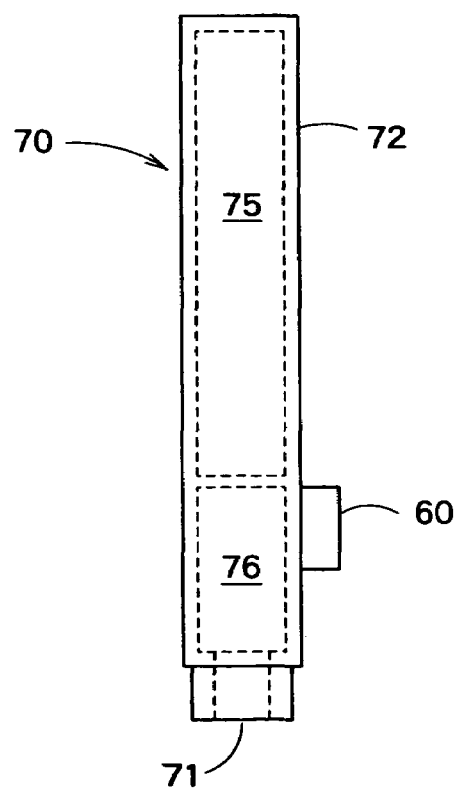

Next, a liquid sensor and an ink cartridge comprising the sensor according to a further embodiment of the invention will be described with reference to FIG. 28 (FIGS. 28A and 28B).

The embodiment shown in FIG. 28 is an example in which the liquid sensor described with reference to FIGS. 18 to 23 is attached to the container body 72 as shown in FIG. 4.

Figure 19:
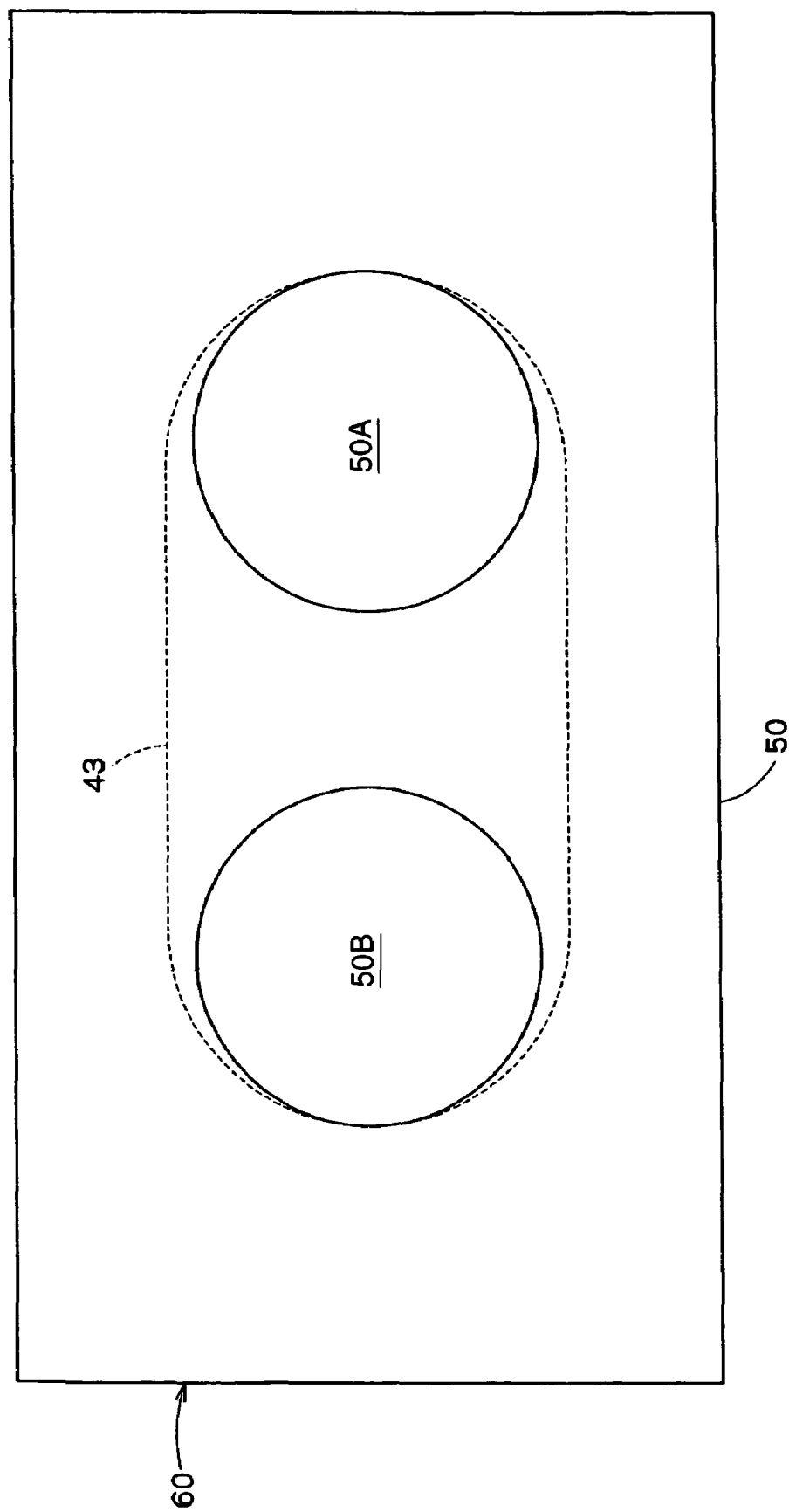
FIG. 19 is a bottom view showing the liquid sensor illustrated in FIG. 18.

As discussed with reference to FIGS. 18 to 20, the liquid sensor 60 according to this embodiment shown in FIG. 28 includes a vibration cavity forming base portion 40 constructed by laminating a vibration plate 42 on a cavity plate 41. This vibration cavity forming base portion 40 includes a first surface 40a and a second surface 40b opposite to each other.

A cavity 43 for receiving a medium (ink) as a detection object is formed to be opened to the side of the first surface 40a in the vibration cavity forming base portion 40, and a bottom portion 43a of the cavity 43 is formed to be capable of vibrating by the vibration plate 42. In other words, the contour of an actually vibrating portion in the whole of the vibration plate 42 is regulated by the cavity 43.

As shown in FIG. 18, the planar shape of the cavity 43 has a first symmetry axis O1 and a second symmetry axis O2 which are orthogonal to each other, and furthermore, a dimension in a longitudinal direction along the second symmetry axis O2 is set to be greater than a dimension in a transverse direction along the first symmetry axis O1.

While an elliptical shape (for example, an oblong shape) formed by two semicircle portions and a rectangle positioned between the two semicircle portions is employed as the planar shape of the cavity 43 in the example shown in the drawing, the invention is not restricted thereto. For example, the cavity 43 may take the planar shape of an ellipse (such as an oval) having no straight portion.

A lower electrode terminal 44 and an upper electrode terminal 45 are formed at both ends of the vibration cavity forming base portion 40 on the side of the second surface 40b.

Furthermore, a lower electrode (first electrode) 46 is formed on the second surface 40b of the vibration cavity forming base portion 40, and the lower electrode 46 has a body portion 46a formed in almost the same shape as the cavity 43 and a larger dimension than the cavity 43, and an extended portion 46b extended from the body portion 46a in the direction of the lower electrode terminal 44 and connected to the lower electrode terminal 44. The body portion 46a of the lower electrode 46 covers almost the whole of a region corresponding to the cavity 43.

The body portion 46a of the lower electrode 46 includes a notch portion 46c formed to intrude into an inside from a position corresponding to a peripheral edge 43a of the cavity 43.

A piezoelectric layer 47 is provided on the lower electrode 46. The piezoelectric layer 47 is formed in almost the same shape as the cavity 43 and a smaller dimension than the cavity 43. As is apparent from FIG. 18, the whole piezoelectric layer 47 is included within the range of the region corresponding to the cavity 43. In other words, the piezoelectric layer 47 has no portion extended across a position corresponding to the peripheral edge 43a of the cavity 43 at all.

The piezoelectric layer 47 has the first symmetry axis O1 and the second symmetry axis O2 which are common to the cavity 43, and almost the whole portion is provided on the lower electrode 46 excluding a portion corresponding to the notch portion 46c of the lower electrode 46.

Moreover, an auxiliary electrode 48 is formed on the second surface 40b side of the vibration cavity forming base portion 40. The auxiliary electrode 48 is extended into the inside of the region corresponding to the cavity 43 beyond the position corresponding to the peripheral edge 43a of the cavity 43 from the outside of the region corresponding to the cavity 43. A part of the auxiliary electrode 48 is positioned in the notch portion 46c of the first electrode 46 to support a part of the piezoelectric layer 47 from the second surface 40b side of the substrate 40. It is preferable that the auxiliary electrode 48 should be formed by the same material in the same thickness as the lower electrode 46. By supporting a part of the piezoelectric layer 47 from the second surface 40b side of the substrate 40 through the auxiliary electrode 48, thus, it is possible to prevent a reduction in a mechanical strength without generating a step in the piezoelectric layer 47.

A body portion 49a of the upper electrode (second electrode) 49 is provided on the piezoelectric layer 47, and the upper electrode 49 is formed in a smaller dimension than the piezoelectric layer 47 as a whole. Moreover, the upper electrode 49 has an extended portion 49b which is extended from the body portion 49a and is connected to the auxiliary electrode 48.

In the embodiment shown in FIG. 28, as discussed with reference to FIGS. 18 and 22B, the upper electrode 49 is almost cross-shaped to take away portions corresponding to four corner portions of the cavity 43 and has the first symmetry axis O1 and the second symmetry axis O2 which are common to the cavity 43.

A piezoelectric unit is formed by the lower electrode 46, the piezoelectric layer 47 and the upper electrode 49. As described above, the piezoelectric layer 47 has such a structure as to be interposed between the upper electrode 49 and the lower electrode 46. Consequently, the piezoelectric layer 47 is deformed and driven effectively.

As discussed with reference to FIGS. 18 and 21, the upper electrode 49 is electrically connected to the upper electrode terminal 45 through the auxiliary electrode 48. As stated above, the upper electrode 49 is connected to the upper electrode terminal 45 through the auxiliary electrode 48, so that a stepped portion formed from the total thickness of the piezoelectric layer 47 and the lower electrode 46 can be absorbed by both the upper electrode 49 and the auxiliary electrode 48. Thus, it is possible to prevent that a large stepped portion is formed on the upper electrode 49 and the mechanical strength is lowered.

Referring to the body portion 46a of the lower electrode 46 and the body portion 49a of the upper electrode 49 which are electrically connected to the piezoelectric layer 47, the body portion 49a of the upper electrode 49 is formed in a smaller dimension. Accordingly, the body portion 49a of the upper electrode 49 determines the range of a portion generating a piezoelectric effect in the piezoelectric layer 47.

The centers of the piezoelectric layer 47, the body portion 49a of the upper electrode 49 and the body portion 46a of the lower electrode 46 are coincident with the center of the cavity 43. Moreover, the center of the cavity 43 for determining a portion of the vibration plate 42 which can be vibrated is positioned on the center of the whole liquid sensor 60.

The portion of the vibration plate 42 which can be vibrated and is defined by the cavity 43, a portion of the body portion 46a of the lower electrode 46 which corresponds to the cavity 43, and a portion of the whole piezoelectric layer 47 and upper electrode 49 which corresponds to the cavity 43 constitute a vibration portion 61 of the liquid sensor 60. The center of the vibration portion 61 of the liquid sensor 60 is coincident with that of the liquid sensor 60.

As shown in FIGS. 21 and 20, furthermore, the liquid sensor 60 according to the embodiment shown in FIG. 28 comprises an exit/entrance forming plate 50 laminated on and bonded to the first surface 40a of the vibration cavity forming base portion 40. The exit/entrance forming plate 50 is provided with an ink supply port (a liquid supply port) 50A for supplying an ink to be a detecting object to the cavity 43 and an ink discharge port (a liquid discharge port) 50B for discharging the ink to be the detecting object from the cavity 43.

The ink supply port 50A and the ink discharge port 50B are disposed in positions corresponding to both ends in the longitudinal direction of the cavity 43 on the inside of the region corresponding to the cavity 43. Moreover, each of the edge portions of the ink supply port 50A and the ink discharge port 50B is matched with an edge portion in the longitudinal direction of the cavity 43. Both the ink supply port 50A and the ink discharge port 50B are formed in the same shapes and sizes.

The ink supply port 50A and the ink discharge port 50B are provided in the positions corresponding to both ends in the longitudinal direction of the cavity 43 as described above so that a distance between the ink supply port 50A and the ink discharge port 50B is increased and the liquid sensor 60 can easily be attached to the container body. By providing the ink supply port 50A and the ink discharge port 50B on the inside of the region corresponding to the cavity 43, moreover, it is possible to reduce the size of the liquid sensor 60.

Members included in the liquid sensor 60, especially the cavity plate 41, the vibration plate 42, and the exit/entrance plate 50 are formed of the same material and are mutually sintered, so that they are integrally formed. As stated above, the plural substrates are sintered and integrated, so that the handling of the liquid sensor 60 becomes easy. Besides, the respective members are formed of the same material, so that the occurrence of a crack due to a difference in linear expansion coefficient can be prevented.

As the material of the piezoelectric layer 47, it is preferable to use lead zirconate titanate (PZT), lead lanthanum zirconate titanate (PLZT), or lead-less piezoelectric film not using lead. As the material of the cavity plate 41, it is preferable to use zirconia or alumina. Besides, as the vibration plate 42 and the exit/entrance plate 50, it is preferable to use the same material as the cavity plate 41. As the upper electrode 49, the lower electrode 46, the upper electrode terminal 45, and the lower electrode terminal 44, it is possible to use a material having conductivity, for example, a metal such as gold, silver, copper, platinum, aluminum, or nickel.

FIG. 28 shows an ink cartridge (a liquid container) 70 to which the liquid sensor 60 described with reference to FIGS. 18 to 23 is attached. As discussed with reference to FIG. 4, the ink cartridge 70 shown in FIG. 28 includes a container body 72 having an ink outlet port (liquid outlet port) 71 for sending ink stored in the inside to the outside.

The liquid sensor 60 is wholly attached to the outside of the container body 72 and a first opening (an entrance side opening) 73 for communicating with the ink supply port 50A of the liquid sensor 60 and a second opening (an exit side opening) 74 for communicating with the ink discharge port 50B are formed to penetrate through the container wall of the container body 72. In the embodiment shown in FIG. 28, both the first opening 73 and the second opening 74 are formed in the same shapes and sizes.

The inside of the container body 72 is divided into a main reservoir chamber (first chamber) 75 constituting a main portion of the whole inner space of the container body 72 and a sub reservoir chamber (second chamber) having a volume smaller than the main reservoir chamber 75, and the main reservoir chamber 75 and the sub reservoir chamber 76 are separated from each other. The sub reservoir chamber 76 is positioned at a side closer to the ink outlet port 71 than the main reservoir chamber 75 in the direction of flow of the ink at the time of ink consumption, and communicates with the ink outlet port 71.

The exit side opening 74 formed in the container wall of the container body 72 communicates with the upper end portion of the sub reservoir chamber 76. As stated above, the exit of the ink discharge port 50B of the liquid sensor 60 is connected to the exit side opening 74.

A sealed auxiliary flow path 77 is formed in the inside of the main reservoir chamber 75, and an auxiliary flow path entrance 77a is formed at the lower end side of the auxiliary flow path 77. The auxiliary flow path entrance 77a is positioned at the lower end of the inside of the main reservoir chamber 75. Besides, the entrance side opening 73 formed in the container wall of the container body 72 communicates with the upper end portion of the auxiliary flow path 77, and the entrance side opening 73 constitutes the exit of the auxiliary flow path 77.

As described above, the ink supply port 50A of the liquid sensor 60 communicates with the first opening (entrance side opening) 73 and the ink discharge port 50B of the liquid sensor 60 communicates with the second opening (exit side opening) 74. Consequently, the ink supply port 50A and the ink discharge port 50B in the liquid sensor 60 form a connecting flow path for connecting the main reservoir chamber 75 to the sub reservoir chamber 76.

When an ink in the ink cartridge 70 is to be consumed, the ink in the main reservoir chamber 75 flows from the auxiliary flow path entrance 77a into the auxiliary flow path 77 and flows to the first opening 73 through the auxiliary flow path 77. The ink flowing out of the first opening 73 flows from the ink supply port 50A of the liquid sensor 60 into the cavity 43 and flows out of the ink discharge port 50B through the cavity 43. The ink flowing out of the ink discharge port 50B flows into the sub reservoir chamber 76 through the second opening 74. Then, the ink flowing into the sub reservoir chamber 76 is supplied to a recording head 12 of an ink jet type recording apparatus through the ink outlet port 71.

Thus, the embodiment shown in FIG. 28 has such a structure that the total amount of the ink to be fed to the ink outlet port 71 through the sub reservoir chamber 76 previously passes through the ink supply port 50A and the ink discharge port 50B in the liquid sensor 60.

As explained with reference to FIGS. 5A and 5B, in the liquid sensor 60 according to this embodiment shown in FIG. 28, with respect to whether the liquid surface passes the mount position level (strictly, the position of the cavity 43) of the liquid sensor 60, it can be detected by the change of the frequency or the change of the amplitude of the residual vibration after the vibration portion 61 of the liquid sensor 60 is forcibly vibrated.

In the embodiment shown in FIG. 28, the upper electrode 49 is almost cross-shaped to take away the portions corresponding to the four corner portions of the cavity 43 as described above. Also in the case in which a driving pulse is applied to the piezoelectric unit to be forcibly deformed, therefore, the amount of the deformation of the portions corresponding to the four corner portions of the cavity 43 is small. Consequently, a vibration mode in a forcible vibration is close to that in a residual vibration (a free vibration) after the forcible vibration.

In the liquid sensor 60 according to the embodiment shown in FIG. 28, the upper electrode 49 is almost cross-shaped so that a vibration mode in a forcible vibration and that in a residual vibration after the forcible vibration are set to be close to each other. Irrespective of the slender shape of the cavity 43 described above, therefore, an unnecessary vibration component in a detection signal is reduced. Consequently, it is possible to reliably decide the presence of the ink.

In the embodiment shown in FIG. 28, moreover, the ink is supplied to the cavity 43 through the ink supply port 50A and is discharged from the cavity 43 through the ink discharge port 50B. When the liquid sensor 60 is attached to the ink cartridge 70, therefore, it is possible to supply the ink in the container body 72 to the cavity 43 through the ink supply port 50A without exposing the cavity 43 of the liquid sensor 60 to an ink housing space in the container body 72 of the ink cartridge 70.

With the structure in which the flow of the ink is generated in the cavity 43 through the ink supply port 50A and the ink discharge port 50B in the liquid sensor 60 in the consumption of the ink in the ink cartridge 70, therefore, a bubble is pushed out of the inside of the cavity 43 by the flow of the ink even if it enters the inner part of the cavity 43. Consequently, it is possible to prevent the erroneous detection of the liquid sensor 60 from being caused by the bubble staying in the cavity 43.

According to the embodiment shown in FIG. 28, furthermore, the cavity 43 does not take the shape of a circle or a square but a slender shape. By providing the ink supply port 50A and the ink discharge port 50B on both ends in the longitudinal direction of the cavity 43, therefore, the ink or the bubble stays in the cavity 43 with difficulty. Consequently, it is possible to sufficiently maintain the discharging property of the ink or the bubble and to surely decide the presence of the ink.

In the liquid sensor 60 according to the embodiment shown in FIG. 28, moreover, it is not necessary to expose the cavity 43 to the ink housing space in the container body 72. Therefore, it is possible to prevent a meniscus from being formed in the cavity 43 in a passage through a liquid level. Consequently, it is possible to prevent the erroneous detection of the liquid sensor 60 from being caused by the ink remaining in the cavity 43.

In the ink cartridge 70 according to the embodiment shown in FIG. 28, moreover, the inner part of the container body 72 is divided into the main reservoir chamber 75 and the sub reservoir chamber 76 which are separated from each other, and furthermore, the main reservoir chamber 75 and the sub reservoir chamber 76 are connected to each other through the ink supply port 50A and the ink discharge port 50B in the liquid sensor 60, and the cavity 43 of the liquid sensor 60 is provided on the upper end of the sub reservoir chamber 76.

Therefore, a point of time that the ink in the main reservoir chamber 75 is gone can be detected reliably by means of the liquid sensor 60. Consequently, a user can be informed of a coming ink end. Furthermore, it is possible to inform the user of the number of sheets which can be printed with a residual ink based on the amount of the ink in the sub reservoir chamber 76 which is previously known. Thus, it is possible to prevent a printing paper from being wasted due to the complete consumption of the ink in the middle of a page.

In the ink cartridge 70 according to the embodiment shown in FIG. 28, moreover, the closed auxiliary flow path 77 is formed in the main reservoir chamber 75 and the auxiliary flow path entrance 77a of the auxiliary flow path 77 is positioned on the lower end of the main reservoir chamber 75, and furthermore, the ink supply port 50A of the liquid sensor 60 is caused to communicate with the upper end of the auxiliary flow path 77. Therefore, the bubble generated in the main reservoir chamber 75 enters the auxiliary flow path 77 with difficulty and can be prevented from entering the cavity 43 of the liquid sensor 60.

In the ink cartridge 70 according to the embodiment shown in FIG. 28, furthermore, the inner part of the sub reservoir chamber 76 is filled with an ink until the ink in the main reservoir chamber 75 is completely consumed. Also in the case in which a vibration is applied to the ink cartridge 70, therefore, a liquid level does not swing in the sub reservoir chamber 76 as long as the ink remains in the main reservoir chamber 75. Accordingly, it is possible to prevent the liquid sensor 60 from causing an erroneous detection due to the swing of the liquid level.

According to the liquid sensor 60 in accordance with the embodiment shown in FIG. 28, moreover, a range in which a vibration portion 61 comes in contact with a liquid is limited to a range in which the cavity 43 is present. Therefore, the detection of the liquid can be performed on a pinpoint. Consequently, it is possible to detect an ink level with high precision.

Moreover, almost the whole region corresponding to the cavity 43 is covered with a body portion 46a of a lower electrode 46. Therefore, a difference between a deformation mode in a forcible vibration and that in a free vibration is reduced. In addition, the vibration portion 61 of the liquid sensor 60 takes a symmetrical shape with respect to the center of the liquid sensor 60. Therefore, the rigidity of the vibration portion 61 is almost isotropic as seen from the center.

For this reason, it is possible to suppress the generation of an unnecessary vibration which might be caused by the asymmetry of a structure, and furthermore, to prevent a reduction in the output of a back electromotive force due to the difference between the deformation modes in the forcible vibration and the free vibration. Consequently, it is possible to enhance the precision in the detection of the resonant frequency of a residual vibration in the vibration portion 61 of the liquid sensor 60, and furthermore, to easily detect the residual vibration of the vibration portion 61.

Moreover, almost the whole region corresponding to the cavity 43 is covered with the body portion 46a of the lower electrode 46 having a larger dimension than the cavity 43. Therefore, it is possible to prevent an unnecessary vibration from being caused by the positional shift of the lower electrode 46 in a manufacture, thereby suppressing a reduction in the precision in the detection.

Furthermore, a whole hard and fragile piezoelectric layer 47 is provided in the region corresponding to the cavity 43 and the piezoelectric layer 47 is not present in a position corresponding to a peripheral edge 43a of the cavity 43. Therefore, a crack can be prevented from being generated on the piezoelectric layer in the position corresponding to the peripheral edge of the cavity.

While FIG. 28 shows, as the embodiment, an example in which the liquid sensor 60 described with reference to FIGS. 18 to 23 is attached to the container body 72 as shown in FIG. 4, the invention is not restricted thereto. For example, the liquid sensor 60 described with reference to FIGS. 26 and 27 may be attached to the container body 72 as shown in FIG. 4.

The example in which the liquid sensor 60 described with reference to FIGS. 26 and 27 is attached to the container body 72 as shown in FIG. 4 will be described. The description of common portions to the embodiment shown in FIG. 28 will be omitted.

As discussed with reference to FIGS. 26 and 27, in the liquid sensor 60 according to this example, the dimension of a piezoelectric layer 47 in the longitudinal direction of a cavity 43 (the direction of the extension of a second symmetry axis O2) is set to be greater than a length in the longitudinal direction of the cavity 43. The piezoelectric layer 47 is formed to cover the cavity 43 over a full length thereof in the longitudinal direction of the cavity 43. In the transverse direction of the cavity 43 (the direction of the extension of a first symmetry axis O1), the piezoelectric layer 47 is formed on the inside of the cavity 43 in a smaller dimension than the cavity 43.

In the liquid sensor 60 according to the example, furthermore, a lower electrode 46 is formed to be almost rectangular, and the lower electrode 46 has a larger size than the piezoelectric layer 47 in the transverse direction of the cavity 43 (the direction of the extension of the first symmetry axis O1) and the lower electrode 46 and the piezoelectric layer 47 have a common dimension in the longitudinal direction of the cavity 43 (the direction of the extension of the second symmetry axis O2).

Also in the liquid sensor 60 according to the example, in the same manner as in the embodiments, the generation of an unnecessary vibration can be prevented, and furthermore, a bubble or an ink can be prevented from staying.

According to the liquid sensor 60 in accordance with the example, furthermore, the dimension in the longitudinal direction of the piezoelectric layer 47 is set to be greater than the dimension in the longitudinal direction of the cavity 43. Also in the case in which a position in which the piezoelectric layer 47 is formed is shifted in the longitudinal direction of the cavity 43, therefore, the size of a portion to contribute to a vibration in the whole piezoelectric layer 47 is not changed. Therefore, it is possible to prevent an unnecessary vibration from being generated by the shift of the position in which the piezoelectric layer 47 is formed.

Moreover, in the embodiment shown in FIG. 28 and the above-noted example, it is also possible to employ a structure in which the exit/entrance forming plate 50 is omitted from the liquid sensor 60 and the first opening 73 and the second opening 74 which are formed on the container body 72 of the ink cartridge 70 are utilized as an ink supply port and an ink discharge port to/from the cavity 43 in the liquid sensor 60.

Next, a liquid sensor and an ink cartridge including the liquid sensor according to a further embodiment of the present invention will be described.

Figure 29:
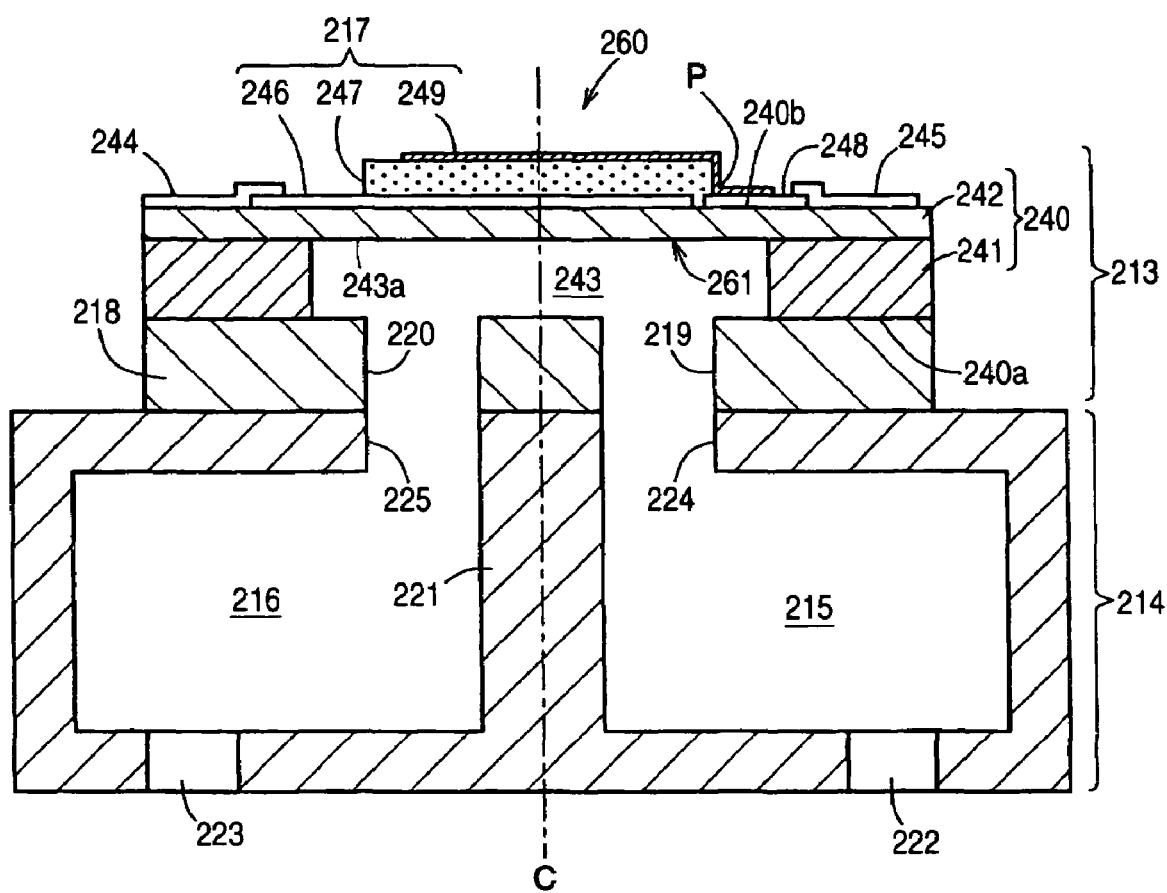
FIG. 29 is a cross-sectional view taken along an A-A line in FIG. 30A, showing a liquid sensor according to a further embodiment of the present invention.

FIG. 29 is a cross-sectional view illustrating the liquid sensor 260 according to the further embodiment of the present invention. Further, FIG. 30 is a diagram illustrating a sensor portion 213 constituting the liquid sensor 260 and FIG. 31 is a diagram illustrating a buffer portion 214 constituting the liquid sensor 260.

The liquid sensor 260 according to this embodiment is configured so as to include the sensor portion 213 having a cavity 243 and the buffer portion 214 having a supply side buffer chamber 215 and a discharge side buffer chamber 216 which communicate with the cavity 243.

The sensor portion 213, which is configured so that a vibration plate 242 is laminated on a cavity plate 241, includes a vibration cavity forming base portion 240 having a first surface 240a and a second surface 240b which face each other, a piezoelectric element 217 laminated on the side of the second surface 240*b* of the vibration cavity forming base portion 240, and a flow path forming plate (flow path forming base portion) 218 laminated on the side of the first surface 240*a* of the vibration cavity forming base portion 240.

In the vibration cavity forming base portion 240, the cavity 243 for receiving medium (ink) to be sensed is defined by a cylindrical space so as to be opened into the first surface 240*a* and a bottom portion 243*a* of the cavity 243 is formed so as to be vibrated by the vibration plate 242. In other word, an outline of an actually vibrated portion in the entire vibration plate 242 is defined by the cavity 243. On both ends of the vibration cavity forming base 240 on the side of the second surface 240*b*, a lower electrode terminal 244 and an upper electrode terminal 245 are formed.

On the second surface 240*b* of the vibration cavity forming base 240, the lower electrode (a first electrode) 246 is formed, which has a main-body portion 246*a* having a substantially circular shape and an extension portion 246*b* which extends out toward the lower electrode terminal 244 from the main-body portion 246 to be connected to the lower electrode terminal 244. The center of the substantially circular main-body portion 246*a* of the lower electrode 246 is brought into line with the center axis C of the cavity 243.

The substantially circular main-body portion 246*a* of the lower electrode 246 is formed so as to have a larger diameter than the circular cavity 243, covering a substantially entire portion of the region which corresponds to the cavity 243. Further, the substantially circular main-body portion 246*a* of the lower electrode 246 includes a notched portion 246*c* which is formed so as to be further inside than a position corresponding to a peripheral edge 243*b* of the cavity 243.

On the lower electrode 246, a piezoelectric layer 247 is laminated, which has a circular main-body portion 247*a* formed with a smaller diameter than the cavity 243 and a projecting portion 247*b* projecting from the main-body portion 247*a* in the range of the region corresponding to the cavity 243. As can be seen from FIGS. 29 and 30A, the entire portion of the piezoelectric layer 247 falls in the range of the region corresponding to the cavity 243. In other words, the piezoelectric layer 247 does not have any portion extending across the position corresponding to a peripheral edge 243*b* of the cavity 243.

The center of the main-body portion 247*a* of the piezoelectric layer 247 is brought into line with (i.e. is coincident with) the center axis C of the cavity 243. The substantially entire portion of the main-body portion 247*a* of the piezoelectric layer 247 is laminated on the lower electrode 246, except for a portion corresponding to the notched portion 246*c* of the lower electrode 246.

In the second surface 240*b* of the vibration cavity forming base portion 240, an auxiliary electrode 248 is formed, which extends cross the position corresponding to the peripheral edge 243*b* of the cavity 243 to the inside of the region corresponding to the cavity 243, from the outside of the region corresponding to the cavity 243. A portion of the auxiliary electrode 248 is positioned inside the notched portion 246*c* of the lower electrode (the first electrode) 246 to support the projecting portion 247*b* of the piezoelectric layer 247 and an adjacent portion thereof from the second surface 240*b* of the vibration cavity forming base portion 240. The auxiliary electrode 248 is preferably made of the same material as the lower electrode 246 and has the same thickness as the lower electrode 246. As such, the projecting portion 247*b* of the piezoelectric layer 247 and the adjacent portion thereof are supported from the second surface 240*b* of the vibration cavity forming base portion 240 by the auxiliary electrode 248, so as not to cause a level difference in the piezoelectric layer 247, so that a mechanical strength can be prevented from be reduced.

On the piezoelectric layer 247, the circular main-body portion 249*a* of the upper electrode (the second electrode) 249 is laminated, the upper electrode 249 being formed with a smaller diameter than the main-body portion 247*a* of the piezoelectric layer 247. Further, the upper electrode 249 has an extension portion 249*b* which extends from the main-body portion 249*a* to be connected to the auxiliary electrode 248. As can be seen from FIG. 29, a position P, from which the extension portion 249*b* of the upper electrode 249 is connected to the auxiliary electrode 248, is positioned in the range of the region corresponding to the cavity 243.

The piezoelectric element 217 is formed by the respective main-body portions of the upper electrode 246, the piezoelectric layer 247 and upper electrode 249.

Figure 30A:
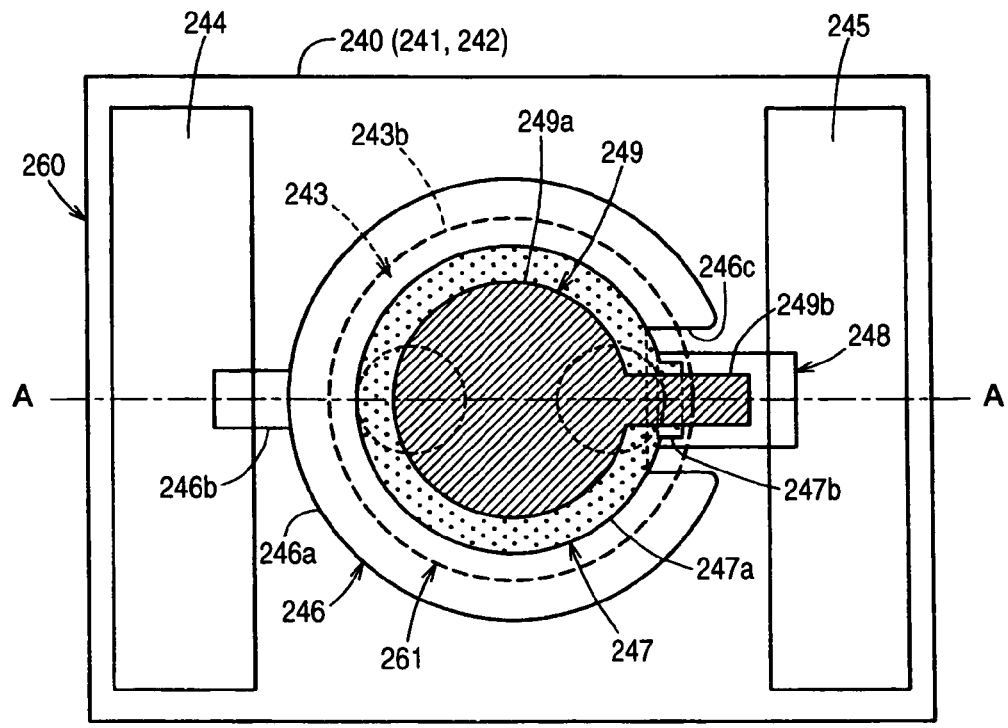
FIG. 30A is a plan view illustrating a sensor portion of the liquid sensor shown in FIG. 29
Figure 30B:
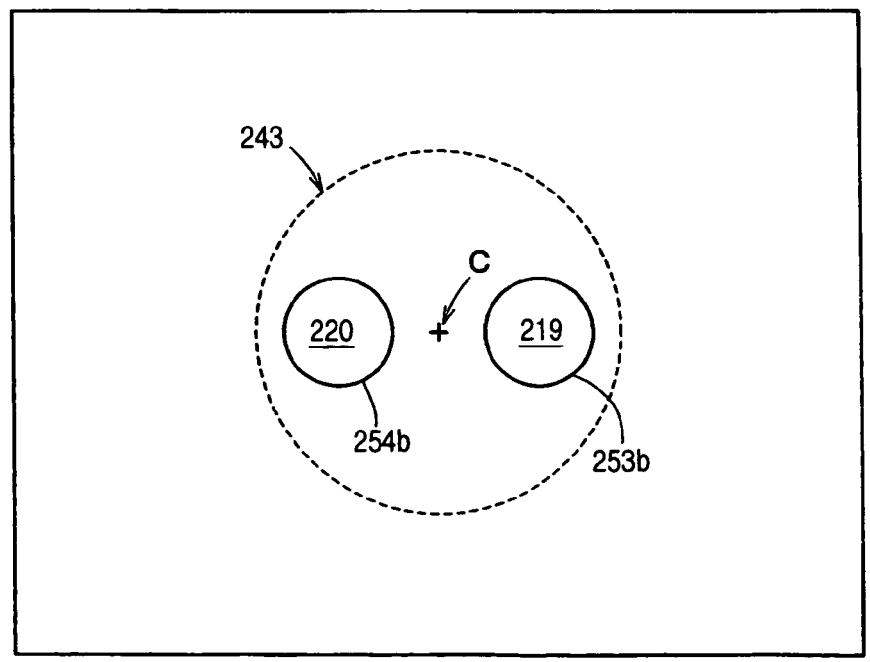
FIG. 30B is a bottom view illustrating the same.
Figure 31:
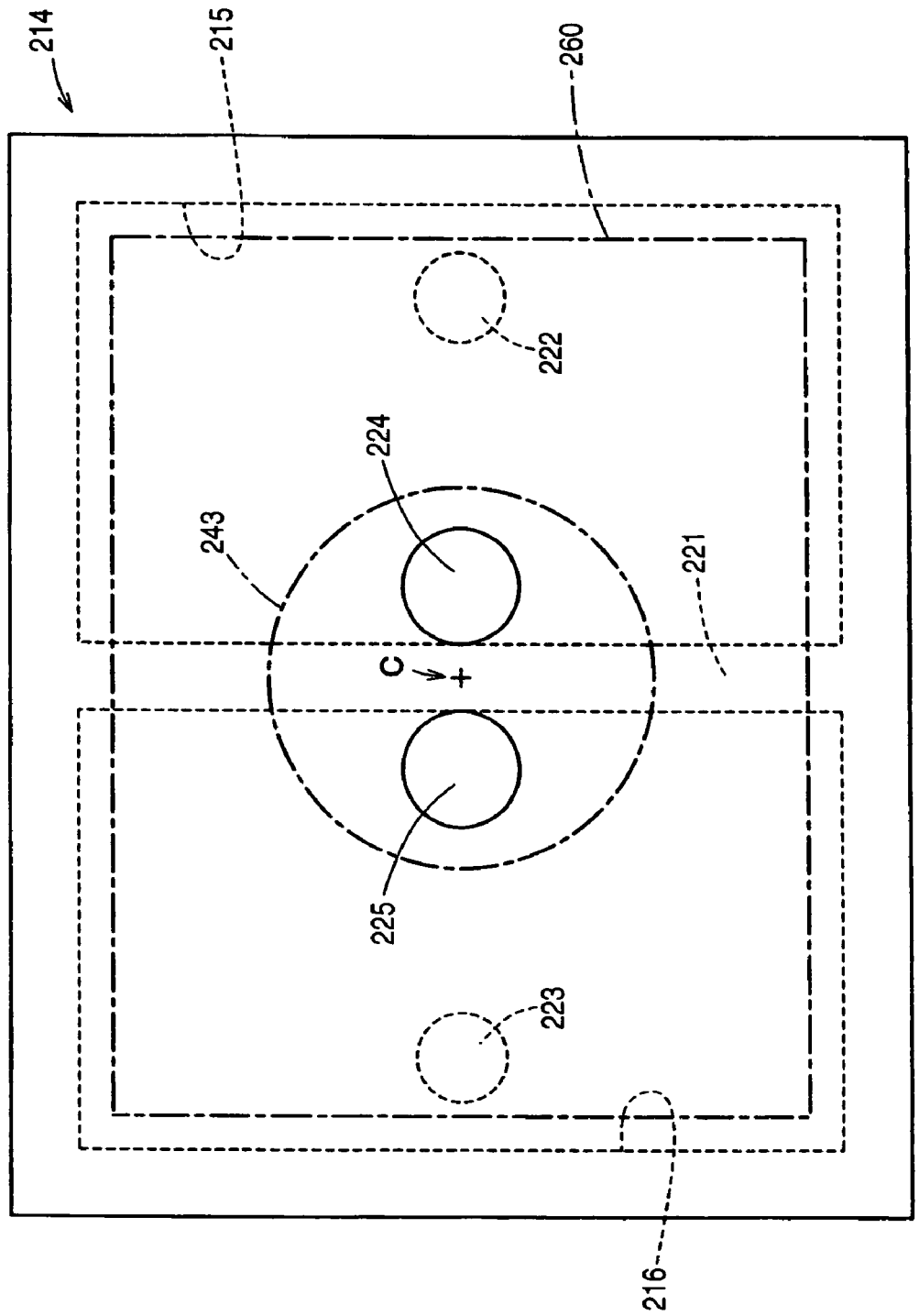
FIG. 31 is a plan view illustrating a buffer portion of the liquid sensor shown in FIG. 29.

As can be seen from FIGS. 30A and 30B, the upper electrode 249 is electrically connected to the upper electrode terminal 245 through the auxiliary electrode 248. As such, when the upper electrode 249 is electrically connected to the upper electrode terminal 245 through the auxiliary electrode 248, a level difference caused by the total thickness of the piezoelectric layer 247 and the upper electrode 246 can be absorbed by both of the upper electrode 249 and the auxiliary electrode 248. As a result, it can be prevented that a large level difference is caused in the upper electrode 249 to reduce a mechanical strength.

The main-body portion 249*a* of the upper electrode 249 is formed in a circular shape, of which the center is brought into line with the center axis C of the cavity 243. The main-body portion 249*a* of the upper electrode 249 is formed with a smaller diameter than any one of the main-body portion 247*a* of the piezoelectric layer 247 and the cavity 243.

As such, the main-body 247*a* of the piezoelectric 247 is configured so as to be interposed between the main-body portion 249*a* of the upper electrode 249 and the main-body portion 246*a* of the lower electrode 246. Accordingly, the piezoelectric layer 247 can be efficiently driven to be deformed.

Moreover, between the main-body 246*a* of the lower electrode 246 and the main-body portion 249*a* of the upper electrode 249 which are connected with the piezoelectric layer 247, the main-body portion 249*a* of the upper electrode 249 has the smaller diameter. Accordingly, the main-body portion 249*a* of the upper electrode 249 comes to determine the portion where a piezoelectric effect is produced in the piezoelectric layer 247.

The center of each of the main-body portion 247*a* of the piezoelectric layer 247, the main-body portion 249*a* of the upper electrode 249, and the main-body portion 246*a* of the lower electrode 246*a* is brought into line with the center axis C of the cavity 243. Further, the center axis C of the cylindrical cavity 243 for determining the portion which can be vibrated in the vibration plate 242 is positioned in the center of the liquid sensor 260.

A vibration portion 261 of the liquid sensor 260 is constituted with the portion which is defined by the cavity 243 and can be vibrated in the vibration plate 242, the portion corresponding to the cavity 243 in the main-body portion 246*a* of the lower electrode 246, and the portions corresponding to the cavity 243 in the main-body portion 249*a* and the extension portion 249*b* of the upper electrode 249 together with the main-body portion 247*a* and the projecting portion 247*b* of the piezoelectric layer 247. Also, the center of the vibration portion 261 of the liquid sensor 260 is brought into line with the center of the liquid sensor 260.

The main-body portion 247a of the piezoelectric layer 247, the main-body portion 249a of the upper electrode 249, the main body 246a of the lower electrode 246, and the portion which can be vibrated in the vibration plate 242 (that is, the portion corresponding to the bottom portion 243a of the cavity 243) have a circular shape and are disposed in the entire portion of the piezoelectric layer 247, that is, inside the region where the main-body portion 247a and the projecting portion 247b of the piezoelectric layer 247 correspond to the cavity 243. Therefore, the vibration portion 261 of the liquid sensor 260 is substantially symmetric with respect to the center of the liquid sensor 260.

Further, the liquid sensor 260 according to the present embodiment includes a flow path forming plate (flow path forming base portion) 218 which is laminated on and joined to the first surface 240a of the vibration cavity forming base portion 240.

The flow path forming plate 218, are formed with an ink supply path (liquid supply path) 219 for supplying ink to be sensed to the cavity 243 and an ink discharge path (liquid discharge path) 220 for discharging ink to be sensed from the cavity 243. The ink supply path 219 and the ink discharge path 220 have the same size and are defined by a cylindrical space.

Any one of the ink supply path 219 and the ink discharge path 220 formed in the above-described flow path forming plate 218 is formed inside the region corresponding to the circular cavity 243, and the ink supply path 219 and the ink discharge path 220 are disposed symmetrically with respect to the center axis C of the cavity 243. Accordingly, the space, which is defined by the cavity 243, the ink supply path 219, and the ink discharge path 220, is formed symmetrically with respect to the center axis C of the cavity 243 which exists in the region interposed between the ink supply path 219 and the ink discharge path 220.

Further, the ink supply path 219 and the ink discharge path 220 are narrowed with respect to the cavity 243. That is, in this embodiment, each of the ink supply path 219 and the ink discharge path 220 is formed for the single cavity 243, but the flow-path area of one of the flow paths (the ink supply path 219 or the ink discharge path 220) is set to be smaller than at least one half of the area of the cavity 243. Further, each of the ink supply path 219 and the ink discharge path 220 is set to a certain length so that the fluidic mass of liquid exists inside, and the flow-path length of each of the ink supply path 219 and the ink discharge path 220 may be set to be two times larger than the flow-path diameter of each of the ink supply and discharge paths.

Meanwhile, the liquid sensor 260 includes a buffer portion 214 having the supply side buffer chamber 215 communicating with the ink supply path 219 and the discharge side buffer chamber 216 communicating with the ink discharge path 220.

From a plan view in this embodiment, the buffer portion 214 having a rectangular shape is slightly larger than the liquid sensor 260 (the sensor portion 213) and is formed in a cubical shape as a whole. The inside of the buffer portion 214 is divided into two spaces having the same volume by a partitioning wall 221 disposed in the center. One of the two spaces is the supply side buffer chamber 215 and the other one is the discharge side buffer chamber 216.

A portion of the buffer portion 214 opposite to the surface to which the sensor portion 213 is joined, is formed with an inflow opening 222 through which ink flows into the supply buffer chamber 215 and a discharge opening 223 for discharging ink of the discharge side buffer chamber 216. Further, the surface of the buffer portion 214, to which the sensor portion 213 is joined, is formed with an inflow flow path 224 for supplying the ink flowing into the supplying buffer chamber 215 to the cavity 243 through the ink supply path 219 and a discharge flow path 225 for discharging the ink of the cavity 243 to the supply side buffer chamber 215 through the ink discharge path 220.

The inflow flow path 224 and the discharge flow path 225 are defined as a flow-path space having a substantially cylindrical shape, which have the same size. Further, openings of the inflow flow path 224 and the discharge flow path 225 are respectively matched with openings of the ink supply path 219 and the ink discharge path 220. In the present embodiment, the liquid supply path of the present invention is formed with the ink supply path 219 and the inflow flow path 224 and the liquid discharge path of the present invention is formed with the ink discharge path 220 and the discharge flow path 225.

The supply side buffer chamber 215 and the discharge side buffer chamber 216 of the liquid sensor 260 are formed symmetrically with respect to the center axis C of the cavity 243. In other words, the space defined by the cavity 243, the ink supply path 219, the ink discharge path 220, the inflow flow path 224, the discharge flow path 225, the supply side buffer chamber 215, and the discharge buffer chamber 216 is formed symmetrically with respect to the center axis C of the cavity 243.

Further, the volume of each of the supply side buffer chamber 215 and the discharge side buffer chamber 216 of the liquid sensor 260 is set to be at least ten times larger than the cavity 243.

Under such a configuration, the ink to be sensed inside the cartridge flows from the inflow opening 222 into the supply side buffer chamber 215 to be supplied to the cavity 243 through the inflow flow path 224 and the ink supply path 219. Also, the ink supplied to the cavity 243 is discharged into the discharge side buffer chamber 216 through the ink discharge path 220 and the discharge flow path 225 and further discharged from the discharge side buffer chamber 216 through the discharge opening 223.

Among the members included in the liquid sensor 260, the cavity plate 241, the vibration plate 242, and the flow path forming plate 218 are made of the same material and integrally formed by being sintered with one another. As such, since a plurality of substrates is sintered to be integrated, handling of the liquid sensor 260 becomes easy. Further, since the respective members are made of the same material, a crack can be prevented from occurring due to the difference among their linear expansion coefficients.

As a material of the piezoelectric layer 247, it is preferable that lead zirconate titanate (PZT), lead lanthanum zirconate titanate (PLZT), or a leadless piezoelectric film is used. As a material of the cavity plate 241, zirconia or alumina is preferably used. Further, for the vibration plate 242, the same material as that of the cavity plate 241 is preferably used. The upper electrode 249, the lower electrode 246, the upper electrode terminal 245 and the lower electrode terminal 244 can be made of metallic materials such as gold, silver, copper, platina, aluminum, nickel, and the like, which have a conductivity.

Figure 32A:
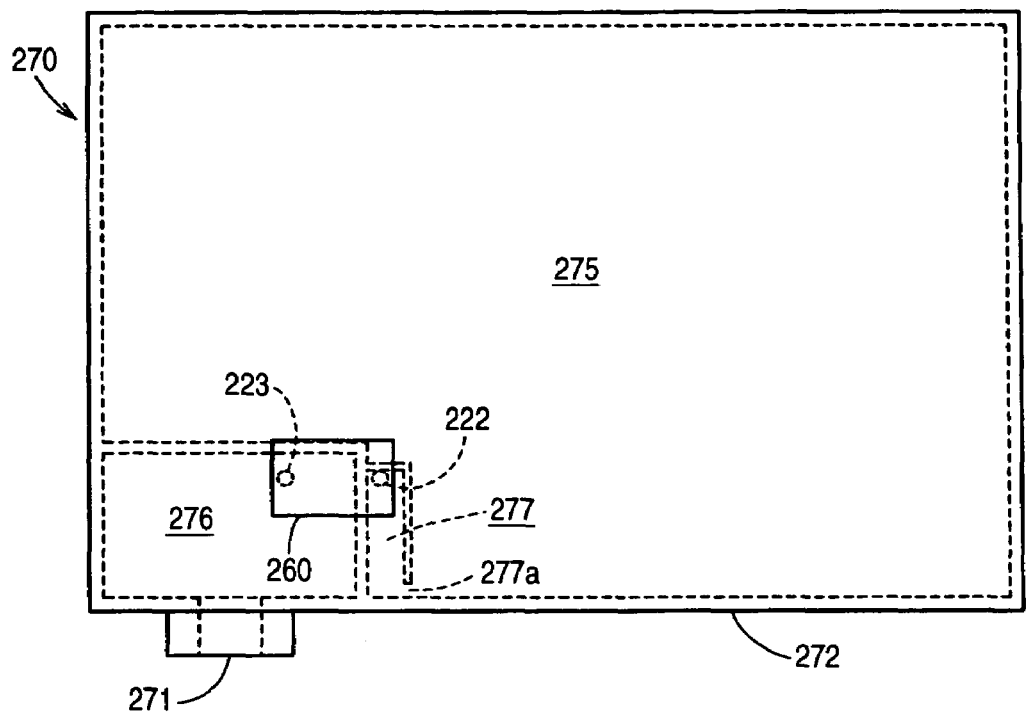
FIG. 32A is a side view illustrating an ink cartridge including the liquid sensor shown in FIG. 29
Figure 32B:
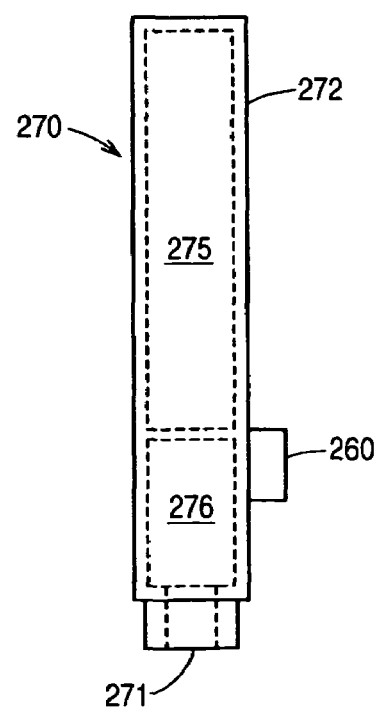
FIG. 32B is a front view illustrating the same.
Figure 33:
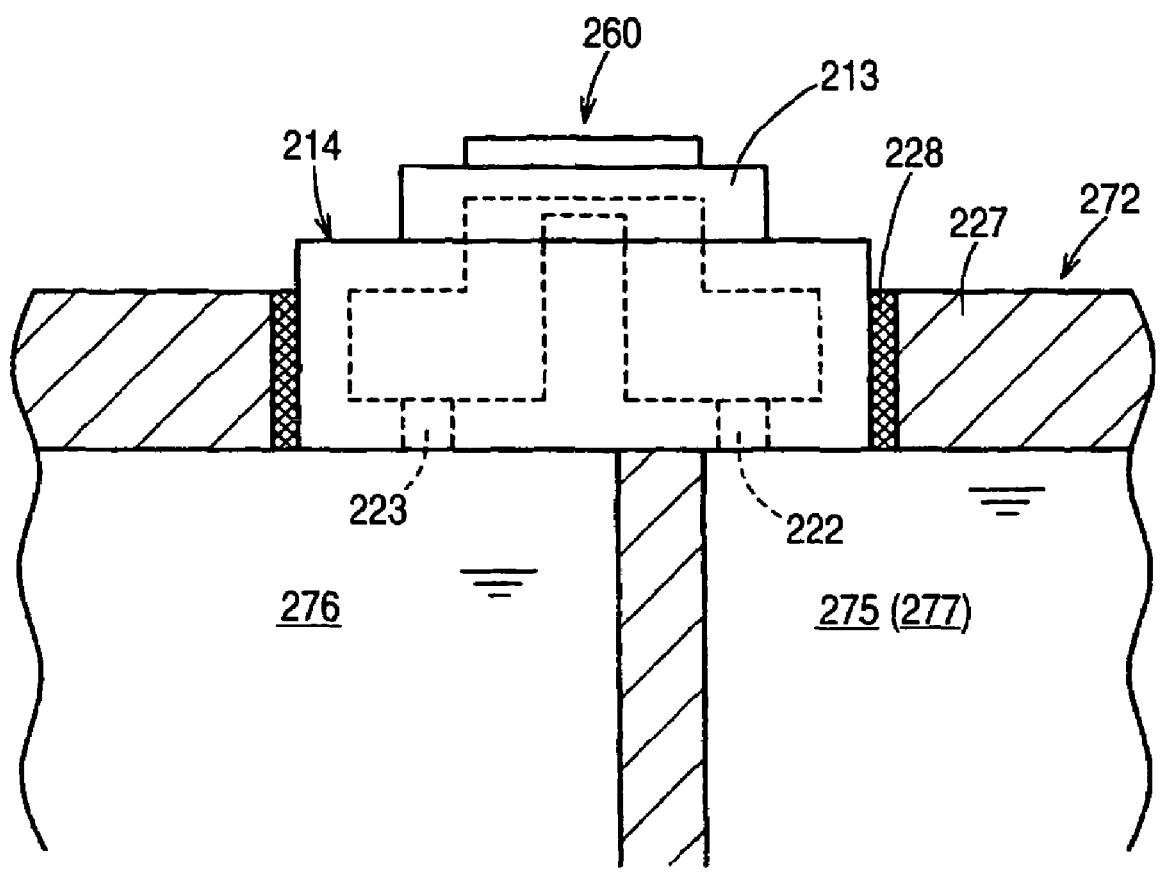
FIG. 33 is an enlarged cross-sectional view illustrating a mounting portion of the liquid sensor shown in FIG. 29 to the ink cartridge.

FIG. 32 is a diagram illustrating the ink cartridge 270 including the liquid sensor shown in FIG. 29, and FIG. 33 is a diagram illustrating an example of the liquid sensor 260 mounted on the ink cartridge 270.

As shown in FIG. 32, the ink cartridge (liquid container) 270 with the liquid sensor 260 mounted thereon includes a container body 272 having an ink outlet port (liquid outlet port) 271 for delivering the ink reserved inside to the outside.

As shown in FIG. 33, the liquid sensor 260 as a whole is mounted on the container body 272. On a rectangular opening 226 formed on a wall surface 227 of the container body 272, the buffer portion 214 is fixed in a liquid-tight manner by an adhesive 228 or the like. In this case, the sensor portion 213 of the liquid sensor 260 is disposed outside the container body 272 so that an inflow opening 222 and a discharge opening 223 of the buffer portion 214 are opened inside the container body 72.

The inside of the container body 272 (refer back to FIG. 32) is partitioned into a main reservoir chamber (liquid reservoir chamber) 275, which constitutes the major part of the entire inner space of the container body 272 to reserve ink, and a sub reservoir chamber (liquid delivery space) 276 having a smaller volume than the main reservoir chamber 275. The main reservoir chamber 275 is separated from the sub reservoir chamber 276. The sub reservoir chamber 276 is positioned in the side which is closer to the ink delivery opening (liquid outlet port) 271 than to the main reservoir chamber 275 in the flow direction of ink when the ink is consumed.

The inflow opening 222 of the liquid sensor 260 is opened so as to communicate with the main reservoir chamber 275, and the discharge opening 223 is disposed so as to be opened into the sub reservoir chamber 276 which is the liquid delivery space. Accordingly, the supply side buffer chamber 215 communicates with the main reservoir chamber 275 that constitutes the major part of the inner space of the container body 272 and that is provided for reserving liquid. Further, the discharge side buffer chamber 216 is disposed so as to communicate with the liquid delivery space in the inner space of the container body 272. The liquid delivery space communicates with the ink delivery opening 271 for delivering the liquid reserved inside to the outside.

A closed auxiliary flow path 277 is formed inside the main reservoir chamber 275, and, an auxiliary flow path entrance 277a is formed at a lower end of the auxiliary flow path 277. The auxiliary flow path entrance 277a is positioned at the lower end inside the main reservoir chamber 275. Further, the inflow opening 222 of the liquid sensor 260 communicates with an upper end of the auxiliary flow path 277 to constitute an exit of the auxiliary flow path 277.

As described above, the inflow opening 222 of the liquid sensor 260 communicates with the main reservoir chamber 275 through the auxiliary flow path 277, and the discharge opening 223 communicates with the ink delivery opening 271 through the sub reservoir chamber 276. Accordingly, the ink reserved in the main reservoir chamber 275 flows in the supply side buffer chamber 215 from the inflow opening 222 via the auxiliary flow path 277 to be supplied to the cavity 243 through the inflow flow path 224 and the ink supply path 219. Then, the ink supplied to the cavity 243 is discharged into the discharge side buffer chamber 216 through the ink discharge flow path 220 and the inflow flow path 225, and the ink is discharged from the ink delivery opening 271 via the discharge opening 223 and the sub reservoir chamber 276 from the discharge side buffer chamber 216, to be finally supplied to the printing head 212.

In the present embodiment having such a configuration, all the ink to be delivered to the ink delivery opening 271 through the sub reservoir chamber 276 passes through the ink supply path 219 and the ink discharge path 220 of the liquid sensor 260 in advance.

Next, an operation of sensing liquid in the above-described liquid container will be described.

In the ink cartridge 270 including the above-described liquid sensor 260, when ink sufficiently remains in the container body 272 so that the inside of the sub reservoir chamber 276 is filled with the ink, the cavity 243 is filled with the ink. On the other hand, if the liquid inside the container body 272 of the ink cartridge 270 is consumed so that the main reservoir chamber 275 runs out of ink, the liquid level within the sub reservoir chamber 276 falls down. Further, if the liquid level falls more downward than the position of the cavity 243 of the liquid sensor 260, there is no more ink in the cavity 243.

Subsequently, the liquid sensor 260 detects a difference in acoustic impedance caused by the state change. With that, the liquid sensor 260 can sense whether ink sufficiently remains in the container body 272 or ink has been consumed above a certain amount.

More specifically in the liquid sensor 260, a voltage is applied between the upper electrode 249 and the lower electrode 246 through the upper electrode terminal 245 and the lower electrode terminal 244. In that case, in the piezoelectric layer 247, an electric field is generated in the portion interposed between the upper electrode 249 and the lower electrode 246. The piezoelectric layer 247 is deformed by the electric field. If the piezoelectric layer 247 is deformed, a flexural vibration is generated in the vibrated region of the vibration plate 242 (the region corresponding to the bottom portion 243a of the cavity 243). If the application of the voltage is released after the piezoelectric layer 247 is forced to be deformed as described above, the flexural vibration remains in the vibration portion 261 of the liquid sensor 260 for a while.

The residual vibration is a free vibration between the vibration portion 261 of the liquid sensor 260 and the medium within the cavity 243. Accordingly, when the voltage having a pulse wave form or a rectangular wave form is applied to the piezoelectric layer 247, a resonant condition between the vibration portion 261 and the medium after the voltage is applied can be easily obtained. The residual vibration is the vibration of the vibration portion 261 of the liquid sensor 260, accompanied by the deformation of the piezoelectric layer 247. For this reason, with the residual vibration, the piezoelectric layer 247 generates a back electromotive force. The back electromotive force is detected through the upper electrode 249, the lower electrode 246, the upper electrode terminal 245, and the lower electrode terminal 244. Since a resonant frequency can be specified by the detected back electromotive force, the existence of ink within the container body 272 of the ink cartridge 270 can be sensed on the basis on the resonant frequency.

In the liquid sensor 260 according to the present embodiment as described above and as discussed with reference to FIGS. 5A and 5B, it can be sensed whether the liquid level has passed over the mounting position level of the liquid sensor 260 (the position of the cavity 243, in a precise sense), by a change in the frequency of the residual vibration or the amplitude of vibration after the sensor portion 261 of the liquid sensor 260 is forced to be vibrated.

Figure 34:
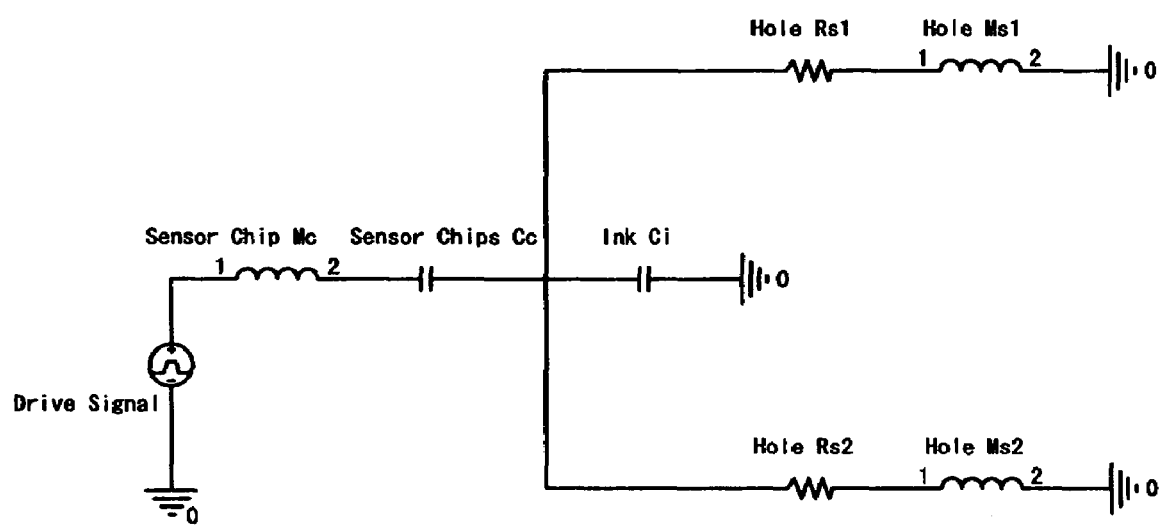
FIG. 34 is a diagram illustrating an example of an equivalent circuit for approximately simulating a vibration of a vibration portion.

FIG. 34 is a diagram illustrating an equivalent circuit for approximately simulating a vibration of the vibration portion 261 of the above-described liquid sensor 260.

In FIG. 34, inertance (Mc) of the vibration portion 261 (sensor chip) and inheritances (Ms1 and Ms2) of the ink supply path 219 and the ink discharge path 220 (holes) are represented by a coil. Compliance (Cc) of the vibration portion 261 (sensor chip) and compliance (Ci) of ink are represented by a capacitor. Resistances (Rs1, Rs2) of the ink supply path 219 and the ink discharge path 220 (holes) are represented by a resistance. Further, the supply side buffer chamber 215 and the discharge side buffer chamber 216, which respectively communicate with the ink supply path 219 and the ink discharge path 220, are represented by a ground.

The compliance (Cc) of the vibration portion 261 is calculated by a structure finite element method. Further, the inertance (MC) of the vibration portion 261 is approximated by a series system of the inertance and the compliance, of which an approximate value can be calculated by the following approximate expression:

$$Mc = 1/(4\pi 2) \times 1/(f2) \times 1/Cc.$$

Herein, f is an own natural period of the vibration portion 261, which can be calculated by a structure finite element method or an actual measurement.

Further, the compliance (Ci) of ink can be calculated by the below expression:

$$Ci = C \times Vi.$$

Herein, C is compressibility of ink and Vi is a volume of ink. The compressibility of water is 4.5e−10/Pa.

Further, the inertances (Ms) of the ink supply path 219 and the ink discharge path 220 (holes) is calculated by a volume finite element method or can be calculated by the next simple expression in the case where a flow path (hole) is cylindrical:

$$Ms = \rho \times L/\pi/r2.$$

Herein, ρ is a viscosity of ink, L is a length of the flow path (hole), and r is a radius of the flow path (hole).

The value calculated as above is used, so that the vibration of the vibration portion 261 can be simulated approximately by the equivalent circuit of FIG. 34.

With the result obtained by simulating the vibration of the vibration portion 261 with the equivalent circuit, the following is appreciated. When Ms1 and Rs1 are substantially equal to Ms2 and Rs2 respectively, the vibration is simple so that an unnecessary vibration mode is not produced. Accordingly, in the present invention, the space defined by the cavity 243, the ink supply path 219 and the ink discharge path 220 is formed symmetrically with respect to the center axis C of the cavity 243.

Further, a requirement for the supply side buffer chamber 215 and the discharge side buffer chamber 216 functioning as a buffer is that the respective compliances of the buffer chambers 215 and 216 is preferably set ten times larger than the compliance (Cc) of the vibration portion 261, so that the pressure within the respective buffer chambers 215 and 216 does not become pretty high due to the vibration of the vibration portion 261. Further, in order that an unnecessary vibration is not generated, it is preferable that the inertances of the buffer chambers 215 and 216 are a tenth (1/10) less than the inertance (Ms) of the flow path (hole).

As described above, the liquid sensor 260 and the ink cartridge 270 according to the present embodiment include the vibration cavity forming base portion 240 which is formed with the ink supply path 219 for supplying ink to the cavity 243 and the ink discharge path 220 for discharging ink from the cavity 243, so that the ink supply into the cavity 243 is performed through the ink supply path 219 and the ink discharge from the cavity 243 is performed through the ink discharge path 220. Therefore, when the liquid sensor 260 is mounted on the ink cartridge 270 or the like, the cavity 243 of the liquid sensor 260 is not directly exposed to the ink storage space and ink can be supplied to the cavity 243 through the ink supply path 219.

As such, it is configured that ink flows inside the ink supply path 219 and the ink discharge path 220 of the liquid sensor 260 when ink is consumed. Therefore, even if bubbles enter the cavity 243, the bubbles are pushed out of the inside of the cavity 243 by the ink flow. As a result, erroneous detection of the liquid sensor 260 can be prevented, which is caused by the bubbles accumulated inside the cavity 243. As such, the detection precision of the liquid sensor 260 is enhanced and remaining liquid decreases to lead to reduced industrial waste.

Further, since the cavity 243 does not need to be exposed to the ink storage space, meniscus can be prevented from being formed inside the cavity 243 when ink passes through the liquid level. Accordingly, erroneous detection of the liquid sensor 260 can be prevented, which is caused by the ink remaining inside the cavity 243. Furthermore, the cavity 243 is not exposed toward the ink storage space, but is enclosed from the ink storage space by the flow path forming plate 218. Therefore, due to a change of ink level, the existence of ink and the like, a difference in the residual vibration remaining in the vibration portion 261 when the vibration portion 261 is forced to be vibrated becomes large, so that detection sensitivity becomes high to enhance detection precision and to prevent erroneous detection.

Further, since the space defined by the cavity 243, the ink supply path 219, and the ink discharge path 220 is formed symmetrically with respect to the center axis C of the cavity 243 existing in the region interposed between the ink supply path 219 and the ink discharge path 220, the shape of the space defined the cavity 243, the ink supply path 219, and the ink discharge path 220 is made simple as well as the vibration mode of the residual vibration remaining in the bottom surface of the cavity 243. The cavity 243 is a space where the vibration of the bottom surface of the cavity 243 is propagated. Accordingly, the simulation of the residual vibration when the bottom surface of the cavity 243 is forced to be vibrated becomes easy to perform and the difference between a design and a practice becomes small, so that adjusting operation can be simple or detection precision can be enhanced.

Further, since the spatial space defining the cavity 243 is substantially circular, the shape of the cavity 243 where the vibration of the bottom surface of the cavity 243 is propagated is made simpler as well as the vibration mode of the residual vibration remaining on the bottom surface of the cavity 243. Further, the simulation of the residual vibration when the bottom surface of the cavity 243 is forced to be vibrated becomes extremely easy to perform and the difference between a design and a practice becomes small, so that adjusting operation can be simple and detection precision can be enhanced.

Further, since the ink supply path 219 and the ink discharge path 220 is respectively narrowed with respect to the cavity 243 and their length is set so that the fluidic mass of the ink exist inside, a suitable flow-path resistance is generated in the ink supply path 219 and the ink discharge path 220. Therefore, the pressure variation within the cavity 243 generated by the vibration on the bottom surface of the cavity 243 is prevented from being diffused throughout two buffer chambers 215 and 216, and an appropriate residual vibration is generated to enhance and secure detection precision. In particular, when the flow-path length of each of the ink supply path 219 and the ink discharge path 220 is set to be two times larger than the flow-path diameter, the described-above effect becomes remarkable.

Further, in the liquid sensor 260 which includes the supply side buffer chamber 215 communicating with the ink supply path 219 and the discharge side buffer chamber 216 communicating with the ink discharge path 220, the ink supply path 219 and the ink discharge path 220, through which ink flows in and from the cavity 243, are opened respectively into the supply side buffer chamber 215 and the discharge side buffer chamber 216 and are not opened directly to the ink reservoir space of the container body 272. Therefore, even though bubbles are produced in the ink reservoir space due to the vibration of ink, the bubbles are previously trapped in the supply side buffer chamber 215 and the discharge side buffer chamber 216 so that it hardly enters the cavity 243. Accordingly, erroneous detection of the liquid sensor 260 caused by the bubbles accumulated inside the cavity 243 can be prevented. Further, since the liquid sensor 260 is disposed in the vicinity of the bottom portion of the ink cartridge 270, the effect of preventing entering of bubbles is further enhanced.

Further, since the ink supply path 219 and the ink discharge path 220, through which ink flows in and from the cavity 243, are not opened directly to the ink reservoir space of the container body 272 but are opened respectively into the supply side buffer chamber 215 and the discharge side buffer chamber 216, the ink pressure generated in the ink reservoir space within the ink cartridge 270 does not act directly on the cavity 243. Therefore, erroneous detection of the liquid sensor 260 caused by the influence of the pressure due to the vibration of ink can be prevented.

Since the supply side buffer chamber 215 and the discharge side buffer chamber 216 of the liquid sensor 260 is formed symmetrically with respect to the center axis C of the cavity 243, the shape of the members constituting the buffer chambers 215 and 216 can be made simple, manufacture becomes easy, and the members can be miniaturized.

When the supply side buffer chamber 215 and the discharge side buffer chamber 216 of the liquid sensor 260 respectively have at least ten times larger volume than the cavity 243, the pressure variation of ink generated in the ink reservoir space within the ink cartridge 270 does not exert an influence on the sensor characteristics of the liquid sensor 260, so that erroneous detection of the liquid sensor 260 caused by the influence of the pressure due to the vibration of ink can be prevented. Further, since the pressure within the two buffer chambers 215 and 216 does not increase due to the vibration of the bottom surface of the cavity 243, an unnecessary vibration is not generated and the vibration mode of the residual vibration remaining on the bottom surface of the cavity 243 is made simple, which makes it possible to enhance detection precision.

The supply side buffer chamber 215 communicates with the main reservoir chamber 275 which constitutes the major part of the inner space of the container body 272 to reserve ink, and the discharge side buffer chamber 216 communicates with the sub reservoir chamber 276 which is a liquid delivery space which communicates the ink delivery opening 271 for delivering the ink reserved inside the container body 272 to the outside. Therefore, the ink reserved in the main reservoir chamber 275 of the container body 272 flows from the entrance of the supply side buffer chamber 215 of the liquid sensor 260 to be discharged from the exit of the discharge side buffer chamber 216 to be finally delivered to the ink delivery opening 271 of the container body 272. Further, all the ink to be delivered to the ink delivery opening 271 of the container body 272 passes through the supply side buffer chamber 215, the cavity 243, and the discharge side buffer chamber 216 of the liquid sensor 260 in advance, so that the consumption of ink can be sensed reliably.

Further, according to the above-described liquid sensor 260, the ink discharge path 220 is formed in accordance with the region corresponding to the cavity 243, so that the bubbles which enter the cavity can be discharged reliably.

Additionally in the ink cartridge 270, the inside of the container body 272 is partitioned into the main reservoir chamber 275 and the sub reservoir chamber 276 which are separated from each other, and communicates with the main reservoir chamber 275 and the sub reservoir chamber 276 through the inflow opening 222 and the discharge opening 223 of the liquid sensor 260 so that the cavity 243 of the liquid sensor 260 is disposed at the upper end of the sub reservoir chamber 276.

Consequently, since the liquid sensor 260 can detect when the ink inside the main reservoir chamber 275 runs out, a user can be informed that ink is running out. Further, based on the amount of ink within the sub reservoir chamber 276, which is previously sensed, a user can be informed how many pages can be printed by the remaining ink. Therefore, it can be prevented that a printed paper is wasted when ink runs out on the way of printing of the printed paper.

Additionally, according to the described-above ink cartridge 270, the closed auxiliary flow path 277 is formed inside the main reservoir chamber 275, the auxiliary flow path 277a of the auxiliary flow path 277 is disposed in the lower end of the main reservoir chamber 275, and the inflow opening 222 of the liquid sensor 260 communicates with the upper end of the auxiliary flow path 277. For this reason, the bubbles produced in the main reservoir chamber 275 hardly enter the auxiliary flow path 277 and can be prevented from entering the cavity 243 of the liquid sensor 260.

According to the above-described ink cartridge 270, the inside of the sub reservoir chamber 276 is filled with ink until all the ink within the main reservoir chamber 275 is consumed. Therefore, even when a vibration is applied to the ink cartridge 270, the liquid level in the sub reservoir chamber 276 does not shake as long as ink remains in the main reservoir chamber 275. Accordingly, erroneous detection of the liquid sensor 260 caused by the shake of liquid level can be prevented from occurring.

Further, according to the above-described liquid sensor 260, the range where the vibration portion 261 comes in contact with ink is limited to the range corresponding to the cavity 243. Therefore, pinpoint detection of ink can be performed, so that ink level can be sensed with high precision.

Since the substantially entire region corresponding to the cavity 243 is covered with the main-body portion 246a of the lower electrode 246, the difference between the deformation mode at the time of a forced vibration and the deformation mode at the time of a free vibration becomes small. Further, since the vibration portion 261 of the liquid sensor 260 is formed symmetrically with respect to the center of the liquid sensor 260, the rigidity of the vibration portion 261 is nearly isotropic, as seen from the center.

For this reason, an unnecessary vibration caused by structural asymmetry is suppressed from being produced, and the output reduction of the back electromotive force is prevented, which is caused by the difference between the deformation mode at the time of a forced vibration and the deformation mode at the time of a free vibration. Accordingly, the detection precision for the resonant frequency of the residual vibration in the vibration portion 261 of the liquid sensor 260 is enhanced, and the detection of the residual vibration of the vibration portion 261 becomes easy.

Further, since the substantially entire portion of the region corresponding to the cavity 243 is covered with the main-body portion 246a of the lower electrode 246 having a larger diameter than the cavity 243, a necessary vibration is prevented from being produced, which is caused by the positional deviation of the lower electrode 246 in manufacturing. As a result, the deterioration of detection precision can be prevented.

Further, the entire piezoelectric layer 247, which is inherently brittle, is disposed inside the region corresponding to the cavity 243 and does not exist in the position corresponding to the peripheral edge 243b of the cavity 243. For this reason, the occurrence of a crack of piezoelectric film is prevented in the position corresponding to the peripheral edge of the cavity.

Figure 35A:
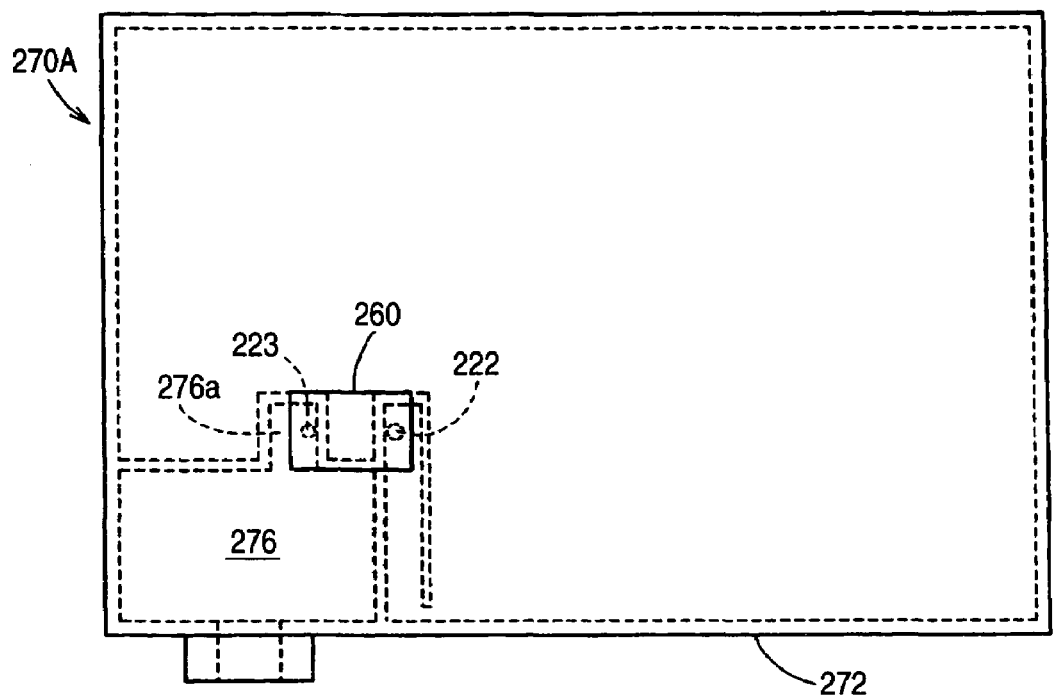
FIG. 35A is a side view illustrating a further embodiment of the ink cartridge including the liquid sensor shown in FIG. 29
Figure 35B:
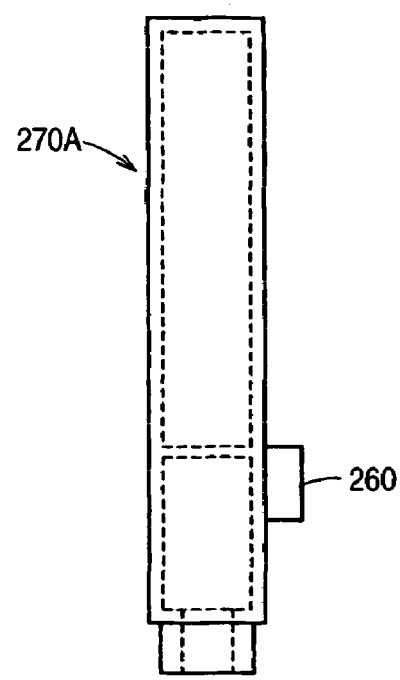
FIG. 35B is a front view illustrating the same.

FIG. 35 shows an ink cartridge according to a further embodiment of the present invention.

Similarly to the embodiment shown in FIG. 8, in an ink cartridge 270A shown in FIG. 35, a projecting portion 276a projecting upward is formed in the upper portion of a sub reservoir chamber 276 formed inside a container body 272. Also, the discharge opening 223 of the liquid sensor 260 is disposed in the position corresponding to the projection portion 276a to communicate with the projecting portion 276a of the sub reservoir chamber 276. The rest of the present embodiment is the same as the embodiment shown in FIG. 32, so that like numerals are attached to the same portions. Further, the present embodiment also takes the same effect as the embodiment shown in FIG. 32.

Figure 37A:
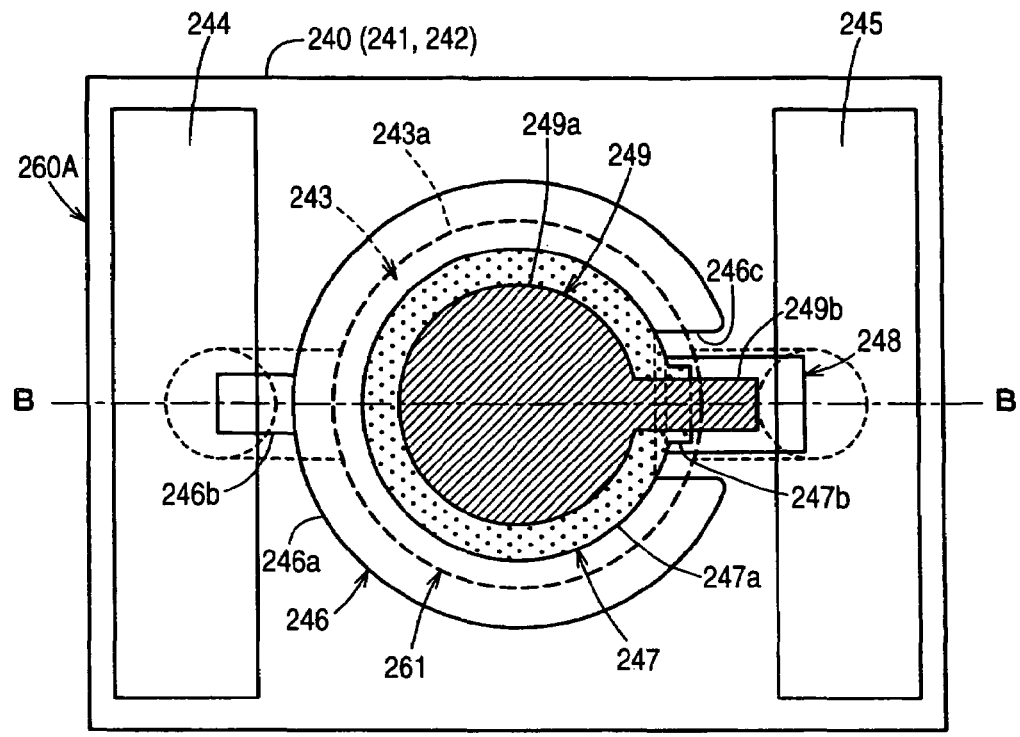
FIG. 37A is a plan view illustrating a sensor portion of the liquid sensor shown in FIG. 36
Figure 37B:
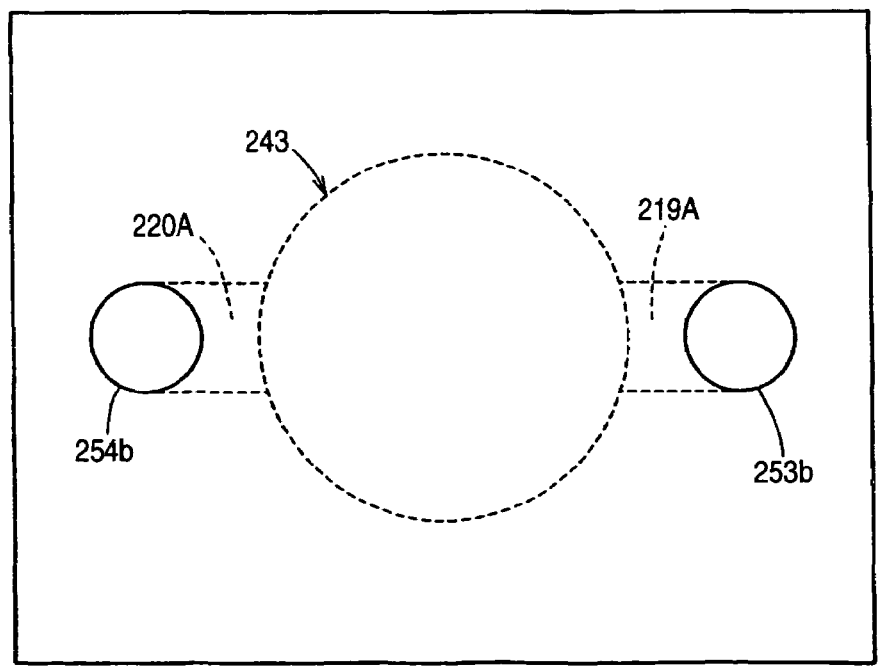
FIG. 37B is a bottom view illustrating the same.

FIGS. 37 and 38 show a liquid sensor 260A according to a further embodiment of the present invention.

In the liquid sensor 260A, a flow path forming base portion 250, which is laminated and joined to the a first surface 240a of a vibration cavity forming base portion 240, is formed with a flow path plate 251 and an exit/entrance plate 252 laminated and joined to each other.

Similarly to the embodiment shown in FIGS. 6 and 7, the flow path plate 251 of the flow path forming base portion 250 according to this embodiment, is formed with ink supply path (a liquid supply path) 219A for supplying ink to be sensed into a cavity 243 and an ink discharge path (a liquid discharge path) 220A for discharging ink to be sensed from the cavity 243. Also, the exit/entrance plate 252 is formed with an entrance 253b of the ink supply path 219A and an exit 254b of the ink discharge path 220A. Further, the entrance 253b of the ink supply path 219A and the exit 254b of the ink discharge path 220A are disposed out of the region corresponding to the cavity 243.

According to the present embodiment, the exit 254b of the ink discharge flow path 220A is disposed opposite to the entrance 253b of the ink supply path 220A, so that the spacing between the entrance 253b and the exit 254b can be enlarged. The cavity 243 is interposed between the entrance 253b and the exit 254b. Therefore, the operation when the liquid sensor 260A is mounted on a predetermined position of the ink cartridge 270 is made simple and the degree of freedom in design of the ink cartridge 270 is also enhanced. The rest of the present embodiment is the same as the embodiment shown in FIG. 29, so that like numerals are attached to the same portions. Further, the present embodiment also takes the same effect as the first embodiment.

Figure 36:
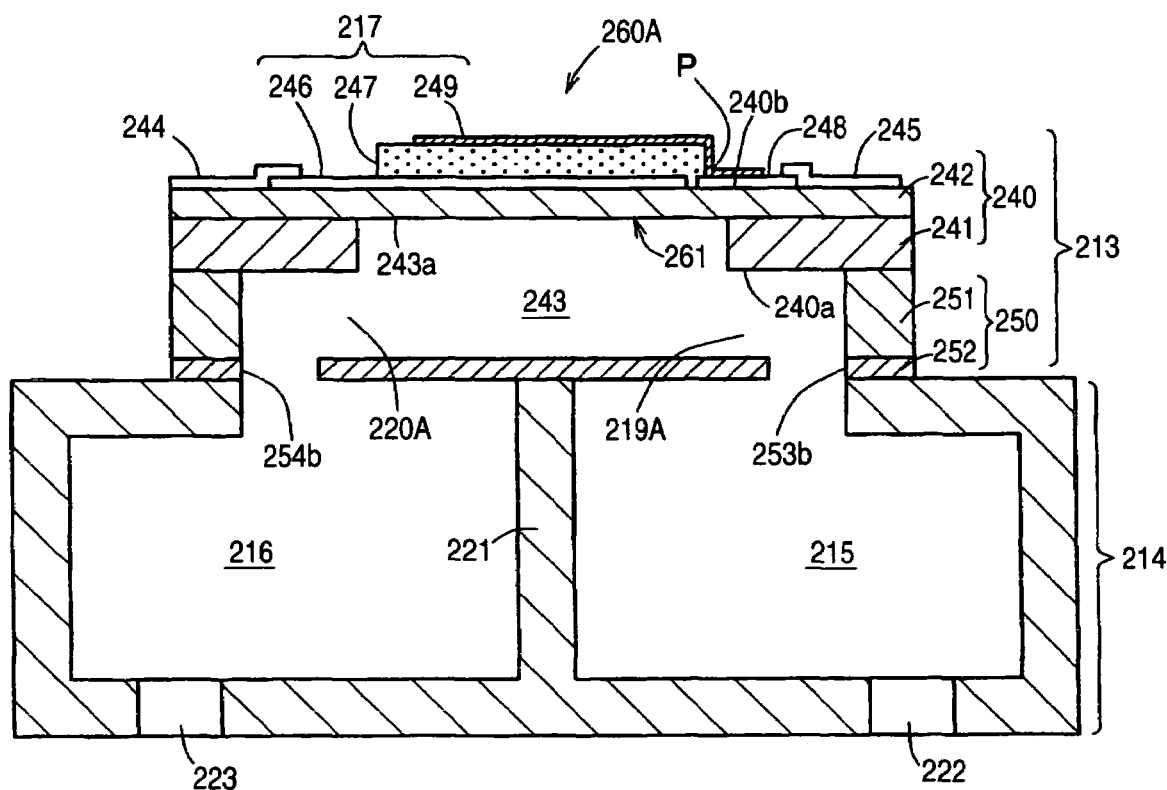
FIG. 36 is a cross-sectional view, taken along a B-B line in FIG. 37A, illustrating a liquid sensor according to a further embodiment of the present invention.

In illustrative, non-limiting embodiments as shown, for example, in FIGS. 29 and 36, a liquid sensor has a following configuration. The liquid sensor includes a vibration cavity forming base portion having a first surface and a second surface facing each other. A cavity for receiving a medium to be sensed is formed to be opened toward the first surface so that the bottom surface of the cavity can be vibrated. Further, the liquid sensor includes a piezoelectric element having a first electrode which is formed on the side of the second surface of the vibration cavity forming base portion, a piezoelectric layer laminated on the first electrode, and a second electrode laminated on the piezoelectric layer. Furthermore, the liquid sensor includes a flow path forming base portion laminated on the side of the first surface of the vibration cavity forming base portion. The flow path forming base portion is formed with a liquid supply path for supplying liquid to be sensed to the cavity and a liquid discharge path for discharging liquid to be sensed from the cavity. A space defined by the cavity, the liquid supply path, and the liquid discharge path is formed symmetrically with respect to the cavity center existing in a region interposed between the liquid supply path and the liquid discharge path.

In other words, the liquid sensor, which is laminated on the side of the first surface of the vibration cavity forming base portion, includes the flow path forming base portion formed with the liquid supply path for supplying liquid to be sensed to the cavity and the liquid discharge path for discharging liquid to be sensed from the cavity. Therefore, the supply of liquid into the cavity is performed through the liquid supply path, and the discharge of liquid from the cavity is performed through the liquid discharge path. Accordingly, when the liquid sensor is mounted on a container or the like for liquid to be sensed, the cavity of the liquid sensor is not exposed to the liquid storage space of liquid to be sensed, so that liquid can be supplied to the cavity through the liquid supply path.

As such, it is configured that liquid flows inside the liquid supply path and the liquid discharge path of the liquid sensor when the liquid is consumed. Therefore, even if bubbles enter the cavity, the bubbles are pushed out of the inside of the cavity by the liquid flow. Accordingly, erroneous detection of the liquid sensor can be prevented, which is caused by the bubbles accumulated inside the cavity. Further, the detection precision of the liquid sensor is enhanced and remaining liquid decreases to lead to reduced industrial waste.

Further, since the cavity does not need to be exposed to the liquid storage space, meniscus can be prevented from being formed inside the cavity when liquid passes through the liquid level. Accordingly, erroneous detection of the liquid sensor can be prevented, which is caused by the liquid remaining inside the cavity. Furthermore, the cavity is not exposed toward the liquid storage space, but is enclosed from the liquid storage space by the flow path forming base portion. Therefore, according to a change in ink level, the existence of ink and the like, a difference in the residual vibration remaining on the bottom surface of the cavity when the bottom surface of the cavity is forced to be vibrated becomes large, so that detection sensitivity becomes high to enhance detection precision and to prevent erroneous detection.

Further, since the space defined by the cavity, the liquid supply path, and the liquid discharge path is formed symmetrically with respect to the center of the cavity existing in the region interposed between the liquid supply path and the liquid discharge path, the spatial shape of the space defined by the cavity, the liquid supply path, and the liquid discharge path is made simple as well as the vibration mode of the residual vibration remaining on the bottom surface of the cavity. The cavity is a space where the vibration on the bottom surface of the cavity is propagated. Accordingly, the simulation of the residual vibration when the bottom surface of the cavity is forced to be vibrated becomes easy to perform and the difference between a design and a practice becomes small, so that adjusting operation can be simple or detection precision can be enhanced.

When the space defining the cavity is substantially cylindrical, the spatial shape of the cavity where the vibration on the bottom surface of the cavity is propagated is made simpler as well as the vibration mode of the residual vibration remaining on the bottom surface of the cavity. Also, the simulation of the residual vibration when the bottom surface of the cavity is forced to be vibrated becomes extremely easy to perform and the difference between a design and a practice becomes small, so that adjusting operation can be simple and detection precision can be enhanced.

When each of the liquid supply path and the liquid discharge path is narrowed with respect to the cavity, and their length is set so that the fluidic mass of liquid exist inside, a suitable flow-path resistance is generated in the liquid supply path and the liquid discharge path. Therefore, the pressure variation within the cavity generated by the vibration on the bottom surface of the cavity is prevented from being diffused throughout both of the buffer chambers, and an appropriate residual vibration is generated to enhance and secure detection precision.

In the case where the supply side buffer chamber communicating with the liquid supply path and the discharge side buffer chamber communicating with the liquid discharge path are further included, the liquid supply path and the liquid discharge path are respectively opened into the supply side buffer chamber and the discharge side buffer chamber and are not opened directly to the space where liquid to be sensed is reserved. Through the liquid supply path and the liquid discharge path, liquid flows in and from the cavity. Therefore, even though bubbles are produced in the liquid reservoir space due to the vibration of liquid or the like, the bubbles are previously trapped in the supply side buffer chamber and the discharge side buffer chamber so that it hardly enters the cavity. Accordingly, erroneous detection of the liquid sensor caused by the bubbles accumulated inside the cavity can be prevented.

Further, since the liquid supply path and the liquid discharge path, through which liquid flows in and from the cavity, are not opened directly to the liquid reservoir space but are opened respectively into the supply side buffer chamber and the discharge side buffer chamber, the liquid pressure generated in the liquid reservoir space does not act directly on the cavity. Therefore, erroneous detection of the liquid sensor caused by the influence of the pressure due to the vibration of liquid can be prevented.

Since the supply side buffer chamber and the discharge side buffer chamber is formed symmetrically with respect to the center of the cavity, the shape of the members constituting both of the buffer chambers can be made simple, the manufacture of the members becomes easy, and the members can be miniaturized.

When each of the supply side buffer chamber and the discharge side buffer chamber has at least ten times larger volume than the cavity, the pressure variation of liquid generated in the liquid reservoir space within the liquid container does not exert any influence on the sensor characteristics of the liquid sensor, so that erroneous detection of the liquid sensor caused by the influence of the pressure due to the vibration of liquid or the like can be prevented. Further, since the pressure within both of the buffer chambers does not increase due to the vibration on the bottom surface of the cavity, an unnecessary vibration is not generated and the vibration mode of the residual vibration remaining on the bottom surface of the cavity is made simple, which makes it possible to enhance detection precision.

In illustrative, non-limiting embodiments as shown, for example, in FIGS. 32 and 35, a liquid container has a following configuration. The liquid container includes a container body having a liquid delivery opening for delivering the liquid reserved inside to the outside and a liquid sensor mounted on the container body. The liquid sensor includes a vibration cavity forming base portion having a first surface and a second surface facing each other. A cavity for receiving a medium to be sensed is formed to be opened toward the first surface so that the bottom surface of the cavity can be vibrated. Further, the liquid sensor includes a piezoelectric element having a first electrode which is formed on the side of the second surface of the vibration cavity forming base portion, a piezoelectric layer laminated on the first electrode, and a second electrode laminated on the piezoelectric layer. Furthermore, the liquid sensor includes a flow path forming base portion laminated on the side of the first surface of the vibration cavity forming base portion. The flow path forming base portion is formed with a liquid supply path for supplying liquid to be sensed to the cavity and a liquid discharge path for discharging liquid to be sensed from the cavity. A space defined by the cavity, the liquid supply path, and the liquid discharge path is formed symmetrically with respect to the cavity center existing in a region interposed between the liquid supply path and the liquid discharge path, and the liquid inside the container body is supplied to the cavity through the liquid supply path of the liquid sensor and discharged from the cavity through the liquid discharge path.

In other words, the liquid container, which is laminated on the side of the first surface of the vibration cavity forming base portion, includes the flow path forming base portion formed with the liquid supply path for supplying liquid to be sensed to the cavity and the liquid discharge path for discharging liquid to be sensed from the cavity. Therefore, the supply of liquid into the cavity is performed through the liquid supply path, and the discharge of liquid from the cavity is performed through the liquid discharge path. Accordingly, when the liquid sensor is mounted on the liquid container, the cavity of the liquid sensor is not exposed to the liquid storage space within the container body of the liquid container, so that the liquid inside the container body can be supplied to the cavity through the liquid supply path.

As such, it is configured that liquid flows inside the liquid supply path and the liquid discharge path of the liquid sensor when the liquid within the liquid container is consumed. Therefore, even if bubbles enter the cavity, the bubbles are pushed out of the inside of the cavity by the liquid flow. Accordingly, erroneous detection of the liquid sensor can be prevented, which is caused by the bubbles accumulated inside the cavity.

Further, since the cavity does not need to be exposed to the liquid storage space, meniscus can be prevented from being formed inside the cavity when liquid passes through the liquid level. Accordingly, erroneous detection of the liquid sensor can be prevented, which is caused by the liquid remaining inside the cavity. Furthermore, the cavity is not exposed toward the liquid storage space, but is enclosed from the liquid storage space by the flow path forming base portion. Therefore, according to the change in liquid level, the existence of liquid and the like, a difference in the residual vibration remaining on the bottom surface of the cavity when the bottom surface of the cavity is forced to be vibrated becomes large, so that detection sensitivity becomes high to enhance detection precision and to prevent erroneous detection.

Further, since the space defined by the cavity, the liquid supply path, and the liquid discharge path is formed symmetrically with respect to the center of the cavity existing in the region interposed between the liquid supply path and the liquid discharge path, the spatial shape of the space defined by the cavity, the liquid supply path, and the liquid discharge path is made simple as well as the vibration mode of the residual vibration remaining on the bottom surface of the cavity. The cavity is a space where the vibration on the bottom surface of the cavity is propagated. Accordingly, the simulation of the residual vibration when the bottom surface of the cavity is forced to be vibrated becomes easy to perform and the difference between a design and a practice becomes small, so that adjusting operation can be simple and detection precision can be enhanced.

When the space defining the cavity of the liquid sensor is substantially cylindrical, the spatial shape of the cavity where the vibration on the bottom surface of the cavity is propagated is made simpler as well as the vibration mode of the residual vibration remaining on the bottom surface of the cavity. Further, the simulation of the residual vibration when the bottom surface of the cavity is forced to be vibrated becomes extremely easy to perform and the difference between a design and a practice becomes small, so that adjusting operation can be simple and detection precision can be enhanced.

When the liquid supply path and the liquid discharge path is respectively narrowed with respect to the cavity and their length is set so that the fluidic mass of liquid exist inside, a suitable flow-path resistance is generated in the liquid supply path and the liquid discharge path. Therefore, the pressure variation within the cavity generated by the vibration on the bottom surface of the cavity is prevented from being diffused throughout both of the buffer chambers, and an appropriate residual vibration is generated to enhance and secure detection precision.

When the liquid sensor includes a supply side buffer chamber communicating with the liquid supply path and a discharge side buffer chamber communicating with the liquid discharge path, the liquid supply path and the liquid discharge path, through which liquid flows in and from the cavity, respectively are opened into the supply side buffer chamber and the discharge side buffer chamber, and are not opened directly to the liquid reservoir space of the container body. Therefore, even though bubbles are produced in the liquid reservoir space due to the vibration of liquid or the like, the bubbles are previously trapped in the supply side buffer chamber and the discharge side buffer chamber so that the bubbles hardly enters the cavity. Accordingly, erroneous detection of the liquid sensor caused by the bubbles accumulated inside the cavity can be prevented. In this case, when the liquid sensor is disposed in the vicinity of the bottom of the liquid container, the effect of preventing entering of bubbles is further enhanced.

Further, since the liquid supply path and the liquid discharge path, through which liquid flows in and from the cavity, are not opened directly to the liquid reservoir space of the container body but are opened respectively into the supply side buffer chamber and the discharge side buffer chamber, the liquid pressure generated in the liquid reservoir space within the liquid container does not act directly on the cavity. Therefore, erroneous detection of the liquid sensor caused by the influence of the pressure due to the vibration of liquid or the like can be prevented.

Since the supply side buffer chamber and the discharge side buffer chamber of the liquid sensor is formed symmetrically with respect to the center of the cavity, the shape of the members constituting both of the buffer chambers can be made simple, the manufacture of the members can be easy, and the members can be miniaturized.

When the supply side buffer chamber and the discharge side buffer chamber of the liquid sensor respectively have at least ten times larger volume than the cavity, the pressure variation of liquid generated in the liquid reservoir space within the liquid container does not exert any influence on the sensor characteristics of the liquid sensor, so that erroneous detection of the liquid sensor caused by the influence of the pressure due to the vibration of liquid or the like can be prevented. Further, since the pressure within both of the buffer chambers does not increase due to the vibration on the bottom surface of the cavity, an unnecessary vibration is not generated and the vibration mode of the residual vibration remaining on the bottom surface of the cavity is made simple, which makes it possible to enhance detection precision.

The supply side buffer chamber communicates with a liquid reservoir chamber which constitutes a major part of an inner space of the container body to reserve liquid, and the discharge side buffer chamber communicates with a liquid delivery space which communicates with the liquid delivery opening for delivering the liquid reserved inside to the outside, in the inner space of the container body. In this case, the liquid reserved in the liquid reservoir chamber of the container body flows from the entrance of the supply side buffer chamber of the liquid sensor to be discharged from the exit of the discharge side buffer chamber to be finally delivered to the liquid delivery opening of the container body. Further, all the liquid to be delivered to the liquid delivery opening of the container body passes through the supply side buffer chamber, the cavity, and the discharge side buffer chamber of the liquid sensor in advance, so that a consumption of liquid can be sensed reliably.

Although various embodiments of the present invention have been discussed in detail with reference to the accompanying drawings, the discussion of those embodiments is intended to facilitate the understanding of various aspects of the present invention and the present invention should not be restricted thereto or thereby. That is, various modifications of those embodiments are conceivable, which fall within the scope of the present invention.

As one example of the modifications, FIG. 38 shows a case in which the flow path forming base portion 50 is omitted in the embodiment shown in FIG. 21. That is, in this modification, the vibration cavity forming base portion 40 is attached to the wall of the container body 72 without the use of the flow path forming base portion 50. The cavity 43 communicates with the first ink reservoir chamber 75 (or the flow path 77) via the first opening 73 formed through the wall of the container body 72 and also communicates with the second ink reservoir chamber 76 (or the flow path 76A) via the second opening 74 formed through the wall of the container body 72. It would be understood from this modification that a flow path through which the first ink reservoir chamber 75 (275) is in fluid communication with the cavity 43 (243) can be formed entirely by the container body 72 (272) side. Similarly, it would be understood from this modification that a flow path through which the ink outlet port 71 (271) is in fluid communication with the cavity 43 (243) can be formed entirely by the container body 72 (272) side.

Figure 39:
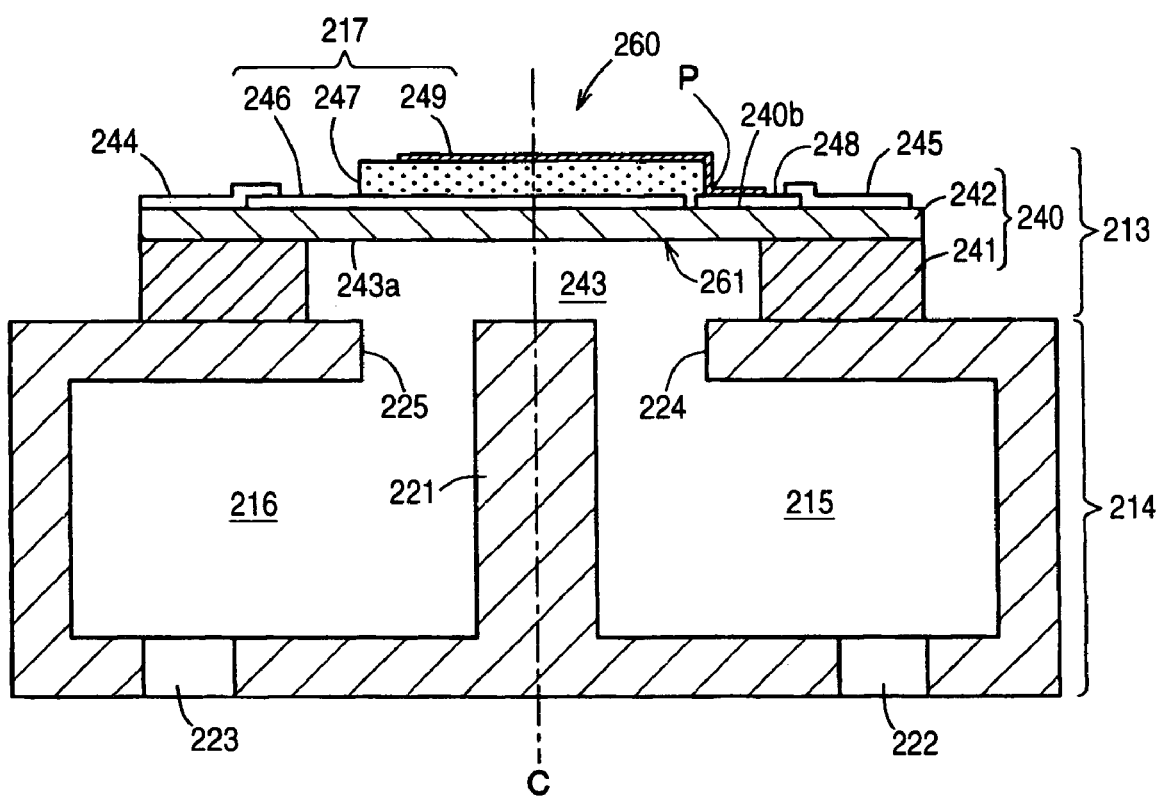
FIG. 39 is a sectional view showing a liquid container including a liquid sensor according to a further embodiment of the present invention, taken along a line corresponding to the A-A line of FIG. 30A.

As another example of the modifications, FIG. 39 shows a case in which the flow path forming plate (flow path forming base portion) 218 is omitted in the embodiment shown in FIG. 29. That is, in this modification, the vibration cavity forming base portion 240 is attached to the wall of the buffer portion 214 without the use of the flow path forming base portion 218. The cavity 243 communicates via the flow path 224 of the buffer portion 214 with the buffer chamber 215 of the buffer portion 214, and also communicates via the flow path 225 of the buffer portion 214 with the buffer chamber 216 of the buffer portion 214. It would be understood from this modification that a flow path for communication between the cavity 243 and the buffer chamber 215 can be formed entirely by the buffer portion 214. Similarly, it would be understood from this modification that a flow path for communication between the cavity 243 and the buffer chamber 216 can be formed entirely by the buffer portion 214.

Figure 40:
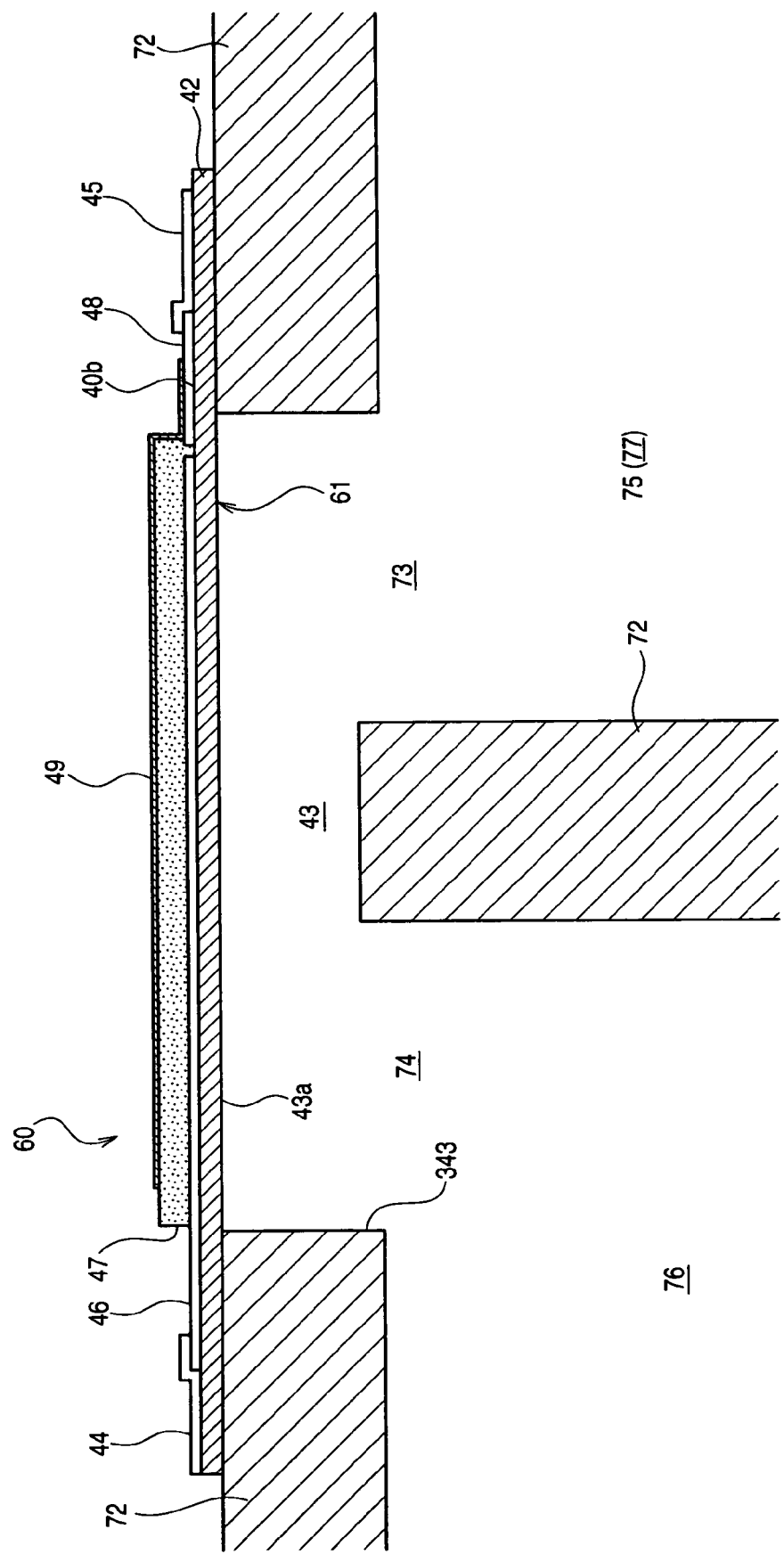
FIG. 40 is a sectional view showing a liquid container including a liquid sensor according to a further embodiment of the present invention, taken along a line corresponding to the B-B line of FIG. 18.
Figure 41:
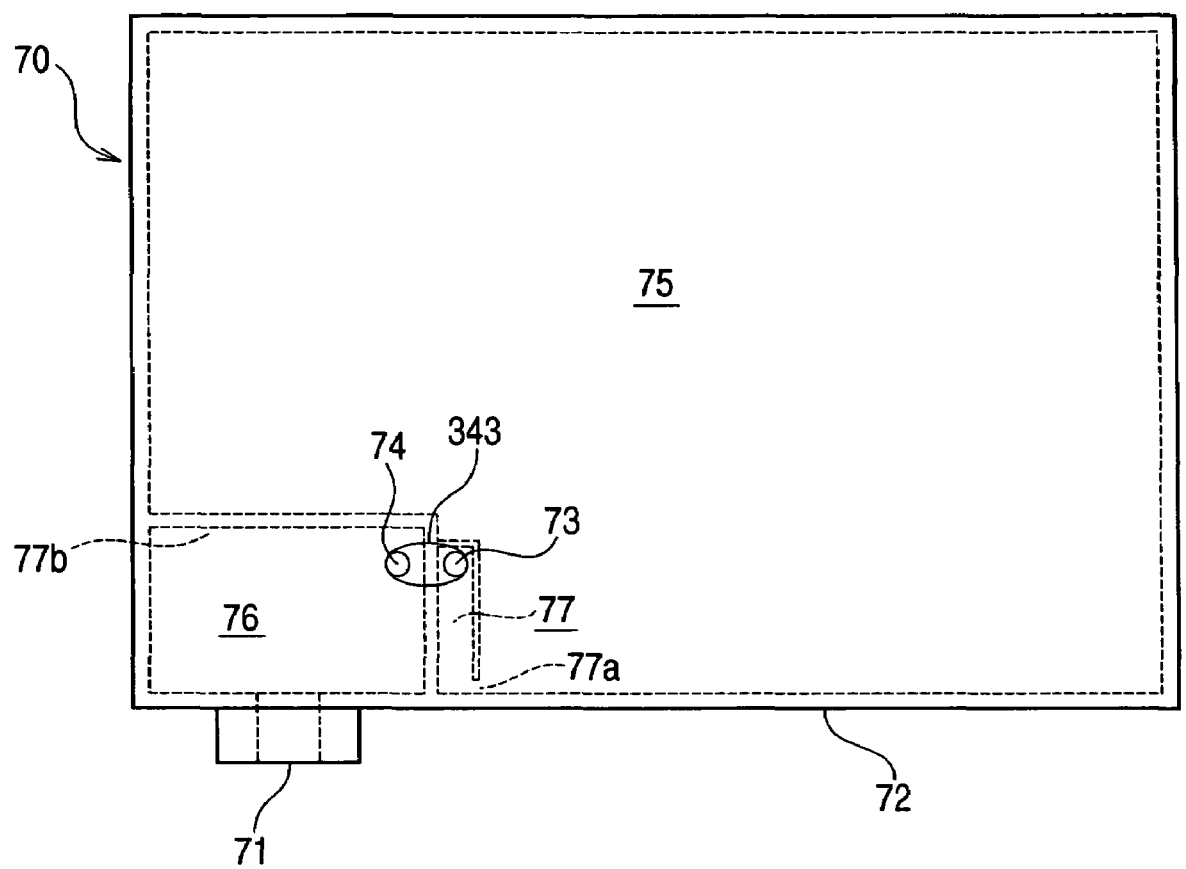
FIG. 41 is a side view of a liquid container before a sensor is attached to a wall of a container body according to a further embodiment of the present invention.

As another example of the modifications, FIGS. 40 and 41 shows a case in which the cavity plate 41 of the vibration cavity forming base portion 40, and the flow path forming base portion 50 are omitted in the embodiment shown in FIG.

29. That is, the vibration plate 42 is attached to the wall of the container body 72 without the use of the cavity plate 41 and the flow path forming base portion 50. To define the cavity 43 when the vibration plate 42 is attached to the wall of the container body 72, the wall of the container body 72 is formed with a recess 343 as shown in FIG. 41. A depth of the recess 343 is smaller than a wall thickness of the wall of the container body 72 as shown in FIG. 40. The bottom of the recess 343 has two through holes, i.e. the first opening 73 and the second opening 74, which are formed through the bottom of the recess 343. When the vibration plate 42 is attached to the wall of the container body 72, the cavity 43 is defined between the planar vibration plate 42 and the bottom of the recess 343, and the thus defined cavity 43 communicates via the first opening 73 with the ink reservoir chamber and also communicates via the second opening 74 with the ink outlet port. It would be understood from this modification that the cavity 43 (243) can be formed in part by the container body 72 (272). In addition, FIG. 41 is a side view of the ink cartridge 70 before the sensor 60 is attached to the wall of the container body 72.

Figure 42:
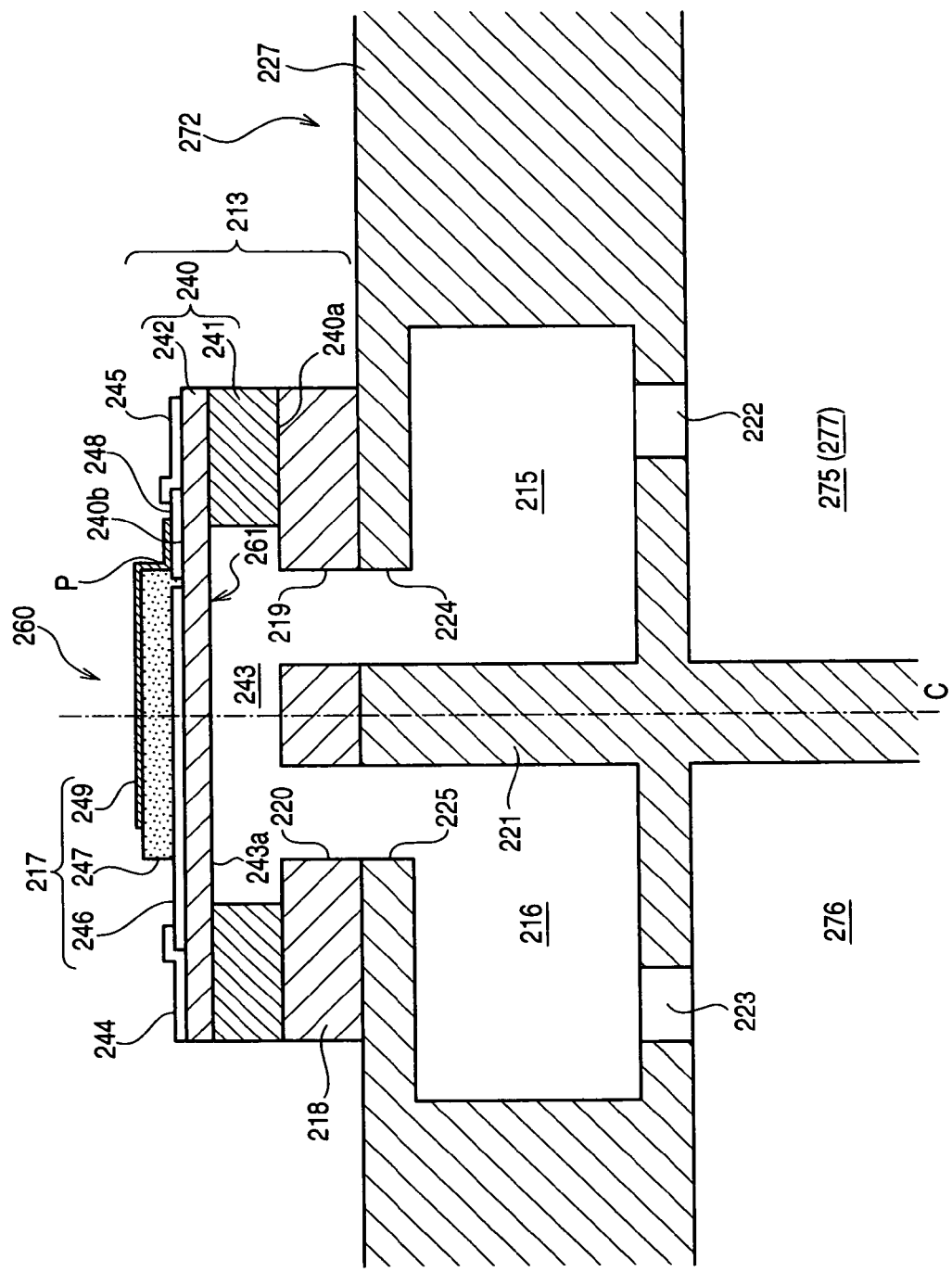
FIG. 42 is a sectional view showing a liquid container including a liquid sensor according to a further embodiment of the present invention, taken along a line corresponding to the A-A line of FIG. 30A.

As another example of the modifications, FIG. 42 shows a case in which the buffer portion 214 is integrally formed in the wall of container body 272 in the embodiment shown in FIG. 29. That is, in this modification, the container body 272 defines the buffer chamber 215 and the buffer chamber 216. Further, the container body 272 defines the flow passages, such as through holes 222, 223, 224, 225, small in cross sectional area than the buffer chambers 215 and 216. It would be understood from this modification that the buffer chambers 215 and 216 can be formed in the container body 272 side, not in the sensor 260 side. Further, it would be understood from this modification that ink flow passages, such as through holes 224 and 225, can be formed in the container body 272 side, not in the sensor 260 side, for communication between the cavity 243 and the buffer chambers 215 and 216. Moreover, it would be understood from this modification that ink flow passages, such as through holes 222 and 223, can be formed in the container body 272 side, not in the sensor 260 side, for communication between the buffer chambers 215 and 216 and the ink reservoir chamber and the ink outlet port.

When the presence of the liquid is detected using the liquid sensor 60, 260 discussed above, there is a possibility that a noise may be superimposed on a counter electromotive force signal output from the liquid sensor 60, 260. Therefore, for example, in a case in which the presence of the ink is detected based only on the frequency change of the counter electromotive force signal, there is a possibility that the absence of the ink may be erroneously judged in contrast to the fact that the ink is present, or the presence of the ink may be erroneously judged in contrast to the fact that the ink is absent. For this reason, it is preferable to judge the presence of ink based on at least two kinds of characteristic values obtained from the counter electromotive force signal output from the liquid sensor 60, 260.

Figure 43:
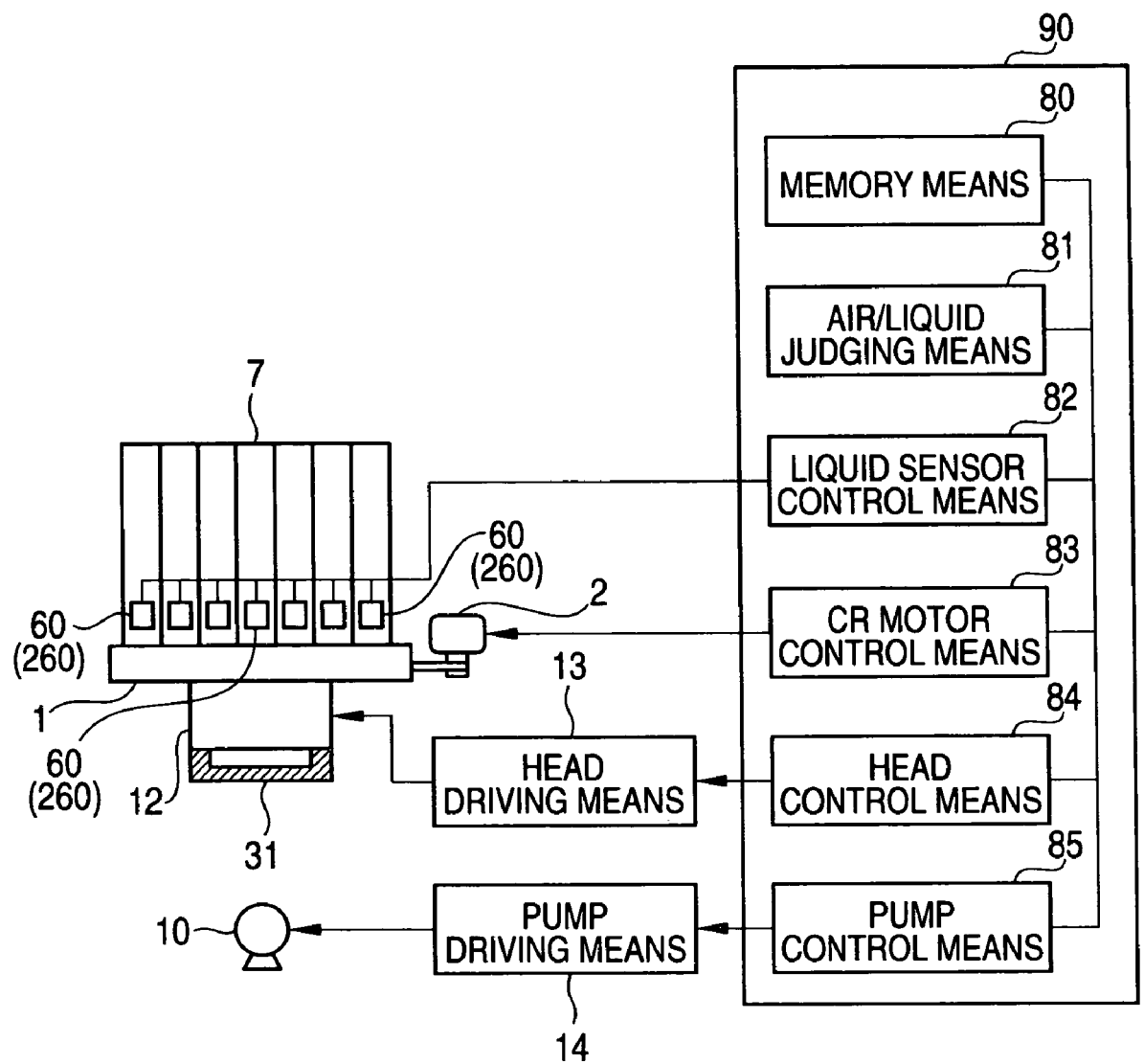
FIG. 43 is a block diagram showing a liquid detecting system according to a further embodiment of the present invention.

FIG. 43 is a block diagram showing a liquid sensing system (liquid detecting system) according to a further embodiment of the present invention. As shown in FIG. 43, a controller 90 of the ink jet recording apparatus includes a memory means 80 having a memory element, an air/liquid judging means 81 for judging whether the interior of the cavity 43, 243 is in a state of a liquid space or an air space, a liquid sensor control means 82 for controlling the liquid detecting operation of the liquid sensor 60, 260, a carriage motor control means 84 for controlling the operation of the carriage motor (CR motor) 2, a head control means 84 for controlling a head driving means 13 to thereby control the operation of the recording head 12, and a pump control means 85 for controlling a pump driving means 14 to thereby control the operation of the pump unit 10.

In the embodiment, the amount of the ink remaining in the interior of the ink cartridge 7 is detected in the following manner using the liquid sensor 60, 260, the memory means 80, the air/liquid judging means 81 and the liquid sensor control means 82.

That is, when the ink cartridge 7 is mounted onto the carriage 1 of the ink jet recording apparatus, the liquid sensor control means 82 applies a driving voltage to the piezoelectric element of the liquid sensor 60, 260, and then detects at least two kinds of characteristic values obtained from an output signal of a counter electromotive force generated by a residual vibration (a first detecting step). The at least two kinds of characteristic values thus detected are stored in the memory means 80 provided in the ink jet recording apparatus.

Here, as the at least two kinds of the characteristic values, a frequency and an amplitude of the output signal of the counter electromotive force can be used. Information about a timing at which the output signal of the counter electromotive force exceeds a predetermined voltage threshold can also be used.

At an appropriate timing after the ink cartridge 7 has been mounted onto the carriage 1, the liquid sensor control means 82 applies a driving voltage to the piezoelectric element of the liquid sensor 60, 260 again and then detects at least two kinds of characteristic values obtained from the output signal of the counter electromotive signal generated by a residual vibration again (a second detecting step).

Subsequently, the air/liquid judging means 81 compares the at least two kinds of the characteristic values detected in the first detecting step and stored in the memory means 80 and the at least two kinds of the characteristic values detected in the second detecting step with each other, and judges, based on changes of those values, whether the interior of the cavity 43, 243 is in the state of the liquid space or the air space. That is, in case in which the air/liquid judging means 81 detects meaningful changes in all of the plural kinds of the characteristic values to be monitored, the air/liquid judging means 81 judges that the interior of the cavity 43, 243 have been changed from the liquid space to the air space.

Figure 44:
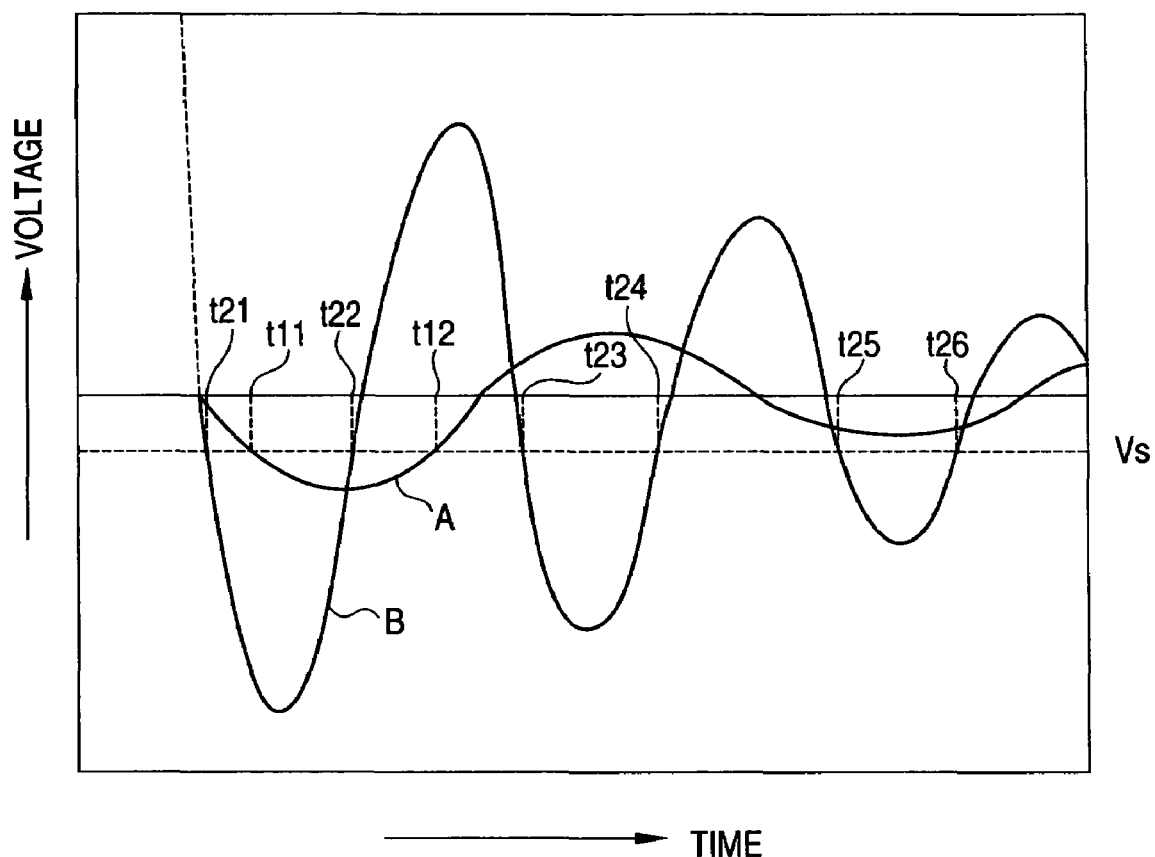
FIG. 44 is a graph for explaining a liquid detecting method according to a further embodiment of the present invention.

With reference to FIG. 44, a liquid sensing method (liquid detecting method) using the at least two kinds of the characteristic values as mentioned above will be discussed in more detail. In FIG. 44, a character A denotes an output signal of a counter electromotive force in case in which the interior of the cavity 43, 243 is the liquid space, and a character B denotes an output signal of a counter electromotive force in case in which the interior of the cavity 43 is the air space.

As shown in FIG. 44, by changing the interior of the cavity 43, 243 from the liquid space to the air space, both of the frequency and amplitude of the output signal of the counter electromotive force are increased. Using this phenomenon, this embodiment judges whether or not the interior of the cavity 43, 243 has been changed from the liquid space to the air space, by monitoring both changes in frequency and amplitude of the output signal of the counter electromotive force.

In FIG. 44, each of reference numerals t11, t22 denotes a timing at which the output signal of the counter electromotive force passes across a predetermined voltage threshold Vs in case in which the interior of the cavity 43, 243 is the liquid space. Similarly, each of reference numerals t21-t26 denotes a timing at which the output signal of the counter electromotive force passes across the predetermined voltage threshold Vs in case in which the interior of the cavity 43, 243 is the air space.

As can be seen from FIG. 44, by changing the interior of the cavity 43, 243 from the liquid space to the air space, the above-noted timings are changed, and therefore the information about those timings can also be used as characteristic values to be monitored. As described above, in the embodiment, a drive voltage is applied to the piezoelectric element of the liquid sensor 60, 260, and the at least two kinds of characteristic values are detected from the output signal of the counter electromotive force generated by the subsequently occurring residual vibration, and then whether or not the interior of the cavity 60, 260 has been changed from the liquid space to the air space is judged based on changes in those at least two kinds of the characteristic values. Therefore, the time point at which the interior of the cavity 60, 260 has been changed from the liquid space to the air space can be detected reliably.

For example, there is a case in which, due to a noise superimposed on the output signal from the piezoelectric element, the frequency of the output signal of the liquid sensor 60, 260 is detected as if it is increased, in contrast to the fact that ink actually exists in the cavity 43, 243 and the frequency of the counter electromotive force signal is not changed. Even in this case, the present embodiment monitors changes in not only the frequency but also the amplitude, and judges that interior of the cavity 43, 243 has been changed from the liquid space to the air space only when the meaningful changes has been obtained from both the frequency and amplitude. Accordingly, it is possible to prevent the erroneous judgment due to the noise.

Further, in the present embodiment, the first detecting step is executed to detect at least two kinds of characteristic values when the ink cartridge 7 is mounted onto the carriage 1, and the detected characteristic values are stored in the memory means 80. Accordingly, even if the characteristic values differs depending on an individual ink cartridge 7, it is possible to reliably detect changes in the characteristic values in association with the state change of the interior of the cavity 43, 243 of the individual ink cartridge 7.

Moreover, since the characteristic values are stored in the memory mean 80 provided on the ink jet recording apparatus side, it is unnecessary to provide the ink cartridge 7 side with a memory means, and therefore it is possible to attain the simplified structure and reduced manufacture cost of the ink cartridge 7.

INDUSTRIAL APPLICABILITY

The present invention is applicable to a liquid sensor which is required to accurately detect the residual amount of liquid in a liquid jetting apparatus. The present invention is also applicable to a liquid container including such a liquid sensor.

The invention claimed is:

1. A liquid sensor comprising:
a vibration cavity forming base portion having a first surface and a second surface opposite to each other, in which a cavity for receiving liquid as a detection object is opened at a side of the first surface, and a bottom of the cavity is capable of vibrating; and
a piezoelectric element including a first electrode formed at a side of the second surface of the vibration cavity forming base portion, a piezoelectric layer laminated on the first electrode, and a second electrode laminated on the piezoelectric layer, wherein
a shape of the cavity in a plan view has a longitudinal dimension and a lateral dimension smaller than the longitudinal dimension; and
the second electrode is substantially cross-shaped.

2. The liquid sensor according to claim 1, wherein the cavity has a first symmetrical axis and a second symmetrical axis perpendicularly intersecting each other, the lateral dimension is a dimension along the first symmetrical axis, and the longitudinal dimension is a dimension along the second symmetrical axis.

3. The liquid sensor according to claim 2, wherein shape of the cavity in the plane view is elliptical.

4. The liquid sensor according to claim 1, further comprising:
an exit/entrance plate laminated at the side of the first surface of the vibration cavity forming base portion, the exit/entrance plate having a liquid supply port for supplying the liquid as the detection object to the cavity, and a liquid discharge port for discharging the liquid as the detection object from the cavity.

5. The liquid sensor according to claim 4, wherein the liquid supply port and the liquid discharge port are respectively disposed at longitudinal end portions of the cavity.

6. The liquid sensor according to claim 4, wherein the liquid supply port and the liquid discharge port are located in an inside of a region corresponding to the cavity.

7. The liquid sensor according to claim 4, wherein the vibration cavity forming base portion and the exit/entrance plate are formed of the same material and sintered integrally.

8. The liquid sensor according to claim 7, wherein the vibration cavity forming base portion and the exit/entrance plate are formed of zirconia or alumina.

9. The liquid sensor according to claim 1, wherein the vibration cavity forming base portion includes a cavity plate in which a through hole forming the cavity is formed, and a vibration plate laminated on the cavity plate.

10. The liquid sensor according to claim 1, wherein the whole of the piezoelectric layer is located in an inside of a region corresponding to the cavity.

11. The liquid sensor according to claim 1, wherein a dimension of the piezoelectric layer in the longitudinal direction of the cavity is larger than the longitudinal dimension of the cavity, and the piezoelectric layer covers the cavity over the entire length in the longitudinal direction of the cavity.

12. The liquid sensor according to claim 1, wherein the first electrode covers a substantially whole of a region corresponding to the cavity.

13. A liquid container comprising:
a container body including a liquid outlet port for sending liquid stored in its inside to an outside; and
a liquid sensor mounted to the container body,
wherein the liquid sensor comprises:
a vibration cavity forming base portion having a first surface and a second surface opposite to each other, in which a cavity for receiving the liquid as a detection object is opened at a side of the first surface, and a bottom of the cavity is capable of vibrating; and
a piezoelectric element including a first electrode formed at a side of the second surface of the vibration cavity forming base portion, a piezoelectric layer laminated on the first electrode, and a second electrode laminated on the piezoelectric layer; wherein
a shape of the cavity in a plan view has a longitudinal dimension and a lateral dimension smaller than the longitudinal dimension; and
the second electrode is substantially cross-shaped.

* * * * *